US012383900B2

(12) United States Patent

Siltanen et al.

(10) Patent No.: US 12,383,900 B2

(45) Date of Patent: Aug. 12, 2025

(54) PLATFORM FOR THE DETERMINISTIC ASSEMBLY OF MICROFLUIDIC DROPLETS

(71) Applicants: The Regents of the University of California, Oakland, CA (US); Scribe Biosciences Inc., San Francisco, CA (US)

(72) Inventors: Christian Siltanen, San Francisco, CA (US); Russell Cole, San Francisco, CA (US); Adam R. Abate, Daly City, CA (US); Justin Madrigal, San Francisco, CA (US); Maithreyan Srinivasan, Palo Alto, CA (US)

(73) Assignee: The Regents of the University of California, Oakland, CA (US)

( * ) Notice: Subject to any disclaimer, the term of this patent is extended or adjusted under 35 U.S.C. 154(b) by 912 days.

(21) Appl. No.: 17/595,054

(22) PCT Filed: May 13, 2020

(86) PCT No.: PCT/US2020/032599

§ 371 (c)(1),
(2) Date: Nov. 8, 2021

(87) PCT Pub. No.: WO2020/232072

PCT Pub. Date: Nov. 19, 2020

(65) Prior Publication Data

US 2022/0219171 A1 Jul. 14, 2022

Related U.S. Application Data

(60) Provisional application No. 62/847,791, filed on May 14, 2019.

(51) Int. Cl.
*B01L 3/00* (2006.01)

(52) U.S. Cl.
CPC ... *B01L 3/502761* (2013.01); *B01L 2200/025* (2013.01); *B01L 2200/0636* (2013.01); *B01L 2200/0652* (2013.01); *B01L 2200/0673* (2013.01); *B01L 2200/10* (2013.01); *B01L 2200/16* (2013.01); *B01L 2300/0663* (2013.01); *B01L 2300/0864* (2013.01); *B01L 2400/0638* (2013.01); *B01L 2400/086* (2013.01)

(58) Field of Classification Search
CPC ................. B01L 3/00; B01L 3/502761; B01L 2200/0636; B01L 2200/0652; B01L 2200/0673; B01L 2300/0864
See application file for complete search history.

(56) References Cited

U.S. PATENT DOCUMENTS

| | | | | |
|---|---|---|---|---|
| 2007/0163883 | A1* | 7/2007 | Schnelle | B03C 5/005 204/547 |
| 2010/0009383 | A1 | 1/2010 | Kiesewetter et al. | |
| 2013/0244906 | A1 | 9/2013 | Collins | |
| 2013/0260447 | A1 | 10/2013 | Link | |
| 2018/0056288 | A1* | 3/2018 | Abate | B01L 3/502784 |
| 2018/0334670 | A1 | 11/2018 | Bharadwaj et al. | |
| 2019/0084011 | A1 | 3/2019 | Imai et al. | |

FOREIGN PATENT DOCUMENTS

| | | | |
|---|---|---|---|
| JP | 2011-188834 | | 9/2011 |
| JP | 2017-185493 | | 10/2017 |
| JP | 2018-515764 | | 6/2018 |
| JP | 2019-050778 | | 4/2019 |
| WO | 2005021151 | A1 | 3/2005 |
| WO | 2009010719 | A1 | 1/2009 |
| WO | WO2014028378 | | 2/2014 |
| WO | 2016174229 | A1 | 11/2016 |

OTHER PUBLICATIONS

I. C. Clark et al., Concentric Electrodes Improve Microfluidic Droplet Sorting, 18 Lab Chip 710-713 (2018).*

Abate et al., (2010) "Microfluidic sorting with high-speed single-layer membrane valves", Applied Physics Letters, vol. 96, 203509.

Abate et al., (2010) "High-throughput injection with microfluidics using picoinjectors", PNAS, vol. 107, No. 45, pp. 19163-19166.

Agresti et al., (2010), "Corrections and Editorial Expression of Concern", PNAS, vol. 107, No. 9, pp. 4004-4009.

Ahn et al., (2006) "Electrocoalescence of drops synchronized by size-dependent flow in microfluidic channels", Applied Physics Letters, vol. 88, 264105.

Clark et al., (2018) "Concentric electrodes improve microfluidic droplet sorting", Lab Chip, Vo. 18, No. 5, pp. 710-713.

Cole et al., (2017) "Printed droplet microfluidics for on demand dispensing of picoliter droplets and cells", PNAS, vol. 114, No. 33, pp. 8728-8733.

Franke et al., (2010) "Surface acoustic wave actuated cell sorting (SA WACS)", Lab on a Chip, vol. 6, pp. 789-794.

Wu, Junru, (2018) "Acoustic Streaming and Its Applications", Fluids, Vo. 3, No. 108, pp. 1-18.

(Continued)

*Primary Examiner* — Randy Boyer

(74) *Attorney, Agent, or Firm* — Edward J. Baba; Michael J. Blessent; Bozicevic, Field & Francis LLP

(57) ABSTRACT

Methods for selectively combining discrete entities including, e.g. cells, reagents, drugs, hydrogels, extracellular matrices beads, particles, biological materials, media, or a combination thereof, are provided. In certain aspects, the methods include sorting a plurality of discrete entities and trapping two or more discrete entities for a time sufficient for the two or more discrete entities to combine to form a combined discrete entity. In certain aspects, the methods include making the plurality of discrete entities. In certain aspects, the methods include detecting or analyzing the discrete entities, e.g. via optical detection. In certain aspects, the methods include manipulating or analyzing the combined discrete entity or a component therein, e.g. imaging, sequencing, culturing, e.g., three-dimensional culturing, and measuring cell-cell interactions. Systems and devices for practicing the subject methods are also provided.

34 Claims, 21 Drawing Sheets

(56) References Cited

OTHER PUBLICATIONS

Link et al., (2004) "Geometrically mediated breakup of drops in microfluidic devices", Physical Review Letters, vol. 92, 054503.
Priest et al., (2006) "Controlled electrocoaljescence in microfluidics: Targeting a single lamella", Applied Physics Letters, vol. 89, 134101.
R. Haugland, (2002) Handbook of Fluorescent Probes and Research Products, 9th ed., Molecular Probes, Eugene, Oreg.
Schmid et al., (2014) "Sorting drops and cells with acoustics: acoustic microfluidic fluorescence-activated cell sorter", Lab on a Chip, Vo. 14, pp. 3710-3718. doi:10.1039/c41c00588k.
Sciambi et al., (2015) Accurate microfluidic sorting of droplets at 30 kHz, Lab Chip, vol. 15, pp. 47-51, doi:10.1039/C4LC01194E.
Siltanen et al., (2018) "An Oil-Free Picodrop Bioassay Platform for Synthetic Biology", Scientific Reports, vol. 8, No. 7913.
Song et al., (2006) "On-chip titration of an anticoagulant argatroban and determination of the clotting time within whole blood or plasma using a plug-based microfluidic system", Anal. Chem., vol. 78, No. 14, pp. 4839-4849.

* cited by examiner i)

iii)

Assembled Droplet Contents: 90% accuracy

| #Blue \ #Red | 0 | 1 | 2 | 3 |
|---|---|---|---|---|
| **0** | 0 | 1 | 0 | 0 |
| **1** | 3 | **93** | 3 | 0 |
| **2** | 0 | 3 | 0 | 1 |

Input Droplets

Assay Droplet

PLATFORM FOR THE DETERMINISTIC ASSEMBLY OF MICROFLUIDIC DROPLETS

REFERENCE TO PRIORITY DOCUMENT

This application is a U.S. National Stage Entry of International Application US2020/032599, filed May 13, 2020, which claims the benefit of priority under 35 U.S.C. § 119 (e) of U.S. provisional patent application Ser. No. 62/847,791, filed May 14, 2019. The disclosures of the provisional patent application and the international application are hereby incorporated by reference in their entirety.

GOVERNMENT SUPPORT

This invention was made with government support under grant number R43 HG010128 awarded by the National Institutes of Health and grant numbers D17PC00405 and 140D6318C0010 awarded by the Department of Defense Advanced Research Projects Agency. The government has certain rights in the invention.

INTRODUCTION

Studying the interactions between biomolecules, reagents, cells, or combinations thereof involves bringing such components together under certain conditions. Developments in discrete entity microfluidics have provided tools for manipulating single cells and small volumes of reagents or biomolecules. However, such microfluidic manipulations generally only involve sorting each discrete entity into a particular microfluidic channel. Thus, such microfluidic devices lack the ability to selective combine discrete entities.

SUMMARY

Methods for selectively combining discrete entities including, e.g. cells, reagents, drugs, hydrogels, extracellular matrices, beads, particles, biological materials, media, or a combination thereof, are provided. In certain aspects, the methods include sorting a plurality of discrete entities and trapping two or more discrete entities for a time sufficient for the two or more discrete entities to combine to form a combined discrete entity. In certain aspects, the methods include making the plurality of discrete entities. In certain aspects, the methods include detecting or analyzing the discrete entities, e.g. via optical detection. In certain aspects, the methods include manipulating or analyzing the combined discrete entity or a component therein, e.g. imaging, sequencing, culturing, e.g., three-dimensional culturing, and measuring cell-cell interactions. Systems and devices for practicing the subject methods are also provided.

The present disclosure provides methods of selectively combining discrete entities, for example, by: flowing a plurality of discrete entities in a carrier fluid through an inlet channel, wherein the plurality of discrete entities are insoluble, immiscible, or a combination thereof in the carrier fluid; selectively sorting at least two of the discrete entities to a first outlet channel; and trapping the at least two discrete entities in a discrete entity merger region of the first outlet channel for a time such that the at least two discrete entities combine to form a combined discrete entity, wherein the inlet channel, first outlet channel, and discrete entity merger region are each part of a single microfluidic device.

The present disclosure also provides microfluidic devices which may be utilized in the implementation of the methods describe herein. For example, the present disclosure provides a microfluidic device including, for example: a) an inlet channel; b) a sorting channel in fluid communication with the inlet channel; c) a first outlet channel and a second outlet channel in fluid communication with the sorting channel, wherein the first outlet channel comprises a discreet entity merger region; d) a sorting element positioned in proximity to the sorting channel, wherein the sorting element is configured to sort a discrete entity in the sorting channel to the first outlet channel; and e) a trapping element positioned in proximity to the discrete entity merger region, wherein the trapping element and discrete entity merger region are configured to trap a plurality of discrete entities in the discrete entity merger region for a time sufficient for the plurality of discrete entities to combine to form a combined discrete entity.

The present disclosure also provides a system including, for example, a subject microfluidic device as described herein, and one or more or all of: i) a discrete entity maker configured to make a plurality of discrete entities, wherein the discrete entity maker is located within the microfluidic device or separately from the microfluidic device; ii) a discrete entity library comprising two or more types of discrete entities; iii) a detector configured to detect a discrete entity in the input channel, wherein the microfluidic device is configured to sort a discrete entity in the sorting channel based on the detection by the detector; iv) a temperature control module operably connected to the microfluidic device; v) an incubator operably connected to the microfluidic device; vi) an imager configured to image a combined discrete entity; and vii) a sequencer operably connected to the microfluidic device or the incubator.

BRIEF DESCRIPTION OF THE DRAWINGS

The invention may be best understood from the following detailed description when read in conjunction with the accompanying drawings. Included in the drawings are the following figures.

DETAILED DESCRIPTION

Figure 1:
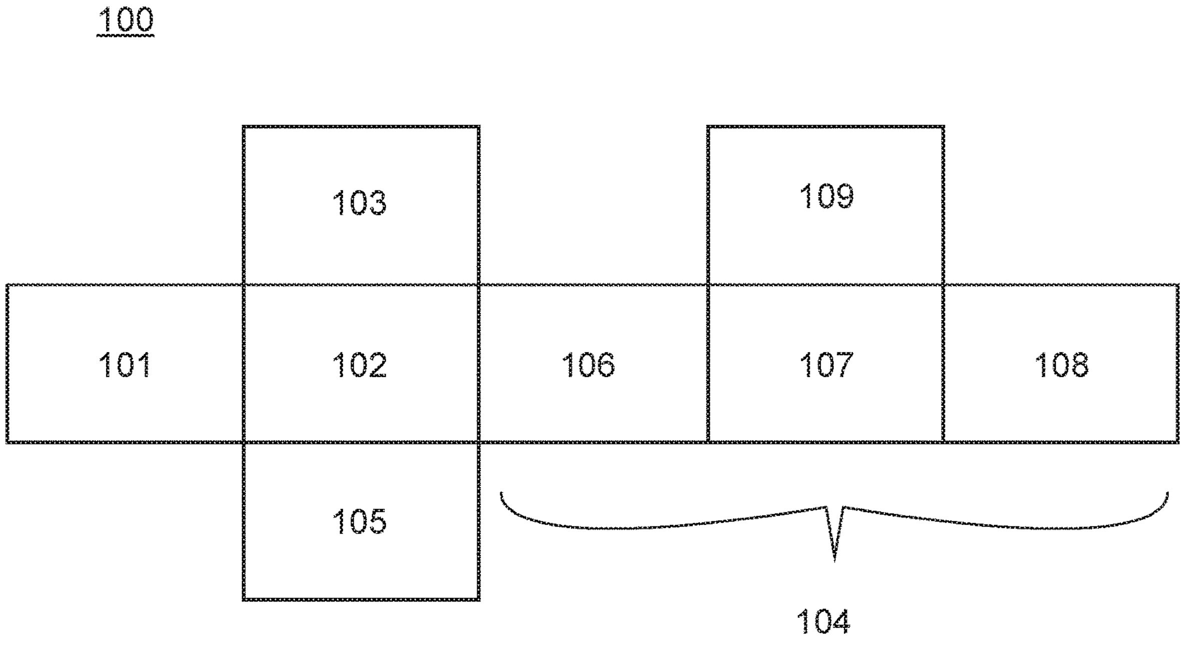
FIG. 1 provides a block schematic diagram of an example microfluidic device having an inlet channel, a sorting channel, a sorting element, first and second outlet channels, a trapping element, a discrete entity merger region, and upstream and a downstream regions.

Methods for selectively combining discrete entities including, e.g. cells, reagents, drugs, hydrogels, extracellular matrices, beads, particles, biological materials, media, or a combination thereof, are provided. In certain aspects, the methods include sorting a plurality of discrete entities and trapping two or more discrete entities for a time sufficient for the two or more discrete entities to combine to form a combined discrete entity. In certain aspects, the methods include making the plurality of discrete entities. In certain aspects, the methods include detecting or analyzing the discrete entities, e.g. via optical detection. In certain aspects, the methods include manipulating or analyzing the combined discrete entity or a component therein, e.g. imaging, sequencing, culturing, e.g., three-dimensional culturing, and measuring cell-cell interactions. Systems and devices for practicing the subject methods are also provided.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a droplet" includes a plurality of such droplets and reference to "the discrete entity" includes reference to one or more discrete entities, and so forth.

It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed. To the extent the definition or usage of any term herein conflicts with a definition or usage of a term in an application or reference incorporated by reference herein, the instant application shall control.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Definitions

Discrete entities as used or generated in connection with the subject methods, devices, and/or systems may be sphere shaped or they may have any other suitable shape, e.g., an ovular or oblong shape. Discrete entities as described herein may include a liquid phase and/or a solid phase material. In some embodiments, discrete entities according to the present disclosure include a gel material. In some embodiments, the subject discrete entities have a dimension, e.g., a diameter, of or about 1.0 μm to 1000 μm, inclusive, such as 1.0 μm to 750 μm, 1.0 μm to 500 μm, 1.0 μm to 100 μm, 1.0 μm to 10 μm, or 1.0 μm to 5 μm, inclusive. In some embodiments, discrete entities as described herein have a dimension, e.g., diameter, of or about 1.0 μm to 5 μm, 5 μm to 10 μm, 10 μm to 100 μm, 100 μm to 500 μm, 500 μm to 750 μm, or 750 μm to 1000 μm, inclusive. Furthermore, in some embodiments, discrete entities as described herein have a volume ranging from about 1 fL to 1 nL, inclusive, such as from 1 fL to 100 pL, 1 fL to 10 pL, 1 fL to 1 pL, 1 fL to 100 fL, or 1 fL to 10 fL, inclusive. In some embodiments, discrete entities as described herein have a volume of 1 fL to 10 fL, 10 fL to 100 fL, 100 fL to 1 pL, 1 pL to 10 pL, 10 pL to 100 pL or 100 pL to 1 nL, inclusive. In addition, discrete entities as described herein may have a size and/or shape such that they may be produced in, on, or by a microfluidic device and/or flowed from or applied by a microfluidic device.

In some embodiments, the discrete entities as described herein are droplets. The terms "drop," "droplet," and "microdroplet" are used interchangeably herein, to refer to small, generally spherically structures, containing at least a first fluid phase, e.g., an aqueous phase (e.g., water), bounded by a second fluid phase (e.g., oil) which is immiscible with the first fluid phase. In some embodiments, droplets according to the present disclosure may contain a first fluid phase, e.g., oil, bounded by a second immiscible fluid phase, e.g., an aqueous phase fluid (e.g., water). In some embodiments, the second fluid phase will be an immiscible phase carrier fluid. Thus, droplets according to the present disclosure may be provided as aqueous-in-oil emulsions or oil-in-aqueous emulsions. Droplets may be sized and/or shaped as described herein for discrete entities. For example, droplets according to the present disclosure generally range from 1 μm to 1000 μm, inclusive, in diameter. Droplets according to the present disclosure may be used to encapsulate cells, nucleic acids (e.g., DNA), enzymes, reagents, and a variety of other components. The term droplet may be used to refer to a droplet produced in, on, or by a microfluidic device and/or flowed from or applied by a microfluidic device.

As used herein, the term "dielectrophoretic force" refers to the force exerted on an uncharged particle caused by of the polarization of the particle by and interaction with a non-uniform electric field. A dielectrophoretic force can be directed towards, i.e. "attractive dielectrophoretic force", away from, i.e. "repulsive dielectrophoretic force", or in any direction relative to the source of the electric field. Before being contacted by the electric field, the particle can be positively charged, negatively charged, or neutral.

As used herein, the term "electrophoretic force" refers to the force exerted on a charged particle caused by interaction with an electric field. An electrophoretic force can be directed towards, i.e. "attractive electrophoretic force", away from, i.e. "repulsive electrophoretic force", or in any direction relative to the source of the electric field. Before being contacted by the electric field, the particle can be positively charged, negatively charged, or neutral.

As used herein, the term "carrier fluid" refers to a fluid configured or selected to contain one or more discrete entities, e.g., droplets, as described herein. A carrier fluid may include one or more substances and may have one or more properties, e.g., viscosity, which allow it to be flowed through a microfluidic device or a portion thereof. In some embodiments, carrier fluids include, for example: oil or water, and may be in a liquid or gas phase. Suitable carrier fluids are described in greater detail herein.

As used herein, the term "biological sample" encompasses a variety of sample types obtained from a variety of sources, which sample types contain biological material. For example, the term includes biological samples obtained from a mammalian subject, e.g., a human subject, and biological samples obtained from a food, water, or other environmental source, etc. The definition encompasses blood and other liquid samples of biological origin, as well as solid tissue samples such as a biopsy specimen or tissue cultures or cells derived therefrom and the progeny thereof. The definition also includes samples that have been manipulated in any way after their procurement, such as by treatment with reagents, solubilization, or enrichment for certain components, such as polynucleotides. The term "biological sample" encompasses a clinical sample, and also includes cells in culture, cell supernatants, cell lysates, cells, serum, plasma, biological fluid, and tissue samples. "Biological sample" includes cells; biological fluids such as blood, cerebrospinal fluid, semen, saliva, and the like; bile; bone marrow; skin (e.g., skin biopsy); and antibodies obtained from an individual.

"Polynucleotides" or "oligonucleotides" as used herein refer to linear polymers of nucleotide monomers, and may be used interchangeably. Polynucleotides and oligonucleotides can have any of a variety of structural configurations, e.g., be single stranded, double stranded, or a combination of both, as well as having higher order intra- or intermolecular secondary/tertiary structures, e.g., hairpins, loops, triple stranded regions, etc. Polynucleotides typically range in size from a few monomeric units, e.g. 5-40, when they are usually referred to as "oligonucleotides," to several thousand monomeric units. Whenever a polynucleotide or oligonucleotide is represented by a sequence of letters (upper or lower case), such as "ATGCCTG," it will be understood that the nucleotides are in 5'→3' order from left to right and that "A" denotes deoxyadenosine, "C" denotes deoxycytidine, "G" denotes deoxyguanosine, and "T" denotes thymidine, "I" denotes deoxyinosine, "U" denotes uridine, unless otherwise indicated or obvious from context. Unless otherwise noted the terminology and atom numbering conventions will follow those disclosed in Strachan and Read, *Human Molecular Genetics* 2 (Wiley-Liss, New York, 1999).

The terms "polypeptide," "peptide," and "protein," used interchangeably herein, refer to a polymeric form of amino acids of any length. $NH_2$ refers to the free amino group present at the amino terminus of a polypeptide. COOH refers to the free carboxyl group present at the carboxyl terminus of a polypeptide. In keeping with standard polypeptide nomenclature, *J. Biol. Chem.,* 243 (1969), 3552-3559 is used.

By "operably connected" and "operably coupled", as used herein, is meant connected in a specific way (e.g., in a manner allowing fluid, e.g., water, to move and/or electric power to be transmitted) that allows a disclosed system or device and its various components to operate effectively in the manner described herein.

In certain embodiments, flow channels are one or more "micro" channel Such channels may have at least one cross-sectional dimension on the order of a millimeter or smaller (e.g., less than or equal to about 1 millimeter). For certain applications, this dimension may be adjusted; in some embodiments the at least one cross-sectional dimension is about 500 micrometers or less. In some embodiments, the cross-sectional dimension is about 100 micrometers or less, or about 10 micrometers or less, and sometimes about 1 micrometer or less. A cross-sectional dimension is one that is generally perpendicular to the direction of centerline flow, although it should be understood that when encountering flow through elbows or other features that tend to change flow direction, the cross-sectional dimension in play need not be strictly perpendicular to flow. It should also be understood that in some embodiments, a microchannel may have two or more cross-sectional dimensions such as the height and width of a rectangular cross-section or the major and minor axes of an elliptical cross-section. Either of these dimensions may be compared against sizes presented here. Note that micro-channels employed in this disclosure may have two dimensions that are grossly disproportionate—e.g., a rectangular cross-section having a height of about 100-200 micrometers and a width on the order or a centimeter or more. Of course, certain devices may employ channels in which the two or more axes are very similar or even identical in size (e.g., channels having a square or circular cross-section).

Methods

As summarized above, aspects of the disclosed subject matter include methods for selectively combining discrete entities. The present disclosure provides methods of selectively combining discrete entities, for example, by: flowing a plurality of discrete entities in a carrier fluid through an inlet channel, wherein the plurality of discrete entities are insoluble, immiscible, or a combination thereof in the carrier fluid; selectively sorting at least two of the discrete entities to a first outlet channel; and trapping the at least two discrete entities in a discrete entity merger region of the first outlet channel for a time such that the at least two discrete entities combine to form a combined discrete entity, wherein the inlet channel, first outlet channel, and discrete entity merger region are each part of a single microfluidic device.

In some cases, the first outlet channel further comprises an upstream region located between and in fluid communication with the sorter channel and the discrete entity merger region. In some cases, the first outlet channel further comprises a downstream region located adjacent to and in fluid communication with the discrete entity merger region.

In some cases, the method includes releasing the combined discrete entity from the discrete entity merger region.

FIG. 1 presents a non-limiting, simplified, schematic representation of one type of a device and method according to the present disclosure. The microfluidic device of FIG. 1 is labeled as microfluidic device 100. FIG. 1 shows a representation of an inlet channel 101, wherein a discrete entity that is insoluble and/or immiscible in a carrier fluid a carrier fluid can be flowed through the inlet channel 101 to a sorter channel 102 that is in direct fluid communication with inlet channel 101. Next, the discrete entity can be sorted into a first outlet channel 104 or a second outlet channel 105, which are both in direct fluid communication with the sorter channel, by sorting element 103. Sorting element 103 can be, in some cases, an electrode, e.g. an electrode that is configured to exert a dielectrophoretic force on the discrete entity. Sorting element 103 in FIG. 1 is configured to sort a discrete entity in sorting channel 102 to first outlet channel 104 or second outlet channel 105. In some cases, if the discrete entity is sorted to second outlet channel 105, the discrete entity is sorted to a waste container or is recycled back to inlet channel 101. FIG. 1 shows an embodiment wherein first outlet channel 104 includes an upstream region 106, a discrete entity merger region 107, and a downstream region 108. In some cases, the discrete entity merger region comprises a change in a dimension of the first outlet channel, e.g. the discrete entity merger region 107 has a larger cross-sectional area than the upstream region 106.

In addition, the FIG. 1 device includes trapping element 109. In some cases, trapping element 109 includes a trapping electrode, and the trapping electrode is configured to exert a force, e.g. a dielectrophoretic force, that traps the discrete entity in the discrete entity merger region 107. Furthermore, the discrete entity merger region 107 and the trapping element 109 are configured such that a force applied by the trapping electrode in the discrete entity merger region is sufficient to trap a plurality of discrete entities in the discrete entity merger region for a time sufficient for the plurality of discrete entities to combine to form a combined discrete entity. In some cases, a trapping electrode is configured to provide an electric field that affects the surface of the discrete entities such that the discrete entities can more easily merge, e.g. the discrete entities will spontaneously merge. In some cases, the affecting is destabilizing.

Figure 5:
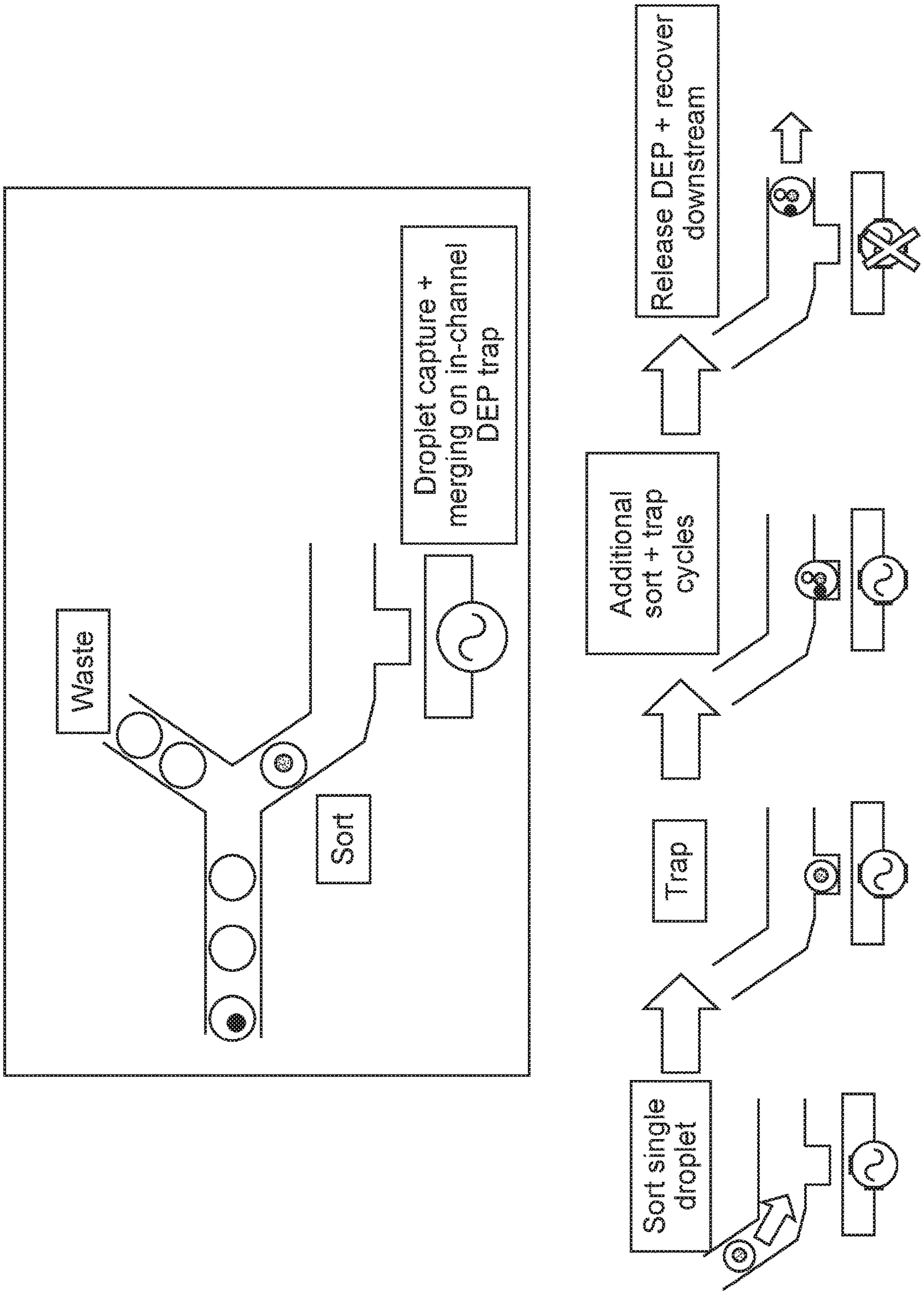
FIG. 5 provides a schematic flow diagram of a method of selectively combining discrete entities using a microfluidic device according to embodiments of the present disclosure.

Thus, methods of using the FIG. 1 device include flowing a plurality of discrete entities through inlet channel 101 to sorting channel 102, sorting with sorting element 103 the plurality of discrete entities into first outlet channel 104 or second outlet channel 105, trapping with trapping element 109 at least two discrete entities in discrete entity merger region 107 for a time sufficient for the at least two discrete entities to combine to form a combined discrete entity. FIG. 5 shows a schematic representation of an exemplary method wherein discrete entities containing cells are selectively combined.

Figure 2:
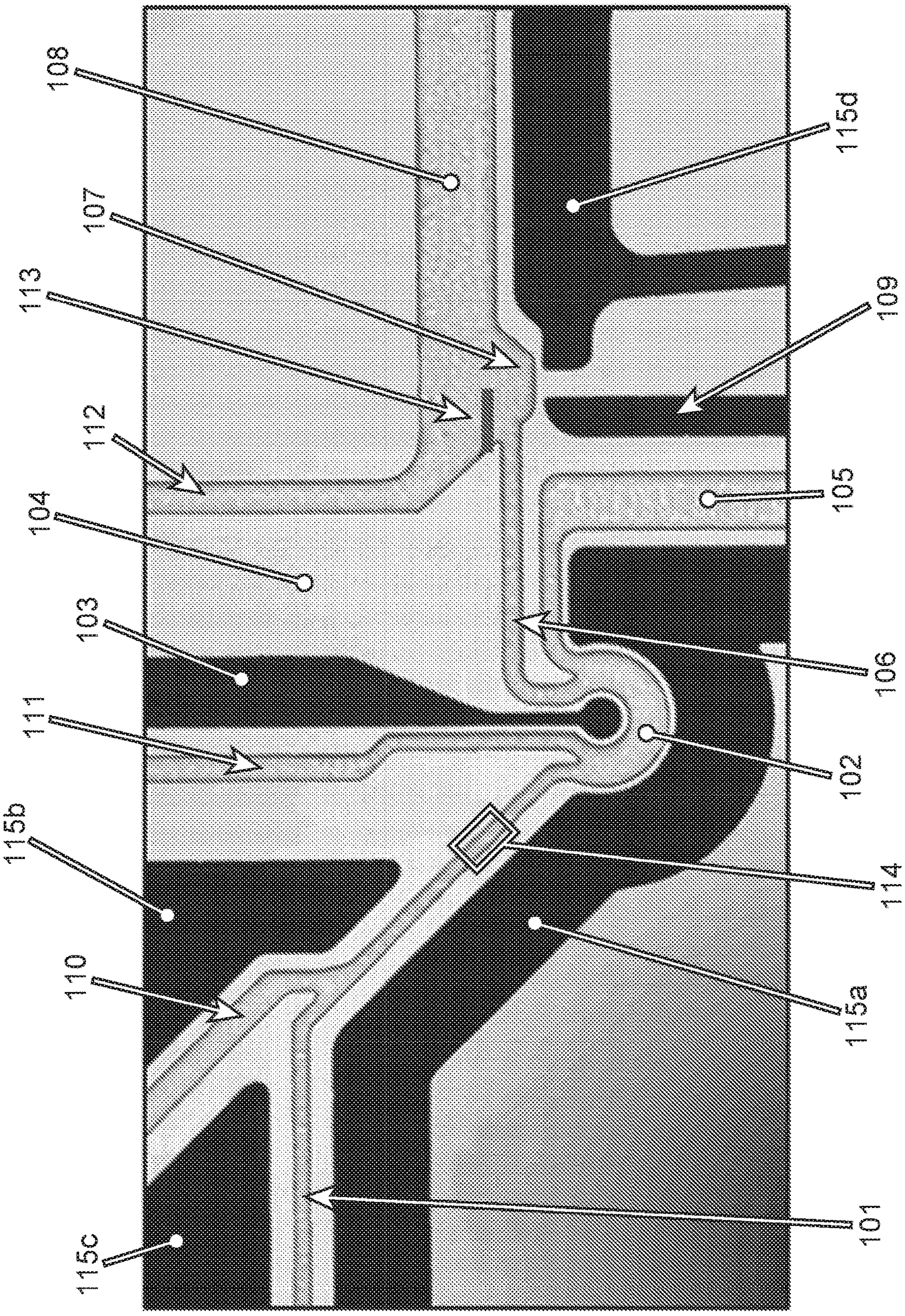
FIG. 2 provides an image of a microfluidic device having a spacer fluid channel, a bias fluid channel, a laminating oil inlet channel, a concentric sorter channel, a flow divider, and a recess according to embodiments of the present disclosure.
Figure 3:
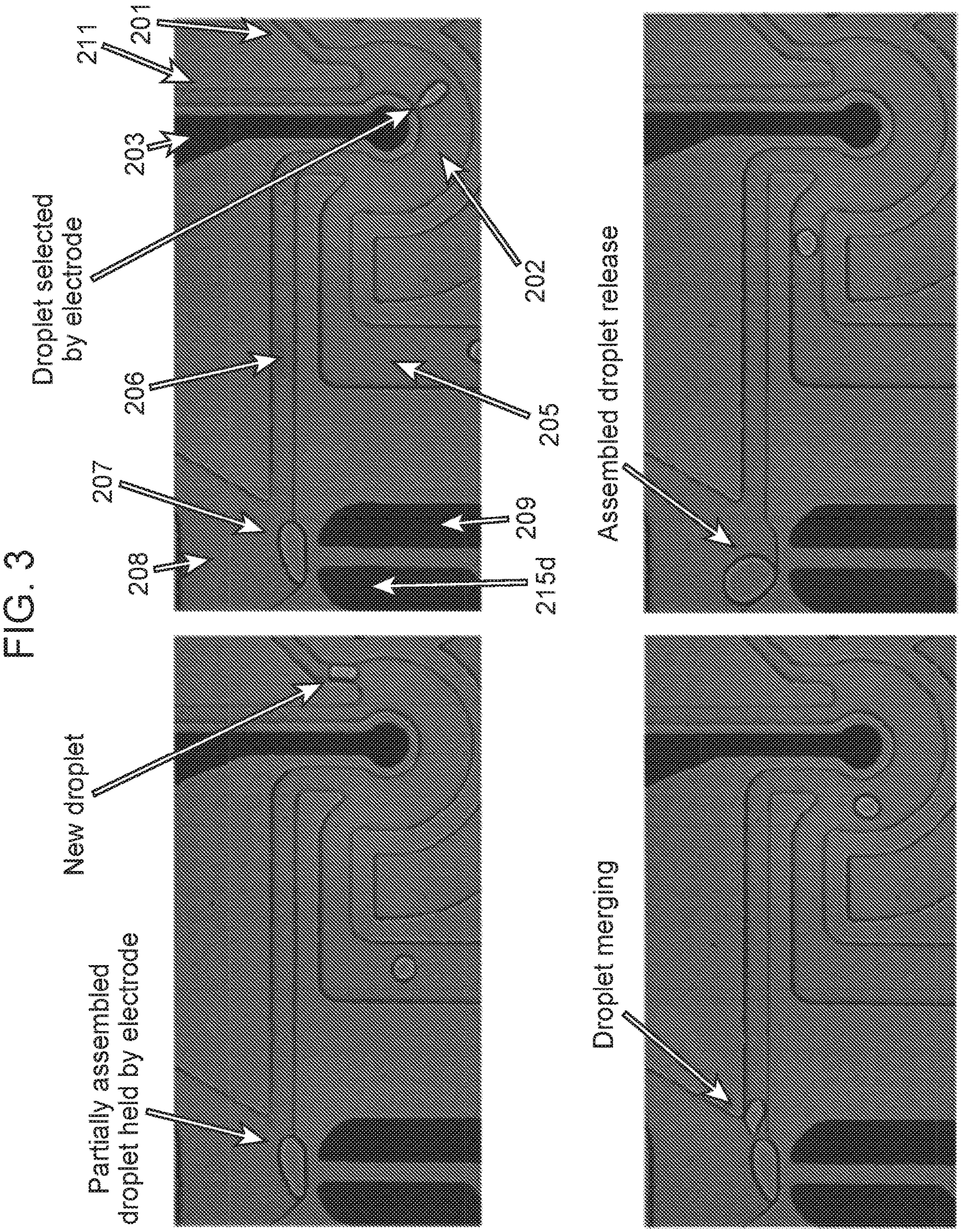
FIG. 3 provides images of a microfluidic device having a concentric sorter channel, a recess, and an approximately triangular downstream region according to embodiments of the present disclosure.

FIG. 2 presents an additional, non-limiting, simplified, schematic representation of one type of a device and method according to the present disclosure In some cases, the discrete entity merger region includes a recess, e.g. as shown as recess 107 in FIG. 2. In some cases, the discrete entity merger region includes a flow divider, e.g. as shown as flow divider 113 in FIG. 2. In some cases, the device further includes a laminating oil inlet, e.g. as shown as laminating oil inlet 112 in FIG. 2. In some cases, the trapping element includes two electrodes that have a significantly different shape from one another, e.g. as shown as electrodes 109 in FIG. 2. In some cases, the trapping element includes two electrodes that produce a region of high electric field gradients that extends into the microfluidic channel. In some cases, the discrete entity merger region includes a change in the angle of flow between an adjacent upstream region and the discrete entity merger region, e.g. as shown in FIG. 3.

In some cases, the device further includes a spacer fluid inlet. As an example, the device in FIG. 2 includes spacer fluid channel 110 in fluid communication with the inlet channel 101. The spacer fluid channel can be configured such that flowing spacer fluid through the spacer fluid channel causes spacer fluid to be located between two discrete entities flowing through the inlet channel, thereby maintaining or increasing the distance between the two discrete entities, thereby allowing each of the two discrete entities to be independently sorted or not sorted.

In some cases, the device further includes a bias fluid inlet. As an example, the device in FIG. 2 includes bias fluid channel 111 in fluid communication with sorter channel 102. The bias fluid channel can be configured such that flowing bias fluid through the bias fluid channel will cause a discrete entity to move closer to a second side wall of the sorter channel and farther away from a first side wall of the sorter channel Thus, as an example, the spacer fluid inlet 111 would cause the discrete entity to move closer to the wall of the inlet channel that is closer to the bottom of the figure, and further away from the wall closer to the top of the figure. As such, one or more bias fluid channels can be configured such that a discrete entity will preferentially flow to a first outlet location or a second outlet location in the absence of a force from a sorting element. In some cases, the bias fluid inlet channel can be configured such that a discrete entity will preferentially flow to a second outlet channel in the absence of a dielectrophoretic force from a sorting electrode. As an example, the bias fluid inlet 111 in FIG. 2 causes a discrete entity to preferentially flow to second outlet channel 105 in the absence of a force exerted on the discrete entity by the sorting electrodes 103.

In some cases, the device includes a detector configured to detect a discrete entity in the input channel, wherein the microfluidic device is configured to sort a discrete entity in the sorting channel based on the detection by the detector. As an example, FIG. 2 shows an embodiment in which a discrete entity in detection region 114 of inlet channel 101 can be detected by a detector, after which sorting electrodes 103 can sort the discrete entity into the first outlet channel 104 or the second outlet channel 105.

The FIG. 2 devices also includes shielding electrodes 115*a*, 115*b*, 115*c*, and 115*d*. As used herein, the term “shielding electrode” is used interchangeably with “moat electrode”. Each shielding electrode can be configured to perform one or more functions including: at least partially shielding discrete entities from undesired electromagnetic fields, assisting with the sorting of discrete entities, and assisting with the trapping of discrete entities.

As such, as used herein, shielding electrodes can also be referred to as sorting electrodes or trapping electrodes if such electrodes are configured to participate in the sorting or trapping of discrete entities. Hence, shielding electrode 115*a* can also be referred to as a sorting electrode if it is configured to form a bipolar electrode pair with sorting electrode 103 to facilitate the sorting of discrete entities. Similarly, shielding electrode 115*d* can also be referred to as a trapping electrode if it is configured to form a bipolar electrode pair with trapping electrode 109 to facilitate the trapping of discrete entities.

In some cases, a shielding electrode can generate an electromagnetic field such that discrete entities in the device is at least partially shielded from undesired electromagnetic fields. Such undesired electromagnetic fields can originate from outside the microfluidic device or from within the microfluidic device. In some cases, the undesired electromagnetic fields are those fields that are not generated by a sorting electrode or by a trapping electrode. By at least partially shielding discrete entities in the microfluidic device, the shielding electrodes can inhibit the unintended merging of discrete entities, i.e. merging of discrete entities outside the discrete entity merger region. In some cases, shielding electrodes 115*a*, 115*b*, and 115*c* can be used to at least partially shield discrete entities from electromagnetic fields that are not generated by the sorting electrode or the trapping electrode.

In some cases, shielding electrodes can assist with the sorting of discrete entities. As an example, shielding electrode 115*a* can interact with sorting electrode 103 in order to facilitate sorting, e.g. by forming a bipolar electrode pair with sorting electrode 103. In some cases, sorting electrode 103 can be the charged electrode, e.g. positively charged, and shielding electrode 115*a* can be a ground. Stated in another manner, shielding electrode 115*a* can be configured to influence the shape of the electromagnetic field generated by sorting electrode 103 in order to facilitate sorting.

In some cases, shielding electrodes can assist with the trapping of discrete entities. As an example, shielding electrode 115*d* can interact with trapping electrode 109 in order to facilitate trapping, e.g. by forming a bipolar electrode pair with trapping electrode 109. In some cases, sorting electrode 109 can be the charged electrode, e.g. positively charged, and shielding electrode 115*d* can be a ground. Stated in another manner, shielding electrode 115*d* can be configured to influence the shape of the electromagnetic field generated by trapping electrode 109 in order to facilitate sorting.

In some cases, one or more of the shielding electrodes are separate elements, e.g. all the shielding electrodes are separate elements. In some cases, one or more of the shielding electrodes are directly electrically connected. In some cases, one or more of the shielding electrodes are different regions of a single electrode, e.g. part of a single piece of metal. In some cases, one or more of the shielding elements are attached to ground.

As shown in FIG. 2, in some cases, the device includes one or more shielding electrodes. In some cases, the device includes zero shielding electrodes, e.g. discrete entities are sorted using a single sorting electrode and the discrete entities are trapped using a single trapping electrode.

As such, discrete entities are sorted and selectively combined within a microfluidic device, i.e., without leaving the microfluidic device. Stated in another manner, the discrete entities are sorted and combined without leaving microfluidic sized channels and regions.

In addition, the present disclosure provides examples of specific elements and steps that can be used with the described devices, systems, and methods. As reviewed above, the trapping element and the sorting element can be electrodes that exert a dielectrophoretic force on the discrete entity. In some cases, the electrodes are microfluidic channels containing a conductive material, e.g. salt water, liquid metal, molten solder, or a conductive ink to be annealed later. In some cases, the electrodes are patterned on the substrate of the microfluidic device, e.g. a patterned indium tin oxide (ITO) glass slide. In some cases, the trapping element includes two electrodes. In some cases, the trapping element is a selectively actuatable bipolar droplet trapping electrode. In some cases, the sorting element includes two electrodes. In some cases, the sorting element includes a selectively actuatable bipolar droplet sorting electrode.

In some cases, the sorting channel includes a partial height flow divider, as further described below. In some cases, the sorting channel has a concentric or essentially concentric flow path and a portion of the sorting electrode is positioned at the center of the arc of the concentric or essentially concentric flow path, as further described below.

In some cases, the discrete entity includes a particle, e.g. a cell. In some cases, the discrete entity includes a chemical reagent, e.g. a lysing agent or a PCR reagent. In some cases, the discrete entity includes both a cell and a chemical reagent. In some cases, the discrete entity includes a fluorescently tagged cell.

In some cases, the sorting is passive sorting. In some cases, the sorting is active sorting, i.e., the sorting element sorts a discrete entity into one of at least two locations based on a detected property of the discrete entity or a component within the discrete entity. In some cases, the detected property is an optical property and the device further includes an optical detector, e.g. an optical detector configured to detect an optical property of a discrete entity or a component within in the inlet channel. In some cases, the optical property is fluorescence and the device further includes a source of excitation light. In some cases, the sorting is based on the detected fluorescence of a fluorescent tag on a cell in the discrete entity.

In some cases, the discrete entity merger region can include structural elements that are configured to aid in the trapping and combination of discrete entities therein. In some cases, such structural elements are configured to aid in such trapping and combining by changing the speed or direction of the flow of fluid through an area of the discrete entity merger region.

The present disclosure also provides methods of using systems that include a microfluidic device, e.g. as described above, and one or more additional components, e.g. (a) a temperature control module operably connected to the microfluidic device; (b) a detector configured to detect a discrete entity in the input channel, wherein the microfluidic device is configured to sort a discrete entity in the sorting channel based on the detection by the detector; (c) an incubator operably connected to the microfluidic device or a discrete entity maker; (d) a sequencer operably connected to the microfluidic device; (e) a device configured to make a plurality of discrete entities, i.e. a discrete entity maker, wherein the device is located within the microfluidic device or separately from the microfluidic device; and (f) one or more conveyors configured to convey a particle, e.g. a cell, or a discrete entity, wherein the discrete entity can contain a particle in some cases, between any combination of: the incubator, device configured to make a plurality of discrete entities, the microfluidic device, the sequencer.

In some cases, the methods include controlling the temperature of the microfluidic device using a temperature control module operably connected to the microfluidic device. In some cases, the methods include detecting a discrete entity in the input channel of the microfluidic device, e.g. detecting an optical property of the discrete entity or a component therein, and sorting the discrete entity based on the detecting. In some cases, the method includes incubating cells in an incubator that is operably connected to discrete entity maker or a microfluidic device. In some cases, the method includes making discrete entities with a discrete entity maker, wherein the discrete entity maker is located within the microfluidic device or separate from the microfluidic device. In some cases, the method includes moving a discrete entity between components of the system, e.g. with one or more conveyors.

The present disclosure also provides steps that can be performed after the release of a combined microfluidic droplet from a discrete entity merger region. In some cases, the method includes recovering a component, e.g. a cell, a chemical compound or a combination thereof, from the combined discrete entity. In cases where a combined discrete entity includes one or more cells, the one or more cells can be analyzed, e.g. genetic information therein can be sequenced using a sequencer. The genetic information can include, e.g. DNA and RNA. In some cases, the sequencing includes PCR. In some cases, the analysis of a discrete entity can include mass spectrometry. In some cases, the method includes printing the combined discrete entity onto a substrate, e.g. as described in US 2018/0056288, which is incorporated herein by reference for its disclosure of printing a discrete entity onto a substrate.

Figure 4:
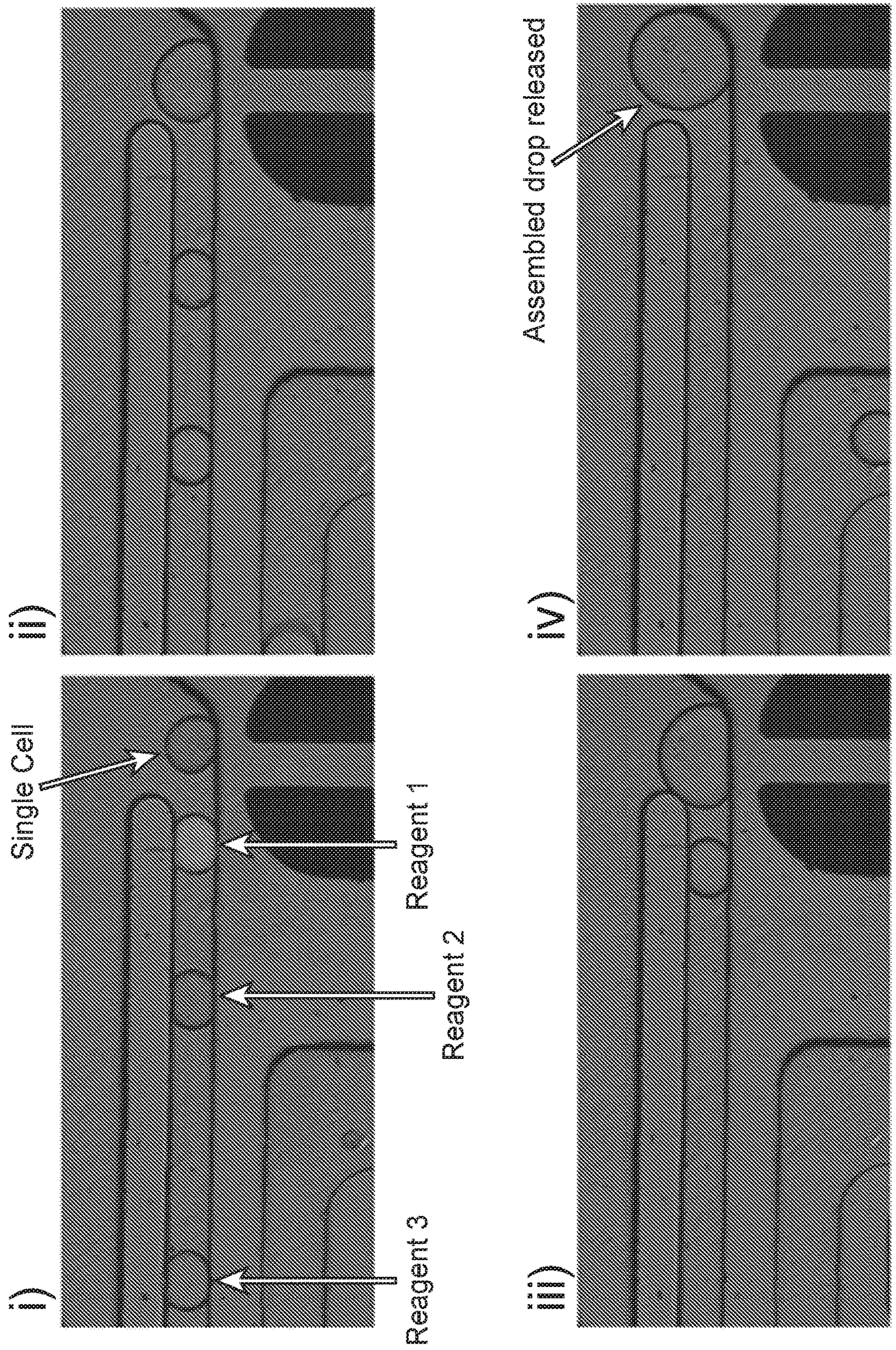
FIG. 4 provides images showing an example of combining four discrete entities using a microfluidic device, wherein each discrete entity contains a different reagent or a single cell according to embodiments of the present disclosure.

The present disclosure also provides a method of selectively performing reactions by selectively combining two or more discrete entities, as described above, wherein the reaction occurs between one or more components from each discrete entity. Such components can be one or more cells, one or more products derived from a cell, one or more reagents, or a combination thereof. In some cases, the one or more products derived from a cell include cell lysate, DNA, RNA, or a combination thereof. As an example, FIG. 4 shows the combination of four discrete entities, wherein three of the discrete entities each contain a different reagent and the fourth discrete entity contains a single cell. As such, FIG. 4 shows that a microfluidic device as described herein can be used to selectively combine different discrete entities, resulting in the formation of a combined discrete entity, e.g., that contains the three reagents and the cell.

As such, the method of selectively performing reactions can include the combination of two or more discrete entities, e.g. three or more and four or more. In some cases, the number of discrete entities that contain at least one cell is zero discrete entities, one discrete entity, two discrete entities, or three or more discrete entities. In some cases, the number of cells in a discrete entity is one.

In some cases, the method includes repeating the selective combination of discrete entities, e.g. performing the selective combination two or more times, three or more times, or four or more times.

The present methods allow for the selective combination of two or more discrete entities without the need to accurately time the release or to accurate time the sorting of the two or more discrete entities. As such, in some cases, a first discrete entity is trapped in the discrete entity merger region before a second discrete entity to be combined therewith has entered the outlet channel after being sorted. In some cases, the second discrete entity has not entered the sorter channel, has not entered the inlet channel, or has not even been made when the first discrete entity is trapped in the discrete entity merger region.

The present methods also allow for the more efficient use of raw materials in constructing desired combined discrete entities. As an example, a desired combined discrete entity might include one cancer cell and one immune cell. As such, a discrete entity maker might be used to make a first group of discrete entities that each contain a cancer cell. However, only about 10% of such first discrete entities might include a cancer cell. Similarly, only about 10% of the second group of discrete entities might contain an immune cell. Thus, the random combination of one first discrete entity with one second discrete entity would only result in about 1% of the combined discrete entities having the desired cancer cell and immune cell.

In contrast, the present methods allow for the sorting of discrete entities, e.g. based on whether they contain a cancer cell or an immune cell or neither cell type, and the selective combination of only those discrete entities that contain the desired components. As such, the present methods can generate combined discrete entities such that the fraction of combined discrete entities with a cancer cell and an immune cell is higher than 1%, i.e. the value expected based on random combinations. If the desired combined entity contained three components, the expected value for random combination could be even lower than 1%.

Figure 8:
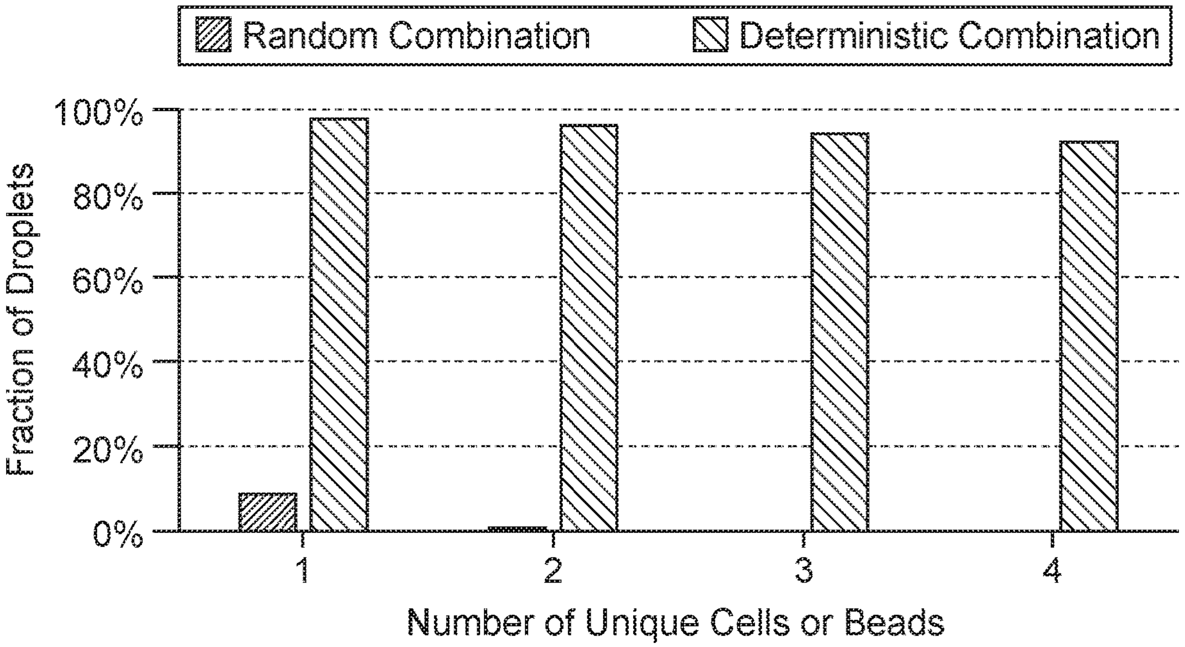
FIG. 8 provides a graph showing the efficiency of loading unique bead and/or cell combinations into microfluidic droplets. Random combination is calculated from Poisson statistics with an average occupancy of 10% of each unique object. Deterministic combination is calculated from 98% combinatorial efficiency from published results of similar technologies.
Figure 9:
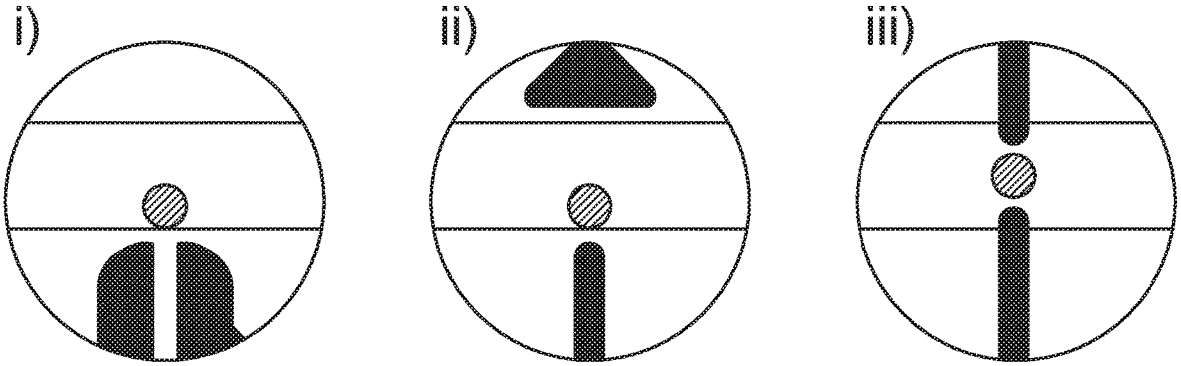
FIG. 9 provides a schematic showing example configurations for trapping a discrete entity. Panel i) shows a bipolar electrode pair embedded in the same side wall of a channel Panel ii) shows a bipolar electrode pair embedded on opposite sides of channel Panel iii) shows bipolar electrode pair embedded in the floor or ceiling of a channel.
Figure 10:
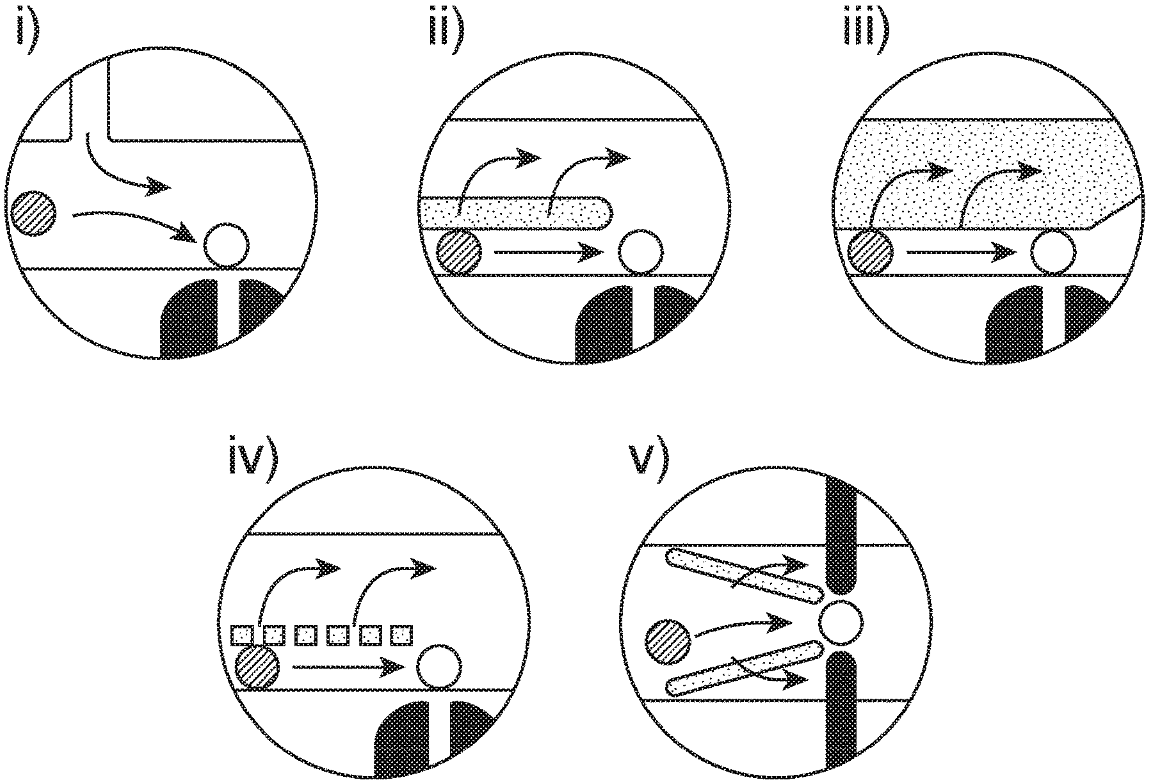
FIG. 10 provides a schematic showing example configurations for directing discrete entities to a discrete entity merger region. Panel i) shows application of a lamination flow to confine the laminar flow containing the droplet to the side wall of the channel Panel ii) shows a partial height flow divider that allows fluid, but not droplets to enter the center portion of the channel Panel iii) shows a configuration where a groove of similar height to the droplet dimensions is patterned near the side wall of a channel, while the rest of the channel is constructed with a reduced height to exclude droplets. Panel iv) shows a porous flow divider that allows fluid, but not droplets to enter the center portion of the channel. Panel v) shows a partial height flow dividers that direct droplets to a trap at the center of the microfluidic channel.
Figure 11:
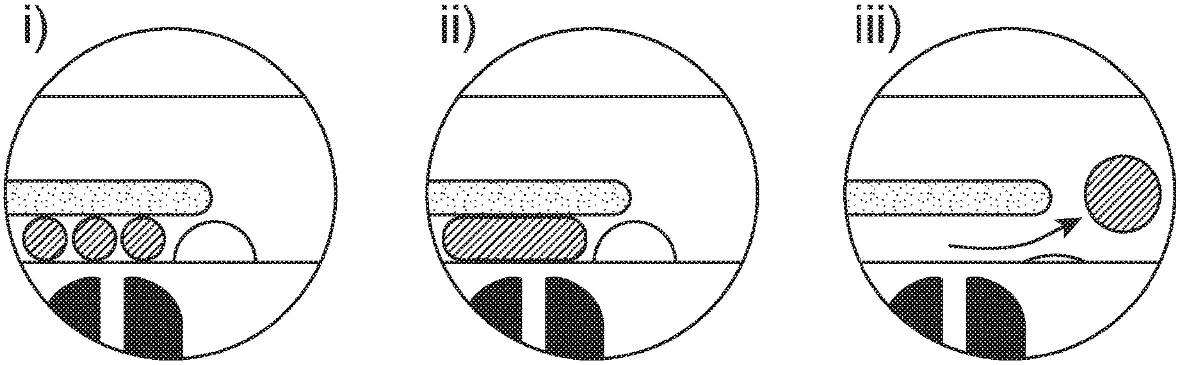
FIG. 11 provides a schematic showing an example embodiment wherein trapping is facilitated by a mechanical valve. Panel i) shows an initial stage where the discrete entities are trapped by the valve. Panel ii) shows a second stage wherein the discrete entities have been combined, e.g. due to electrical, chemical, or other means. Panel iii) shows a third stage where the combined discrete entity is released by opening the valve and carried downstream.
Figure 12:
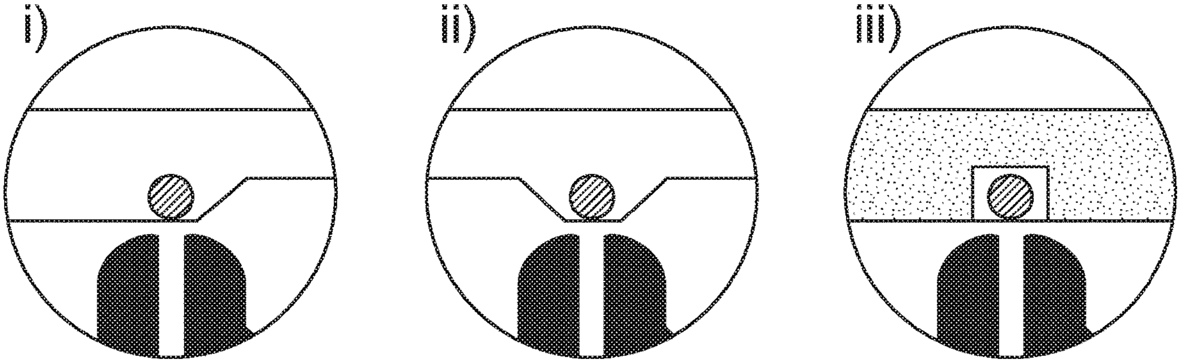
FIG. 12 provides a schematic showing example embodiments with different channel geometries in proximity to an electromagnetic trapping element. Panel i) shows a discrete entity merger region upstream of a bend in the channel wall. Panel ii) shows a discrete entity merger region in a lateral facet in the channel wall. Panel iii) shows a discrete entity being trapped in a region that is vertically taller than the main channel.
Figure 13:
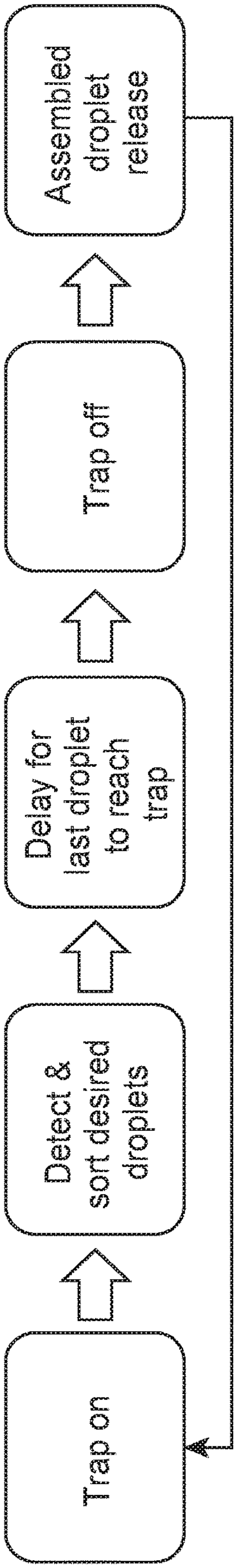
FIG. 13 provides a flow chart showing an example of the order of operations for selectively combining discrete entities and releasing the combined discrete entity.
Figure 14:
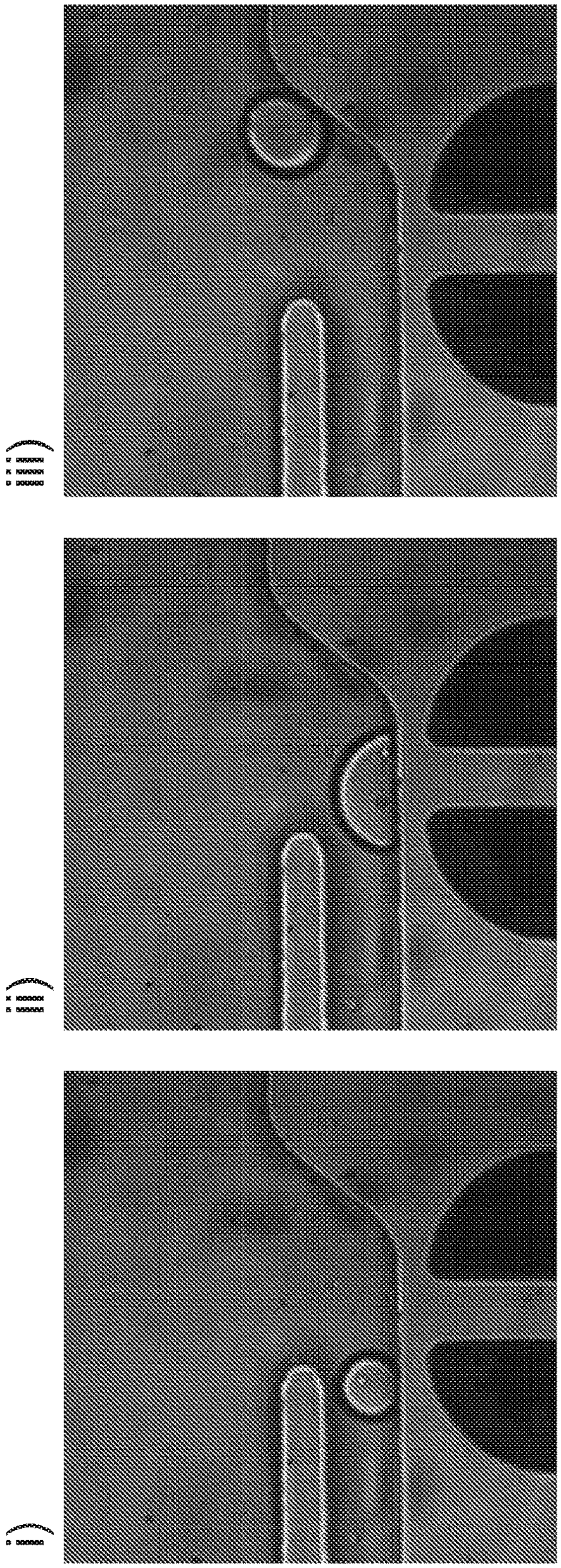
FIG. 14 provides images showing an example combination of discrete entities containing beads and cells. Panel i) shows trapping a discrete entity containing a single cell. Panel ii) shows a combined discrete entity after the addition of a single rigid bead. Panel iii) shows the release of the combined discrete entity to downstream.
Figure 15:
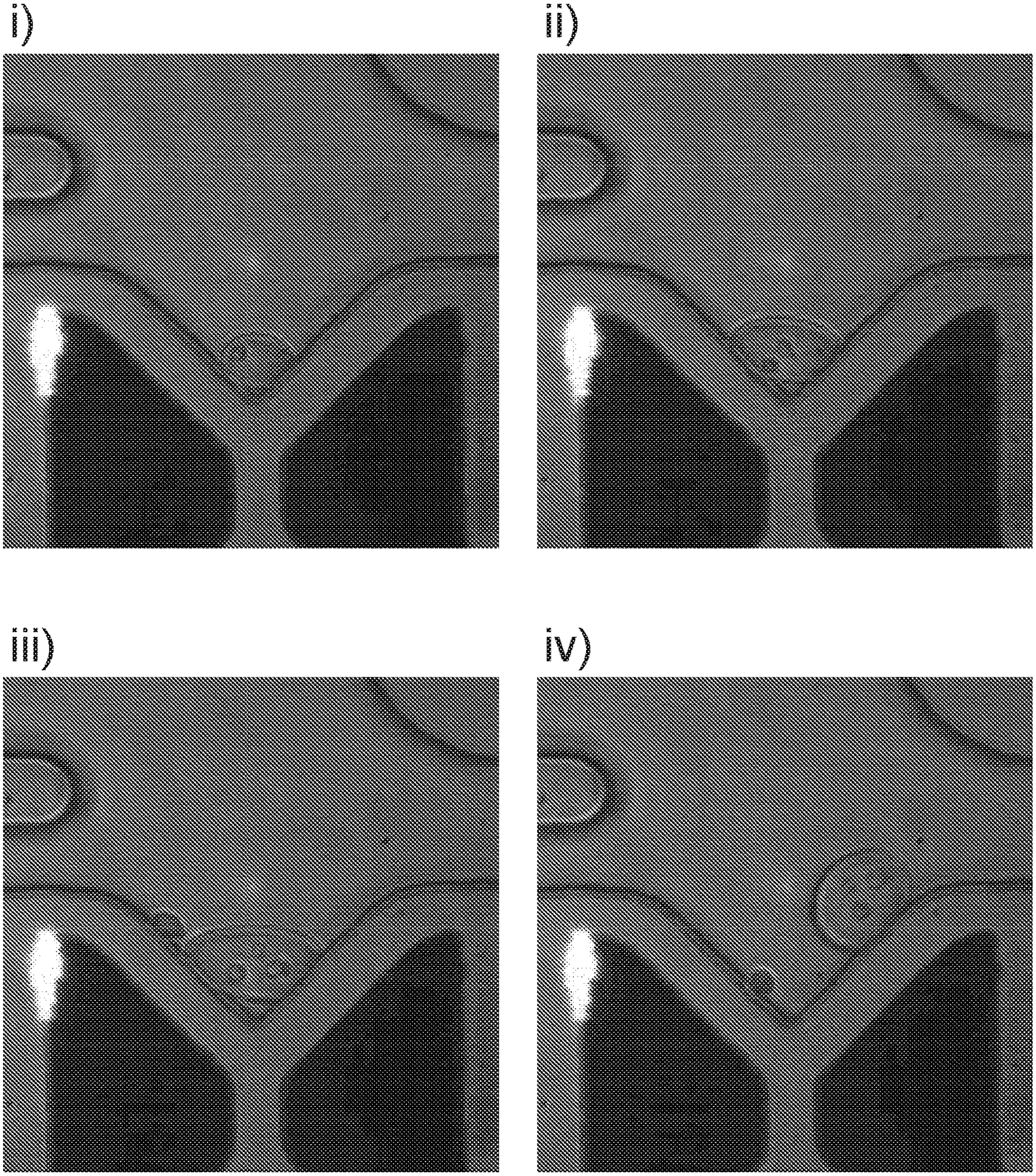
FIG. 15 provides images showing an example combination of discrete entities containing cells. Panel i) shows delivery of a first cell in a first discrete entity to the discrete entity merger region. Panel ii) shows the region after addition of a second cell. Panel iii) shows the region after addition of a third cell. Panel iv) shows release of the combined discrete entity downstream.
Figure 16:
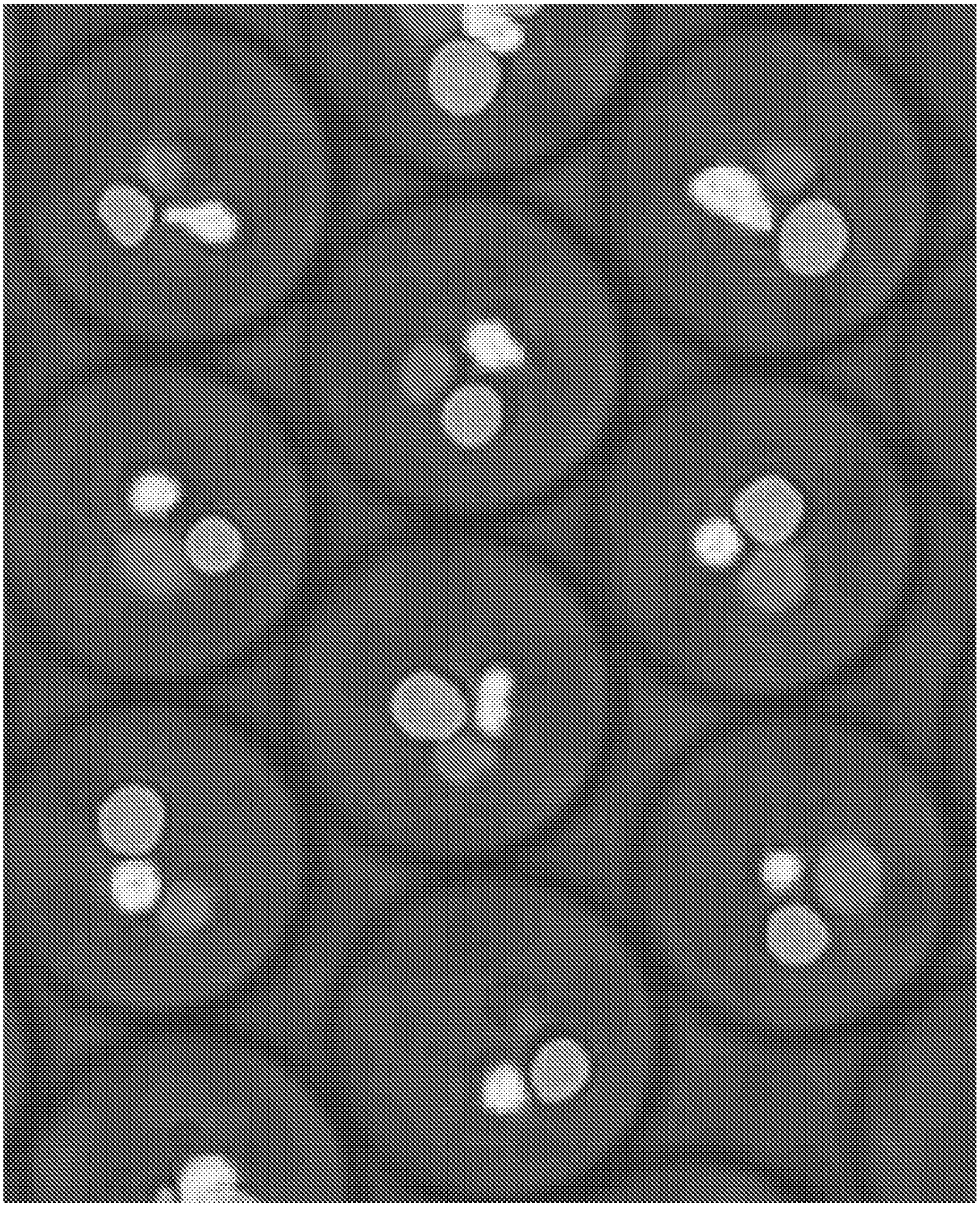
FIG. 16 provides images and graphs showing the analysis of combined discrete entities. Panel i) shows an image of combined discrete entities having three types of cells. Panel ii) shows cytokine (IL-2) secretion from stimulated immune cells using a bead-based immunoassay.
Figure 16:
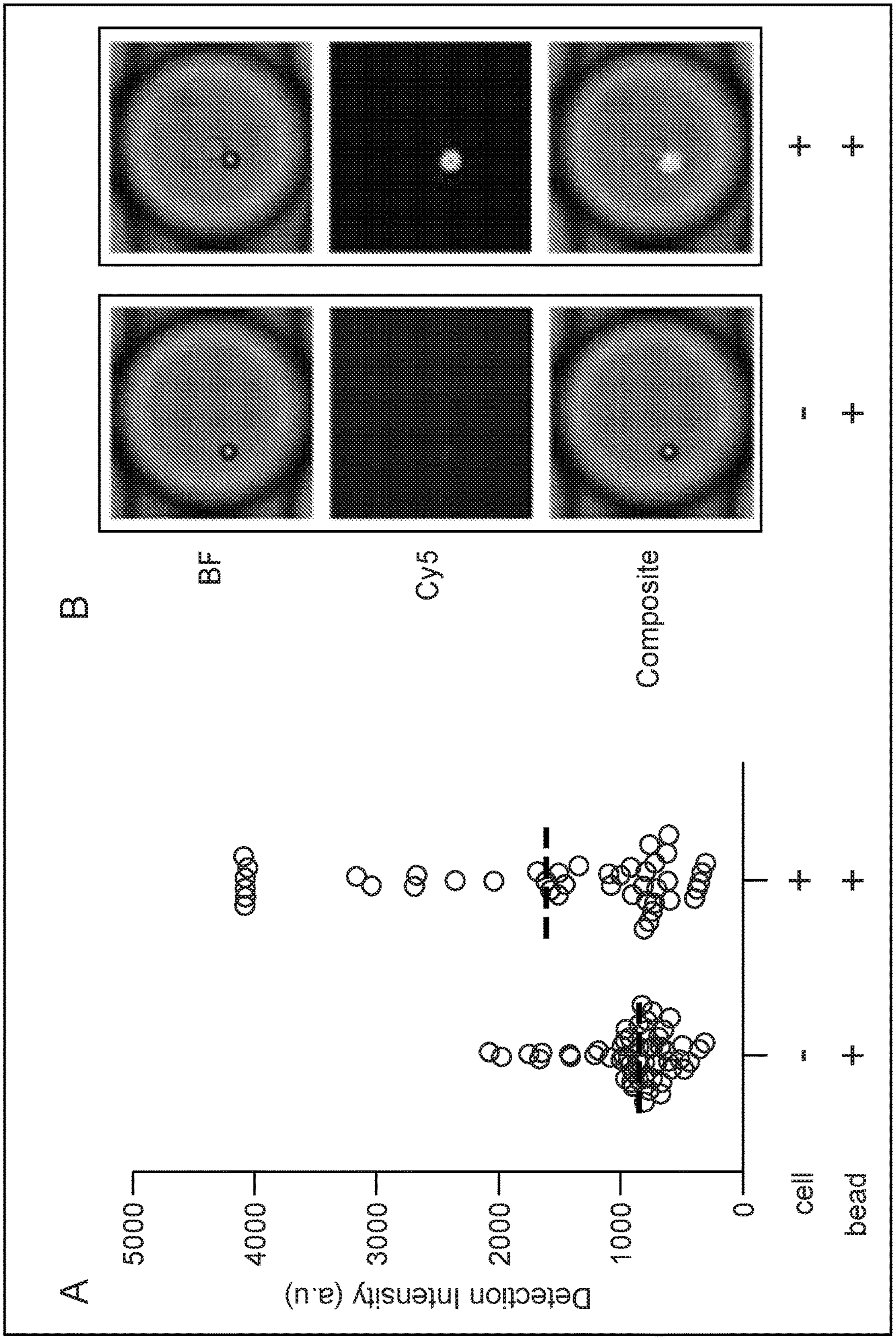
Figure 17:
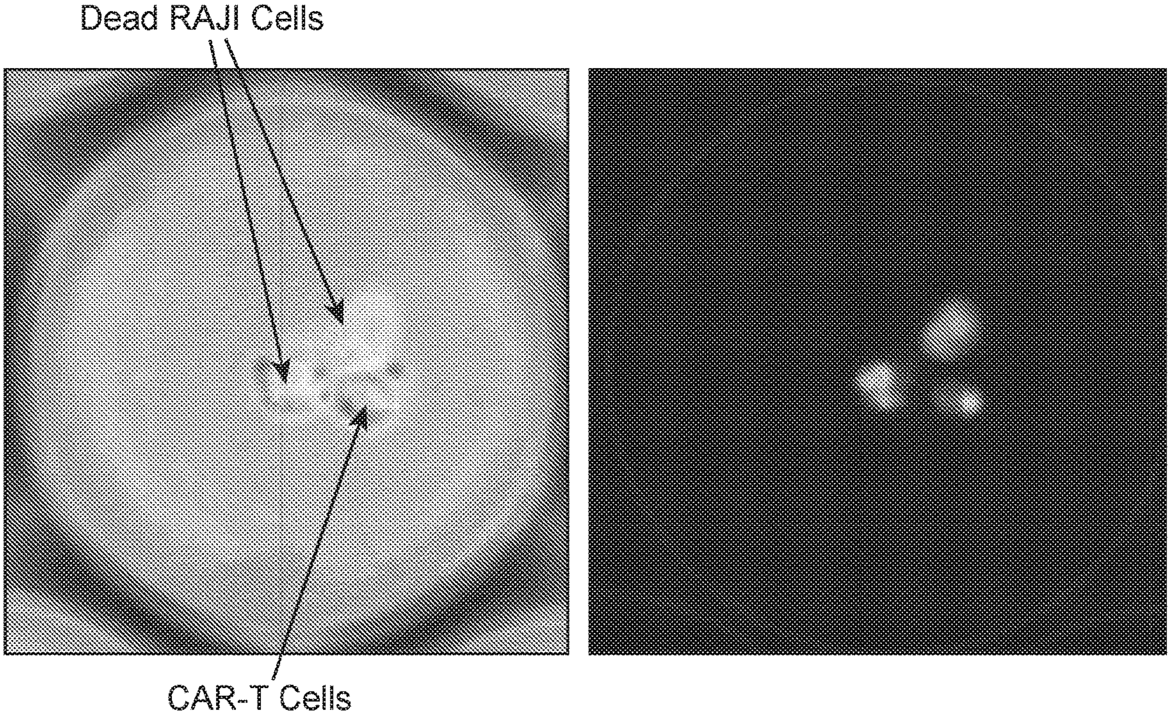
FIG. 17 provides images and graphs showing the results of a cell-cell interaction experiment using chimeric antigen receptor (CAR) T cells, target cells (RAJI) and a cell death readout.
Figure 17:
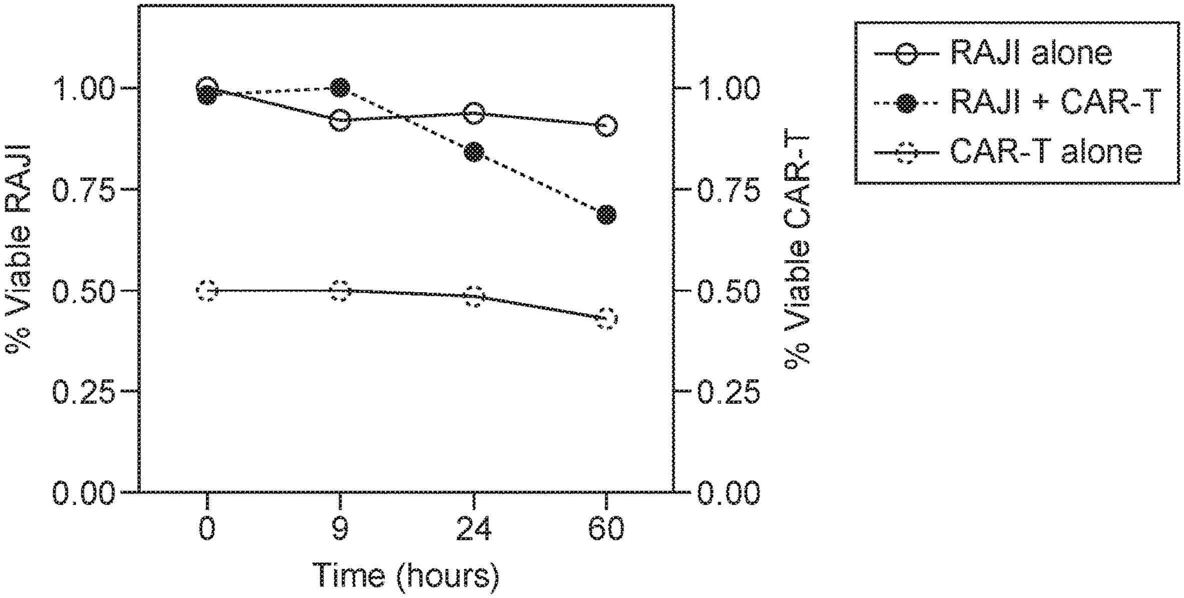
Figure 18:
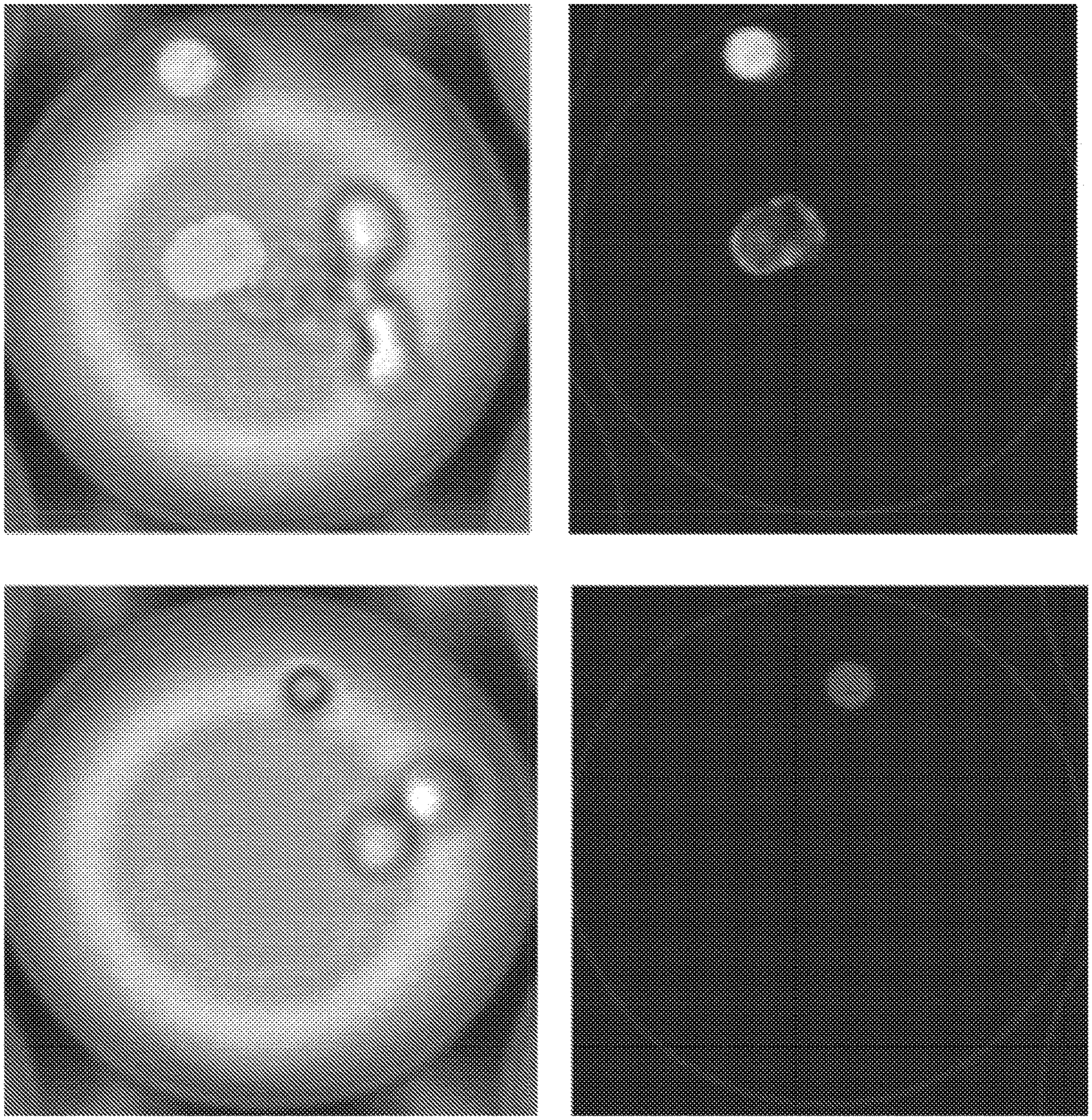
FIG. 18 provides images showing the results of coupled cell death and cytokine (IFg) assays on combined CAR-T and RAJI cells after incubation.
Figure 19:
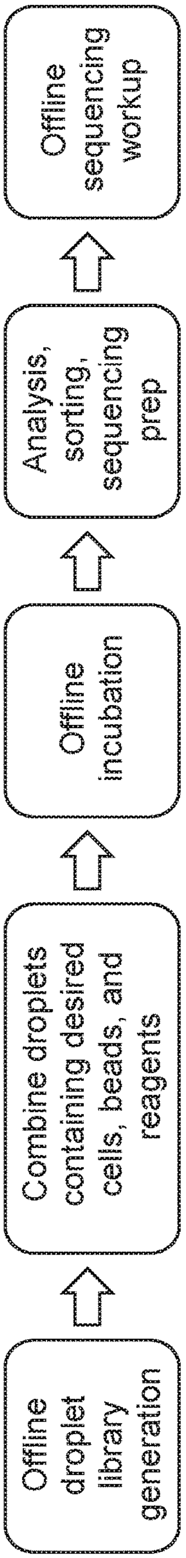
FIG. 19 provides a flow chart showing an example multi-omics workflow for making, sorting, and combining discrete entities followed by incubation, analysis, and sequencing.
Figure 20:
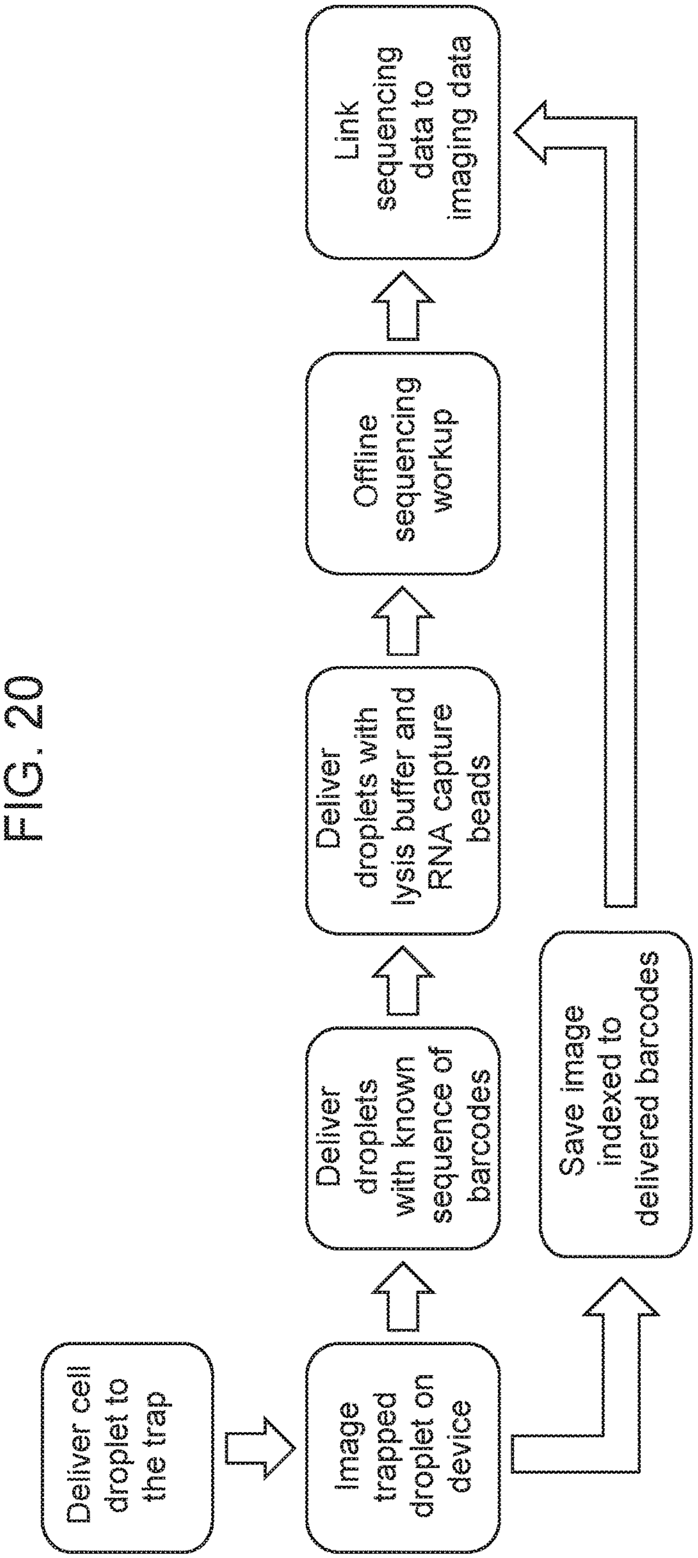
FIG. 20 provides a flow chart showing an example of an integrated imaging and real time barcoding workflow.

As an example, FIG. 8 shows the efficiency of loading unique bead and/or cell combinations into microfluidic droplets. Random combination is calculated from Poisson statistics with an average occupancy of 10% of each unique object. Deterministic combination is calculated from 98% combinatorial efficiency from published results of similar technologies.

Hence, in some cases, the fraction of combined discrete entities with the desired contents is 1% or higher, e.g. 2% or higher, 5% or higher, 10% or higher, 25% or higher, 50% or higher, 75% or higher, or 90% or higher.

In some cases, the method involves creating 5 or more combined discrete entities per minute, including 10 or more, 25 or more, 50 or more, 75 or more, 100 or more, 150 or more, 200 or more, or 300 or more. In some cases, the method involves making 300 or more combined discrete entities per hour, including 1,500 or more, 3,000 or more, 4,500 or more, 6,000 or more, 9,000 or more, 12,000 or more, or 21,000 or more.

In some cases, the sorting step is performed such that discrete entities are sorted at a rate of 0.01 Hz or more, e.g. 0.1 Hz or more, 1 Hz or more, 10 Hz or more, 100 Hz or more, 1 kHz or more, 10 kHz or more, or 30 kHz or more. Sorting with the dielectrophoretic sorters described herein can achieve sorting at a rate of up to at least 30 kHz. In some cases, an electromagnetic sorter is used instead of a mechanical sorter, e.g. a valve, to allow for faster sorting rates.

In some cases, the trapping and combining steps are performed such that a combined discrete entity is formed or released at a rate of 0.1 Hz or more, such as 1 Hz or more, 10 Hz or more, 100 Hz or more, or 1,000 Hz or more. The methods described herein can achieve formation of a combined discrete entity at a rate of up to at least 1,000 Hz. In Example 10 discussed below, 17,500 droplets assembled in 85 minutes, yielding a rate of approximately 3.4 Hz. In some cases, the method can continuously assemble 1,000 or more droplets without stopping, such as 10,000 or more or 100,000 or more.

In some cases, a discrete entity is flowed such that it reaches the discrete entity merger region between 0.1 ms to 1,000 ms after being sorted, such as between 1 ms and 100 ms, between 2 ms and 50 ms, and between 5 ms and 25 ms. In some cases, the first outlet channel is between 0.2 mm long and 5 mm long. In some cases, the first outlet channel has a dimension, i.e. width or height or diameter, of between 5 μm and 500 μm, such as between 10 μm and 100 μm.

In some cases, the carrier fluid containing the discrete entities is flowed into the inlet channel at a rate of between 1 μl per hour and 10,000 μl per hour, such as between 10 μl per hour and 1,000 μl per hour, 25 μl per hour and 500 μl per hour, and between 50 μl per hour and 250 μl per hour.

In some cases, the spacer fluid is injected at a rate of between 100 μl per hour and 20,000 μl per hour, such as 500 μl per hour and 5,000 μl per hour. In some cases, the bias fluid is injected at a rate of between 100 μl per hour and 20,000 μl per hour, such as 500 μl per hour and 5,000 μl per hour.

In some cases, the fluid used to create cell-containing discrete entities has a concentration of between 1,000 cells per ml and 10,000,000 cells per ml, such as between 10,000 cells per ml and 1,000,000 cells per ml, and between 50,000 cells per ml and 200,000 cells per ml.

In some cases, the discrete entities have a volume between 1 pl and 10,000 pl, such as between 10 pl and 1,000 pl, or between 50 pl and 500 pl.

In some cases, the one or more cells from a combined discrete entity are cultured for at least 30 minutes or more, such as 1 hour or more, 6 hours or more, 12 hours or more, 24 hours or more, 3 days or more, or 7 days or more.

In some cases, the device can continuously operate by selectively combining discrete entities for 10 minutes or more, such as 30 minutes or more, 45 minutes or more, 90 minutes or more, or 180 minutes or more. In some cases, the device can make at least 100 combined discrete entities while continuously operating, such as 1,000 combined discrete entities or more, 10,000 combined discrete entities or more, or 100,000 combined discrete entities or more.

Making Discrete Entities

As reviewed above, in some cases the methods include making one or more discrete entities, e.g. with a discrete entity maker. In such cases, the discrete entity maker can be part of the microfluidic device or separate from the microfluidic device as otherwise described herein. If the discrete entity maker is separate from the microfluidic device, the discrete entity maker can be operably connected to the microfluidic device, e.g., such that discrete entities can flow from the maker to the microfluidic device, or the discrete entities can be moved to the microfluidic device without the discrete entity maker and microfluidic device being operably connected.

The systems and devices can include one or more discrete entity makers configured to form discrete entities from a fluid stream. Suitable discrete entity makers include selectively activatable droplet makers and the methods may include forming one or more discrete entities via selective activation of the droplet maker. The methods may also include forming discrete entities using a droplet maker, wherein the discrete entities include one or more entities which differ in composition.

In some cases, the discrete entity maker comprises a T-junction and the method includes T-junction drop-making. In some cases, making the discrete entities includes step emulsification. In some cases, the discrete entity maker is made, in part or in whole, of a polymer. In some cases, one or more surfaces of the discrete entity maker are coated with a fluorosilane, e.g. such a discrete entity maker can be used when fluorinated fluids are passed through the discrete entity maker.

In some cases when multiple types of discrete entities are made, e.g., discrete entities that contain different contents, the contents can affect the ability of the discrete entity maker to successfully make the discrete entities. As such, in some cases, different conditions for the discrete entity maker are used to make a first group of discrete entities with first contents than for making a second group of discrete entities with second contents.

Aspects of the disclosed methods may include making discrete entities using one or more cells from a biological sample. In such cases, each discrete entity may contain zero, one, or more than one cell. In some cases, such discrete entities can be made by incorporating the biological sample, cells from the biological sample, lysate from cells of the biological sample, or any other sample derived from the biological sample into a mixed emulsion. In some cases, the biological sample can be whole blood. In some cases, the method further includes separating one or more components of the biological sample or otherwise processing the biological sample, e.g. via centrifugation, filtration, and the like, before making the discrete entities.

In some cases, after the making of the discrete entities but before introducing the discrete entities to an inlet channel of a microfluidic device as described herein, the discrete entities can be further modified, e.g. by adding a cell, a reagent, a drug, a hydrogel, an extracellular matrix, a bead, a particle, a biological material, media, or a combination thereof. In some cases, the reagent is a primer, a probe, a lysing agent, a surfactant, a detergent, a barcode, or a fluorescent tag. In some cases, the bead is an RNA capture bead. In some cases, the bead is an immunoassay bead. In some cases, the barcode is an oligonucleotide. In some cases, different types of discrete entities are labeled with different types of barcodes, fluorescent tags, or a combination thereof.

Fluorescent tags can be used to image a discrete entity or combined discrete entity in the discrete entity merger region. Fluorescent tags can also be used to identify the particular type of discrete entities that were combined to create a given combined discrete entity. As such, the properties of the combined discrete entity or component thereof can be correlated with the contents that were used to make the original discrete entities. As an example, different types of immune cells can be labeled with different fluorescent tags and incorporated into discrete entities. After such immune cell-containing discrete entities are combined with other discrete entities, e.g. containing cancer cells, the outcome of the combined discrete entities can be observed, e.g. if the immune cell kills the cancer cell or if a cytokine is secreted. In addition, the fluorescent tag can be measured to correlate the outcome with the type of immune cell. In other cases, the outcome being correlated with the fluorescent tag is the results of sequencing, e.g. single cell sequencing. As some of all of the original discrete entities can be labeled with fluorescent tags, the resulting combined discrete entity can have multiple fluorescent tags. In other cases, the combined discrete entity only has one fluorescent tag.

Oligonucleotide barcodes can be used in a similar manner to that of fluorescent tags. Instead of detecting optical fluorescence, however, the oligonucleotide barcodes can be sequenced in order to identify the original discrete entities that formed the combined discrete entity.

Methods and devices which may be utilized in the encapsulating of a component from a biological sample are described in PCT Publication No. WO 2014/028378, the disclosure of which is incorporated by reference herein in its entirety and for all purposes. Encapsulation approaches of interest also include, but are not limited to, hydrodynamically-triggered drop formation and those described by Link, et al., Phys. Rev. Lett. 92, 054503 (2004), the disclosure of which is incorporated herein by reference. Other methods of encapsulating cells into droplets may also be applied. Where desired, the cells may be stained with one or more antibodies and/or probes prior to encapsulating them into drops.

One or more lysing agents may also be added to the discrete entities, e.g., droplets, containing a cell, under conditions in which the cell(s) may be caused to burst, thereby releasing their genomes. The lysing agents may be added after the cells are encapsulated into discrete entities, e.g., microdroplets. Any convenient lysing agent may be employed, such as proteinase K or cytotoxins. In particular embodiments, cells may be co-encapsulated in drops with lysis buffer containing detergents such as Triton X100 and/or proteinase K. The specific conditions in which the cell(s) may be caused to burst will vary depending on the specific lysing agent used. For example, if proteinase K is incorporated as a lysing agent, the discrete entities, e.g., droplets, may be heated to about 37-60° C. for about 20 min to lyse the cells and to allow the proteinase K to digest cellular proteins, after which they may be heated to about 95° C. for about 5-10 min to deactivate the proteinase K.

In certain aspects, cell lysis may also, or instead, rely on techniques that do not involve addition of lysing agent. For example, lysis may be achieved by mechanical techniques that may employ various geometric features to effect piercing, shearing, abrading, etc. of cells. Other types of mechanical breakage such as acoustic techniques may also be used. Further, thermal energy can also be used to lyse cells. Any convenient methods of effecting cell lysis may be employed in the methods described herein as appropriate.

One or more primers may be introduced into the discrete entities, e.g., droplets, for each of the genes, e.g., oncogenes, to be detected. Hence, in certain aspects, primers for all target genes, e.g., oncogenes, may be present in the discrete entity, e.g., droplet, at the same time, thereby providing a multiplexed assay. The discrete entities, e.g., droplets, may be temperature-cycled so that discrete entities, e.g., droplets, containing cancerous cells, for example, will undergo PCR. During this time, only the primers corresponding to genes, e.g., oncogenes, present in the genome will induce amplification, creating many copies of these genes, e.g., oncogenes, in the discrete entity, e.g., droplet. Detecting the presence of these PCR products may be achieved by a variety of ways, such as by using FRET, staining with an intercalating dye, or attaching them to a bead. More information on the different options for such detection is also provided herein. The discrete entity, e.g., droplet, may be optically probed, e.g., probed using a laser, to detect the PCR products. Optically probing the discrete entity, e.g., droplet, may involve counting the number of target cells, e.g., tumor cells, present in the initial population, and/or to allow for the identification of the target, e.g., oncogenes, present in each cell, e.g., tumor cell.

Aspects of the subject methods may be used to determine whether a biological sample contains particular cells of interest, e.g., tumor cells, or not. In certain aspects, the subject methods may include quantifying the number of cells of interest, e.g., tumor cells, present in a biological sample. Quantifying the number of cells of interest, e.g., tumor cells, present in a biological sample may be based at least in part on the number of discrete entities, e.g., droplets, in which PCR amplification products were detected. For example, discrete entities, e.g., droplets, may be produced under conditions in which the majority of discrete entities, e.g., droplets, are expected to contain zero or one cells. Those discrete entities, e.g., droplets, that do not contain any cells may be removed, using techniques described more fully herein. After performing the PCR steps outlined above, the total number of discrete entities, e.g., droplets, that are detected to contain PCR products may be counted, so as to quantify the number of cells of interest, e.g., tumor cells, in the biological sample. In certain aspects, the methods may also include counting the total number of discrete entities, e.g., droplets, so as to determine the fraction or percentage of cells from the biological sample that are cells of interest, e.g., tumor cells.

Embodiments of the methods may include modulating the environment of a discrete entity and thereby modulating the contents of the discrete entity, e.g., by adding and/or removing contents of the droplet. Such modulation may include modulating a temperature, pH, pressure, chemical composition, and/or radiation level of an environment of one or more discrete entities. Such modulation may also be of the immediate environment of one or more discrete entities, such as an emulsion in which the discrete entities are provided and/or one or more space, such as a conduit, channel, or container, within a microfluidic device. An immediate environment of a discrete entity which may be modulated may also include a fluid volume, such as a fluid flow, in which the discrete entity is provided. One or more discrete entities may also be stored in a modulated environment.

The composition and nature of the discrete entities, e.g., microdroplets, prepared and or utilized in connection with the disclosed methods may vary. For example, in some embodiments, a discrete entity may include one cell and not more than once cell. In other embodiments, a discrete entity may include a plurality of cells, i.e., two or more cells. In some aspects, discrete entities according to the present disclosure may include a nucleic acid or a plurality of nucleic acids. In some cases, the discrete entities that include a nucleic acid or a plurality of nucleic acids may lack a cell. In some embodiments, as discussed above, discrete entities may include one or more solid and/or gel materials, such as one or more polymers.

In some embodiments, a surfactant may be used to stabilize the discrete entities, e.g., microdroplets. In some cases, the discrete entities or the associated emulsion lack a surfactant. Accordingly, a microdroplet may involve a surfactant stabilized emulsion. Any convenient surfactant that allows for the desired reactions to be performed in the discrete entities, e.g., microdroplets, may be used. In other aspects, a discrete entity, e.g., a microdroplet, is not stabilized by surfactants or particles.

The surfactant used depends on a number of factors such as the oil and aqueous phases (or other suitable immiscible phases, e.g., any suitable hydrophobic and hydrophilic phases) used for the emulsions. For example, when using aqueous droplets in a fluorocarbon oil, the surfactant may have a hydrophilic block (PEG-PPO) and a hydrophobic fluorinated block (Krytox® FSH). If, however, the oil was switched to be a hydrocarbon oil, for example, the surfactant would instead be chosen so that it had a hydrophobic hydrocarbon block, like the surfactant ABIL EM90. In selecting a surfactant, desirable properties that may be considered in choosing the surfactant may include one or more of the following: (1) the surfactant has low viscosity; (2) the surfactant is immiscible with the polymer used to construct the device, and thus it doesn't swell the device; (3) biocompatibility; (4) the assay reagents are not soluble in the surfactant; (5) the surfactant exhibits favorable gas solubility, in that it allows gases to come in and out; (6) the surfactant has a boiling point higher than the temperature used for PCR (e.g., 95° C.); (7) the emulsion stability; (8) that the surfactant stabilizes drops of the desired size; (9) that the surfactant is soluble in the carrier phase and not in the droplet phase; (10) that the surfactant has limited fluorescence properties; and (11) that the surfactant remains soluble in the carrier phase over a range of temperatures.

Other surfactants can also be envisioned, including ionic surfactants. Other additives can also be included in the oil to stabilize the discrete entities, e.g., microdroplets, including polymers that increase discrete entity, e.g., droplet, stability at temperatures above 35° C.

The discrete entities, e.g., microdroplets, described herein may be prepared as emulsions, e.g., as an aqueous phase fluid dispersed in an immiscible phase carrier fluid (e.g., a fluorocarbon oil or a hydrocarbon oil) or vice versa. In some cases, the carrier fluid comprises a fluorinated compound. In some cases, the carrier fluid is an aqueous fluid. The nature of the microfluidic channel (or a coating thereon), e.g., hydrophilic or hydrophobic, may be selected so as to be compatible with the type of emulsion being utilized at a particular point in a microfluidic work flow.

Emulsions may be generated using microfluidic devices as described in greater detail below. Microfluidic devices can form emulsions consisting of droplets that are extremely uniform in size. The microdroplet generation process may be accomplished by pumping two immiscible fluids, such as oil and water, into a junction. The junction shape, fluid properties (viscosity, interfacial tension, etc.), and flow rates influence the properties of the microdroplets generated but, for a relatively wide range of properties, microdroplets of controlled, uniform size can be generated using methods like T-junctions and flow focusing. To vary microdroplet size, the flow rates of the immiscible liquids may be varied since, for T-junction and flow focus methodologies over a certain range of properties, microdroplet size depends on total flow rate and the ratio of the two fluid flow rates. To generate an emulsion with microfluidic methods, the two fluids are normally loaded into two inlet reservoirs (syringes, pressure tubes) and then pressurized as needed to generate the desired flow rates (using syringe pumps, pressure regulators, gravity, etc.). This pumps the fluids through the device at the desired flow rates, thus generating microdroplet of the desired size and rate.

In some cases, a cell in a discrete entity may be labeled, e.g. by a fluorescent label, a barcode, or a combination thereof.

In practicing the subject methods, a number of reagents may be added to, i.e., incorporated into and/or encapsulated by, the discrete entities, e.g., microdroplets, in one or more steps (e.g., about 2, about 3, about 4, or about 5 or more steps). Such reagents may include, for example, amplification reagents, such as Polymerase Chain Reaction (PCR) reagents. The methods of adding reagents to the discrete entities, e.g., microdroplets, may vary in a number of ways. Approaches of interest include, but are not limited to, those described by Ahn, et al., Appl. Phys. Lett. 88, 264105 (2006); Priest, et al., Appl. Phys. Lett. 89, 134101 (2006); Abate, et al., PNAS, Nov. 9, 2010 vol. 107 no. 45 19163-19166; and Song, et al., Anal. Chem., 2006, 78 (14), pp 4839-4849; the disclosures of which are incorporated herein by reference.

For instance, a reagent may be added to a discrete entity, e.g., microdroplet, by a method involving merging a discrete entity, e.g., a microdroplet, with a second discrete entity, e.g., microdroplet, which contains the reagent(s), e.g. in a discrete entity merger region of a microfluidic device described herein. The reagent(s) that are contained in the second discrete entity may be added by any convenient methods, specifically including those described herein. This second discrete entity may be merged with the first discrete entity to create a combined discrete entity, e.g., a microdroplet, which includes the contents of both the first discrete entity and the second discrete entity.

One or more reagents may also, or instead, be added using techniques such as droplet coalescence, or picoinjection. In droplet coalescence, a target drop (i.e., the microdroplet) may be flowed alongside a microdroplet containing the reagent(s) to be added to the microdroplet. The two microdroplets may be flowed such that they are in contact with each other, but not touching other microdroplets. These drops may then be passed through electrodes or other aspects for applying an electrical field, wherein the electric field may destabilize the microdroplets such that they are merged together.

Reagents may also, or instead, be added using picoinjection. In this approach, a target drop (i.e., the microdroplet) may be flowed past a channel containing the reagent(s) to be added, wherein the reagent(s) are at an elevated pressure. Due to the presence of the surfactants, however, in the absence of an electric field, the microdroplet will flow past without being injected, because surfactants coating the microdroplet may prevent the fluid(s) from entering. However, if an electric field is applied to the microdroplet as it passes the injector, fluid containing the reagent(s) will be injected into the microdroplet. The amount of reagent added to the microdroplet may be controlled by several different parameters, such as by adjusting the injection pressure and the velocity of the flowing drops, by switching the electric field on and off, and the like.

In various aspects, one or more reagents may also, or instead, be added to a microdroplet by a method that does not rely on merging two droplets together or on injecting liquid into a drop. Rather, one or more reagents may be added to a microdroplet by a method involving the steps of emulsifying a reagent into a stream of very small drops, and merging these small drops with a target microdroplet. Such methods shall be referred to herein as "reagent addition through multiple-drop coalescence." These methods take advantage of the fact that due to the small size of the drops to be added compared to that of the target drops, the small drops will flow faster than the target drops and collect behind them. The collection can then be merged by, for example, applying an electric field. This approach can also, or instead, be used to add multiple reagents to a microdroplet by using several co-flowing streams of small drops of different fluids. To enable effective merger of the tiny and target drops, it is important to make the tiny drops smaller than the channel containing the target drops, and also to make the distance between the channel injecting the target drops from the electrodes applying the electric field sufficiently long so as to give the tiny drops time to "catch up" to the target drops. If this channel is too short, not all tiny drops will merge with the target drop, adding less reagent than desired. To a certain degree, this can be compensated for by increasing the magnitude of the electric field, which tends to allow drops that are farther apart to merge. In addition to making the tiny drops on the same microfluidic device, they can also, or instead, be made offline using another microfluidic drop maker or through homogenization and then injecting them into the device containing the target drops.

Accordingly, in some embodiments a reagent is added to a microdroplet by a method involving emulsifying the reagent into a stream of droplets, wherein the droplets are smaller than the size of the microdroplet; flowing the droplets together with the microdroplet; and merging a droplet with the microdroplet. The diameter of the droplets contained in the stream of droplets may vary ranging from about 75% or less than that of the diameter of the microdroplet, e.g., the diameter of the flowing droplets is about 75% or less than that of the diameter of the microdroplet, about 50% or less than that of the diameter of the microdroplet, about 25% or less than that of the diameter of the microdroplet, about 15% or less than that of the diameter of the microdroplet, about 10% or less than that of the diameter of the microdroplet, about 5% or less than that of the diameter of the microdroplet, or about 2% or less than that of the diameter of the microdroplet. In certain aspects, a plurality of flowing droplets may be merged with the microdroplet, such as 2 or more droplets, 3 or more, 4 or more, or 5 or more. Such merging may be achieved in a variety of ways, including but not limited to by applying an electric field, wherein the electric field is effective to merge the flowing droplet with the microdroplet.

A reagent, in another aspect, is added to a drop (e.g., a microdroplet) formed at an earlier time by enveloping the drop to which the reagent is be added (i.e., the "target drop") inside a drop containing the reagent to be added (the "target reagent"). In certain embodiments such a method is carried out by first encapsulating the target drop in a shell of a suitable hydrophobic phase, e.g., oil, to form a double emulsion. The double emulsion is then encapsulated by a drop containing the target reagent to form a triple emulsion. To combine the target drop with the drop containing the target reagent, the double emulsion is then burst open using any suitable method, including, but not limited to, applying an electric field, adding chemicals that destabilizes the droplet interface, flowing the triple emulsion through constrictions and other microfluidic geometries, applying mechanical agitation or ultrasound, increasing or reducing temperature, or by encapsulating magnetic particles in the drops that can rupture the double emulsion interface when pulled by a magnetic field.

In some cases, a discrete entity includes a bead. In some cases, at least one dimension of the bead, e.g. diameter, is between about 0.5 μm and about 500 μm. In some cases, the bead is made of a polymeric material, e.g. polystyrene. In some cases, the bead is magnetic or contains a magnetic component. In some cases, the bead has a biomolecule attached to its surface, e.g. an antibody, a protein, an antigen, DNA, RNA, streptavidin, or a combination thereof. In some cases, the bead is an immunoassay bead. In some cases, the bead is an RNA capture bead.

As such, the present disclosure provides a method of selectively combining a biomolecule with another compound or cell, wherein the method includes selectively isolating the biomolecule from a composition using the bead, making a discrete entity that includes the bead and biomolecule, and selectively combining the discrete entity containing the bead and biomolecule with one or more other discrete entities that contain one or more other compounds or cells using the microfluidic device described herein. Methods of selectively isolating biomolecules using beads are known in the art, e.g. U.S. 2010/0009383, which is incorporated herein by reference for its disclosure of a method of separating a biomolecule or cell using beads.

Sorting Discrete Entities

In practicing the methods of the present disclosure, one or more sorting steps may be employed. A sorting step sorts a discrete entity into one of two or more locations, e.g. into one of two or more fluid channels. In some cases, the sorting is into one of two fluid channels.

Discrete entities are sorted based on one or more properties of the discrete entity or a component within the discrete entity. In addition, such sorting may either be passive sorting or active sorting. Active sorting includes the detection of one or more properties of a discrete entity, or a component within the discrete entity, and sorting based on the detected property. Passive sorting involves sorting a discrete entity without the active detection of a property. Sorting approaches of interest include, by are not necessarily limited to, approaches that involve the use of one or more sorting channels and one or more sorting elements.

Sorting approaches which may be utilized in connection with the disclosed methods, systems and devices also include those described herein, and those described by Agresti, et al., PNAS vol. 107, no 9, 4004-4009.

Active Sorting Structure

For active sorting, the device includes one or more sorting elements and one or more detectors, wherein each detector is configured to detect one or more properties of a discrete entity, or a component within the discrete entity, and each sorting element is configured to sort the discrete entity into one of two or more locations based on the detecting by the detection element. In some cases, a sorting element is positioned in proximity to the sorting channel, e.g. an electrode in proximity to the sorting channel. In some cases, a sorting element is positioned within the sorting channel, e.g. a partial height flow divider in a sorting channel. In some cases, the device includes a sorting element positioned within the sorting channel and one or more, e.g. two, sorting elements positioned in proximity to the sorting channel.

Exemplary structures and methods for active sorting discrete entities are described in Cole et al., PNAS, 2017, 114, 33, 8728-8733, doi:10.1073/pnas.1704020114; Clark et al., Lab Chip, 2018, 5, 18, 710-713, doi:10.1039/C7LC01242J; and Sciambi et al., Lab on a Chip, 2015, 15, 47-51, doi:10.1039/C4LC01194E, the disclosures of which are incorporated herein by reference for sorting elements.

In some cases, the sorting element comprises an electrode configured to exert a dielectrophoretic force, an electrode configured to exert an electrophoretic force, an element configured to exert an acoustic force, a valve, or a combination thereof.

In some cases, a sorting element comprises an electrode that is positioned in proximity to the sorting channel, e.g. an electrode configured to exert a dielectrophoretic force on the discrete entity or an electrophoretic force on the discrete entity. In some cases, the electrode is configured to exert an electrophoretic force on the discrete entity.

The dielectrophoretic force on the discrete entity can be directed towards the electrode, i.e. an attractive force, away from the electrode, i.e. a repulsive force, or in any other direction. In some cases, the sorting electrode is a liquid electrode, e.g., a microfluidic channel containing a conductive material, e.g. salt water, liquid metal, molten solder, or a conductive ink to be annealed later. In some cases, the electrodes are micropatterned onto a planar surface and the microfluidic device is bonded to the surface. In some case, the electrodes are patterned on the substrate of the microfluidic device, e.g. a patterned indium tin oxide (ITO) glass slide. In some cases, the sorting element includes a selectively actuatable bipolar sorting electrode. In some cases, the sorting element includes two electrodes. In some cases, the sorting element includes a selectively actuatable bipolar droplet sorting electrode. In some cases, the electrode is a solid electrode prepared from any suitable conductive material may be utilized.

In some cases, the electrode is connecting to an alternating current electrical source with a frequency of approximately 0.1 kHz to approximately 100 kHz, e.g. between approximately 1 kHz and approximately 50 kHz. In some cases, the electrode is connected to an electric source with a voltage of approximately 10 V to approximately 10,000 V, e.g. approximately In some cases, the trapping element includes two electrodes, e.g. two electrodes that exert a dielectrophoretic force. In some cases, the distance between the first and second trapping electrodes is approximately 25 μm to approximately 500 μm, e.g. approximately 50 μm to approximately 200 μm, approximately 75 μm to approximately 150 μm.

In some cases, the distance between an electrode and an interior of the sorting channel is between approximately 1 μm to approximately 100 μm, e.g. approximately 5 μm to approximately 50 μm, approximately 10 μm to approximately 25 μm.

The distance between the trapping electrodes and the distance between a trapping electrode and the interior of the discrete entity merger region can be varied in order to improve trapping. Positioning an electrode closer to the interior of the interior of the discrete entity merger region will increase the electromagnetic force exerted on a discrete entity. Positioning the electrodes closer to one another will increase the strength of the electric field and therefore increase the electromagnetic force exerted on the discrete entity. On the other hand, a trapping electrode can be positioned farther away from another electrode in the discrete entity merger region to reduce the electromagnetic force, e.g. to trap the discrete entity with less force. The position of the sorting electrodes can be varied for analogous reasons, or to provide a larger discrete entity merger region, e.g. to allow larger numbers or sizes of combined discrete entities to be combined, or a combination thereof.

In some cases, the sorting element includes three or more sorting electrodes, e.g. four or more, five or more, ten or more, or twenty or more. In such cases, the sorting electrodes can be configured to form one or more bipolar electrode pairs, e.g. two or more pairs, three or more pairs, or five or more pairs.

In particular embodiments, the liquid electrodes are energized using a power supply or high voltage amplifier. In some embodiments, the liquid electrode channel includes an inlet port so that a conducting liquid can be added to the liquid electrode channel Such conducting liquid may be added to the liquid electrode channel, for example, by connecting a tube filled with the liquid to the inlet port and applying pressure. In particular embodiments, the liquid electrode channel also includes an outlet port for releasing conducting liquid from the channel.

In some cases, the sorting element includes two sorting electrodes. In some cases, the two sorting electrodes have substantially different shapes, e.g. as shown in FIG. 2. In some cases, the two sorting electrodes produce electric field lines with substantially different shapes. In some cases, the shapes are such that the pair of electrodes provide a constant electric field gradient. As such, a discrete entity can be subjected to the sorting force for a longer period of time and over a longer distance, thereby allowing a lower voltage to be used. In some cases, the electric field points radially inwards.

In some cases, a portion of a first sorting electrode is positioned in the center of the arc of a concentric or essentially concentric sorting channel, and the second sorting electrode is positioned on a side of the sorting channel opposite the first sorting electrode, e.g. as shown in FIG. 2. In some cases, the sorting channel defines a concentric or approximately concentric flow path, wherein a portion of a sorting electrode is located at the center of the concentric or approximately concentric flow path.

In some cases, two sorting electrodes are positioned on the same side of the sorting channel. In such embodiments, the shortest distance between the two sorting electrodes is between about 20 μm and about 500 μm, such as between about 50 μm and about 200 μm, between about 75 μm and about 150 μm, between about 100 μm and about 150 μm, or between about 120 μm and about 140 μm.

In some cases, the shortest distance between a sorting electrode and the interior of the sorting channel is between about 5 μm and about 100 μm, such as between about 10 μm and about 50 μm, between about 20 μm and about 40 μm, between about 25 μm and about 35 μm, or between about 28 μm and about 32 μm.

In some cases, the sorting element includes an element configured to exert an acoustic force. In some cases, the acoustic force is created by acoustic streaming. In some cases, the acoustic force is created by surface acoustic wave sorting. Various manners of acoustic sorting known in the art can be used in the present methods, including those described in: Junru Wu, *Acoustic Streaming and Its Applications*, Fluids, 2018, 3, 108, doi:10.3390/fluids3040108; Schmid et al., *Sorting drops and cells with acoustics: acoustic microfluidic fluorescence-activated cell sorter*, Lab on a Chip, 2014, 14, 3710, doi:10.1039/c41c00588k; Franke et al, *Surface acoustic wave actuated cell sorting* (*SAWACS*), Lab on a Chip, 2010, 6, 789-794, doi:10.1039/B915522H; each of which are incorporated by reference for manners of acoustic sorting.

In some cases, the sorting element includes a valve. In some cases, the valve is positioned in the sorting channel. In some cases, the valve is a microfluidic valve, a membrane valve, a bifurcating channel, a surface acoustic wave generator. In some cases, the sorting channel includes a partial height wall divider, a concentric or essentially concentric sorter channel, or a combination thereof. Various valves useful with the present methods are known in the art, including those described in Abate et al, *Microfluidic sorting with high-speed single-layer membrane valves*, Applied Physics Letters, 2010, 96, 203509, doi:10.1063/1.3431281, which is incorporated herein by reference for manners of valve sorting.

In some cases, the valve can be used to at least partially block or allow a particular path of the discrete entity, thereby sorting the discrete entity.

In other cases, the valve can be used to control the flow of fluid going into the sorting channel. As such, the valve can be used to indirectly control the fluid dynamics within the sorting channel, thereby sorting the discrete entity.

Thus, in cases wherein the sorting element comprises a valve, the sorting step includes the mechanical movement of a part of the device. In other cases, however, the sorting is performed by non-mechanical means, e.g. dielectrophoretic sorting, as described elsewhere herein. Thus, in some cases, the sorting step does not include mechanical movement of a part of the device. In some cases, the entire method lacks movement of a part of the device, i.e. the discrete entities are sorted, trapped, combined, and released without the movement of a part of the device.

In some cases, the sorting channel includes a partial height flow divider, e.g. as described in Sciambi et al, Lab Chip, 2015, 15, 47-51, doi:10.1039/C4LC01194E, or a concentric or essentially concentric region, wherein a portion of a sorting electrode is positioned at the center of the arc of the concentric or essentially concentric region, e.g. as described in Clark et al., Lab on a Chip, 2018, 5, 18, 710-731, doi:10.1039/C7LC01242J.

In some embodiments, the present disclosure provides microfluidic devices with an improved sorting architecture, which facilitates the high-speed sorting of discrete entities, e.g., microdroplets. This sorting architecture may be used in connection with other embodiments described herein or in any other suitable application where high-speed sorting of microdroplets is desired. Related methods and systems are also described. For example, in some embodiments, a microfluidic device may include a sorting channel; a first outlet channel in fluid communication with the sorting channel; a second outlet channel in fluid communication with the sorting channel; and a dividing wall separating the first outlet channel from the second outlet channel, wherein the dividing wall comprises a first proximal portion having a height which is less than the height of the inlet channel and a second distal portion having a height which is equal to or greater than the height of the inlet channel.

In some embodiments, the height of the first proximal portion of the dividing wall is from about 10% to about 90% of the height of the inlet channel, e.g., from about 20% to about 80%, from about 30% to about 70%, from about 40% to about 60%, or about 50% of the height of the inlet channel.

In some embodiments the height of the first proximal portion of the dividing wall is from about 10% to about 20%, from about 20% to about 30%, from about 30% to about 40%, from about 40% to about 50%, from about 50% to about 60%, from about 60% to about 70%, or from about 80% to about 90% of the height of the inlet channel.

In some embodiments, the length of the proximal portion of the dividing wall is equal to or greater than the diameter of a microdroplet as described herein, e.g., a microdroplet to be sorted using a microfluidic device as described herein. For example, in some embodiments, the length of the proximal portion of the dividing wall is from about 1× to about 100× the diameter of a microdroplet as described herein, e.g., from about 1× to about 10×, from about 10× to about 20×, from about 20× to about 30×, from about 30× to about 40×, from about 40× to about 50×, from about 50× to about 60×, from about 60× to about 70×, from about 70× to about 80×, from about 80× to about 90×, or from about 90× to about 100× the diameter of a microdroplet as described herein.

Active Sorting Detection

As reviewed above, active sorting involves one or more sorting elements sorting a discrete entity based on the detection of one or more properties of the discrete entity, or a component within, by one or more detectors. Properties of interest include, but are not limited to, optical properties, size, viscosity, mass, buoyancy, surface tension, electrical conductivity, charge, magnetism, and type. In some cases, such properties are properties of the discrete entity. In some cases, such properties are properties of a component with the discrete entity, e.g. a particle, a cell, a fluorescent tag on a cell, and a barcode on a cell. Sorting can be based on the presence, absence, or type of component detected within the discrete entity. In some cases, the sorting is based on whether a cell is a normal cell or a cancer cell. In some cases, the discrete entity is detected while the discrete entity is in the inlet channel.

In some cases, the optical property is fluorescence. Thus, in some cases, the detector includes an excitation light source and a fluorescence detector. In some cases, the excitation light includes visible light, ultraviolet light, or a combination thereof. In some cases, the detector is an optical scanner. In some cases, the detector includes optical fibers for directing excitation light onto the discrete entity, for directing fluorescent light to a fluorescence detector, or a combination thereof. In some cases, a suitable optical scanner utilizes a laser light source directed into the back of an objective, and focused onto a microfluidic channel, e.g. an inlet channel, through which droplets flow, e.g., to excite fluorescent dyes within one or more discrete entities. Scanning one more discrete entities may allow one or more properties, e.g., size, shape, composition, of the scanned entities to be determined.

A variety of different components can be included in the discrete entities to facilitate detection, including one or more fluorescent dyes. Such fluorescent dyes may be divided into families, such as fluorescein and its derivatives; rhodamine and its derivatives; cyanine and its derivatives; coumarin and its derivatives; Cascade Blue and its derivatives; Lucifer Yellow and its derivatives; BODIPY and its derivatives; and the like. Exemplary fluorophores include indocarbocyanine (C3), indodicarbocyanine (C5), Cy3, Cy3.5, Cy5, Cy5.5, Cy7, Texas Red, Pacific Blue, Oregon Green 488, Alexa fluor-355, Alexa Fluor 488, Alexa Fluor 532, Alexa Fluor 546, Alexa Fluor-555, Alexa Fluor 568, Alexa Fluor 594, Alexa Fluor 647, Alexa Fluor 660, Alexa Fluor 680, JOE, Lissamine, Rhodamine Green, BODIPY, fluorescein isothiocyanate (FITC), carboxy-fluorescein (FAM), phycoerythrin, rhodamine, dichlororhodamine (dRhodamine), carboxy tetramethylrhodamine (TAMRA), carboxy-X-rhodamine (ROX), LIZ, VIC, NED, PET, SYBR, PicoGreen, RiboGreen, and the like. Descriptions of fluorophores and their use, can be found in, among other places, R. Haugland, Handbook of Fluorescent Probes and Research Products, 9th ed. (2002), Molecular Probes, Eugene, Oreg.; M. Schena, Microarray Analysis (2003), John Wiley & Sons, Hoboken, N.J.; Synthetic Medicinal Chemistry 2003/2004 Catalog, Berry and Associates, Ann Arbor, Mich.; G. Hermanson, Bioconjugate Techniques, Academic Press (1996); and Glen Research 2002 Catalog, Sterling, VA.

In practicing the subject methods, therefore, a component may be detected based upon, for example, a change in fluorescence. In certain aspects, the change in fluorescence is due to fluorescence resonance energy transfer (FRET). In this approach, a special set of primers may be used in which the 5' primer has a quencher dye and the 3' primer has a fluorescent dye. These dyes can be arranged anywhere on the primers, either on the ends or in the middles. Because the primers are complementary, they will exist as duplexes in solution, so that the emission of the fluorescent dye will be quenched by the quencher dye, since they will be in close proximity to one another, causing the solution to appear dark. After PCR, these primers will be incorporated into the long PCR products, and will therefore be far apart from one another. This will allow the fluorescent dye to emit light, causing the solution to become fluorescent. Hence, to detect if a particular target gene, e.g., oncogene, is present, one may measure the intensity of the discrete entity, e.g., droplet, at the wavelength of the fluorescent dye. To detect if different target genes, e.g., oncogenes, are present, this would be done with different colored dyes for the different primers. This would cause the discrete entity, e.g., droplet, to become fluorescent at all wavelengths corresponding to the primers of the target genes, e.g., oncogenes, present in the cell.

In some embodiments, the disclosed methods may include a step of encapsulating or incorporating unique identifier molecules, e.g., nucleic acid barcodes, into a plurality of discrete entities, e.g., droplets, such that each discrete entity of the plurality of discrete entities comprises a different set of unique identifier molecules. Alternatively, or in addition, the disclosed methods may include a step of incorporating a unique identifier molecule into each molecule within a particular discrete entity, e.g., droplet.

In various aspects of the subject methods, multiple biomarkers may be detected and analyzed for a particular discrete entity or one or more components thereof, e.g., cell(s) encapsulated therein. Biomarkers detected may include, but are not limited to, one or more proteins, transcripts and/or genetic signatures in a cell's genome or combinations thereof. With standard fluorescence-based detection, the number of biomarkers that can be simultaneously interrogated may be limited to the number of fluorescent dyes that can be independently visualized within each discrete entity, e.g., microdroplet. In certain embodiments, the number of biomarkers that can be individually detected within a particular discrete entity, e.g., microdroplet can be increased. For example, this may be accomplished by segregation of dyes to different parts of the discrete entity, e.g., microdroplet. In particular embodiments, beads (e.g. LUMINEX® beads) conjugated with dyes and probes (e.g., nucleic acid or antibody probes) may be encapsulated in the discrete entity, e.g., microdroplet to increase the number of biomarkers analyzed. In another embodiment, fluorescence polarization may be used to achieve a greater number of detectable signals for different biomarkers for a single cell. For example, fluorescent dyes may be attached to various probes and the discrete entity, e.g., microdroplet, may be visualized under different polarization conditions. In this way, the same colored dye can be utilized to provide a signal for different probe targets for a single cell. The use of fixed and/or permeabilized cells also may allow for increased levels of multiplexing. For example, labeled antibodies may be used to target protein targets localized to cellular components while labeled PCR and/or RT-PCR products are free within a discrete entity, e.g., microdroplet. This allows for dyes of the same color to be used for antibodies and for amplicons produced by RT-PCR.

Passive Sorting

Passive sorters of interest include hydrodynamic sorters, which sort discrete entities, e.g., microdroplets, into different channels according to size, based on the different ways in which small and large drops travel through the microfluidic channels. Also of interest are bulk sorters, a simple example of which is a tube containing drops of different mass in a gravitational field. By centrifuging, agitating, and/or shaking the tube, lighter drops that are more buoyant will naturally migrate to the top of the container. Drops that have magnetic properties could be sorted in a similar process, except by applying a magnetic field to the container, towards which drops with magnetic properties will naturally migrate according to the magnitude of those properties. A passive sorter as used in the subject methods may also involve relatively large channels that will sort large numbers of drops simultaneously based on their flow properties. Additionally, in some embodiments, sorting is carried out via activation of one or more valves, e.g., microfluidic valves.

Picoinjection can also be used to change the electrical properties of the drops. This could be used, for example, to change the conductivity of the drops by adding ions, which could then be used to sort them, for example, using dielectrophoresis. Alternatively, picoinjection can also be used to charge the drops. This could be achieved by injecting a fluid into the drops that is charged, so that after injection, the drops would be charged. This would produce a collection of drops in which some were charged and others not, and the charged drops could then be extracted by flowing them through a region of electric field, which will deflect them based on their charge amount. By injecting different amounts of liquid by modulating the piocoinjection, or by modulating the voltage to inject different charges for affixed injection volume, the final charge on the drops could be adjusted, to produce drops with different charge. These would then be deflected by different amounts in the electric field region, allowing them to be sorted into different containers.

Enrichment Through Sorting

A population, e.g., a population of discrete entities, may be enriched by sorting, in that a population containing a mix of members having or not having a desired property may be enriched by removing those members that do not have the desired property, thereby producing an enriched population having the desired property.

In some cases, two or more sorting steps may be applied to a population of discrete entities or types thereof, e.g., microdroplets, e.g., about 2 or more sorting steps, about 3 or more, about 4 or more, or about 5 or more, etc. When a plurality of sorting steps is applied, the steps may be substantially identical or different in one or more ways (e.g., sorting based upon a different property, sorting using a different technique, and the like).

In some cases, a droplet may be purified, e.g., as follows: a majority of the fluid in the drop is replaced it with a purified solution, without removing any discrete reagents that may be encapsulated in the drop, such a cells or beads. The microdroplet is first injected with a solution to dilute any impurities within it. The diluted microdroplet is then flowed through a microfluidic channel on which an electric field is being applied using electrodes. Due to the dielectrophoretic forces generated by the field, as the cells or other discrete reagents pass through the field they will be displaced in the flow. The drops are then split, so that all the objects end up in one microdroplet. Accordingly, the initial microdroplet has been purified, in that the contaminants may be removed while the presence and/or concentration of discrete reagents, such as beads or cells, which may be encapsulated within the droplet, are maintained in the resulting microdroplet.

Sorting may be employed, for example, to remove discrete entities, e.g., microdroplets, in which no cells are present. Encapsulation may result in one or more discrete entities, e.g., microdroplets, including a majority of the discrete entities, e.g., microdroplets, in which no cell is present. If such empty drops were left in the system, they would be processed as any other drop, during which reagents and time would be wasted. To achieve the highest speed and efficiency, these empty drops may be removed with droplet sorting. For example, a drop maker may operate close to the dripping-to-jetting transition such that, in the absence of a cell, drops of a first size, e.g., 8 μm, are formed; by contrast, when a cell is present the disturbance created in the flow will trigger the breakup of the jet, forming drops of a second size, e.g., 25 μm in diameter. The device may thus produce a bi-disperse population of empty drops of a first size, e.g., 8 μm, and single-cell containing drops of a second size, e.g., 25 μm, which may then be sorted by size using, e.g., a hydrodynamic sorter to recover only the, single-cell containing drops of the second, e.g., larger, size.

Recovery and/or Recycling of Discrete Entities

In some cases, the discrete entities that are sorted to a particular location, e.g. a second outlet channel, are recovered and/or recycled by, for example, being re-injected into the carrier fluid upstream of the sorting channel. Various embodiments of the methods disclosed herein include repeated recycling of discrete entities not selected for direction to the first outlet channel in a particular pass through the sorting channel. Sorting, according to the subject embodiments, is described in further detail below. Also, in various embodiments, one or more discrete entities, e.g., all the discrete entities present in a mixed emulsion, remain contained e.g., encapsulated, in a carrier fluid, e.g., a hydrophobic solution (e.g., oil), or a hydrophilic solution (e.g., an aqueous solution), prior to sorting and/or throughout a sorting process carried out by the sorter and/or throughout the process of directing the one or more discrete entities to a discrete entity merger region of the first outlet channel.

Sorter Features

In some embodiments a microfluidic device according to the present disclosure includes an electrode, e.g., a liquid electrode, configured to selectively apply an electrical field in an inlet channel of the microfluidic device upstream of the dividing wall to effect sorting of one or more microdroplets.

In some cases, the microfluidic device includes a concentric or approximately concentric sorter channel, i.e. a portion of the sorter electrode is located at the center of the concentric or approximately concentric arc of the sorter channel Some examples of such sorting architectures are described in Clark et al., Lab Chip, 2018, 5, 18, 710-713, doi:10.1039/C7LC01242J.

As described herein, microfluidic devices according to the present disclosure may include a moat salt solution (to generate the field gradient used for dielectrophoretic deflection and to limit stray fields that can cause unintended droplet merger) provided in suitable channels.

Accordingly, a microfluidic device having a gapped dividing wall is provided which facilitates high speed sorting as described in greater detail in the Experimental section. The gapped dividing wall of the present disclosure in combination with one or more detectors as described herein, and one or more electrodes as described herein facilitate the high-speed sorting of microdroplet.

Trapping and Combining Discrete Entities

As reviewed above, after a discrete entity has been sorted, a method as described herein can include directing the discrete entity to a discrete entity merger region. Accordingly, a device as described herein can include a discrete entity merger region and a trapping element positioned in proximity to the discrete entity merger region.

The trapping element can to trap a plurality of discrete entities in the discrete entity merger region for a time sufficient for the plurality of discrete entities to combine to form a combined discrete entity by exerting an electromagnetic force, exerting a mechanical force, applying heat, applying light, exerting an electrical force, providing a reagent, or a combination thereof sufficient. In some cases, the electromagnetic force is a dielectrophoretic force. In some cases, the electromagnetic force is an electrophoretic force.

In some cases, the discrete entity merger region includes a feature selected from: a geometric change in a dimension of the first outlet channel, a flow obstacle, a flow divider, a laminating fluid inlet, a valve, or a combination thereof. In some cases, the geometric change is a change in the cross-sectional area of the first outlet channel, e.g., the discrete entity merger region has a larger cross-sectional area than the upstream region. In some cases, the geometric change is a change in one dimension of the first outlet channel, e.g., the discrete entity merger region is narrower than the downstream region. In some cases, the geometric change includes a recess in a channel wall. In some cases, the recess includes an area that is not colinear with the flow of fluid from the upstream region, e.g. as shown as item 107 in FIG. 2. In some cases, where a valve is utilized, the valve is configured to switch between at least two states. In some cases, in the first state, the valve impedes the flow of a discrete entity past the discrete entity merger region while allowing flow of the carrier fluid past the discrete entity merger region. In some cases, in the second state, the valve is configured such that the combined discrete entity is not impeded from flowing past the discrete entity region. In some cases, the method includes putting the valve in a first state such that discrete entities can be trapped and combined into a combined discrete entity, and then putting the valve into a second state to release the discrete entity from the discrete entity merger region. In some cases, the valve is a membrane valve.

A laminating fluid inlet functions in a similar manner to certain embodiments of the spacer fluid inlet described above, i.e., a laminating fluid inlet is configured such that flowing fluid through the laminating fluid inlet will cause a discrete entity to move further away from a first side a channel and closer to a second side of a channel. Stated in another manner, the fluid flowing through the laminating fluid inlet contacts the fluid moving into the discrete entity merger region from an upstream region of the first outlet channel, thereby affecting the flow of fluid coming from the upstream region. In some cases, the fluid is oil, or a fluid which is otherwise immiscible with the fluid of the discrete entity.

FIG. 2 shows an embodiment wherein the discrete entity merger region includes recess 107, flow divider 113, and laminating fluid inlet 112. In FIG. 2, the laminating fluid provides a force pushing a discrete entity into recess 107 and towards trapping electrodes 109. In addition, flow divider 113 in FIG. 2 further affects the interaction of the laminating fluid and the fluid coming from the upstream region, thereby increasing the force pushing the discrete entity into recess 107. As such, a discrete entity merger region according to the present disclosure can include a laminating oil inlet and/or a flow divider, wherein such an element or elements are configured such that flowing oil through the laminating oil inlet channel will produce a force pushing a discrete entity in the discrete entity merger region towards a trapping electrode, a recess, or a combination thereof. In some embodiments, the device can include a flow divider without the laminating fluid inlet.

In some cases, the downstream region of the first outlet channel is configured to aid in the trapping of a discrete entity in the discrete entity merger region. In some cases, the downstream region has a larger cross-sectional area than the discrete entity merger region, which is an example of a geometric change in the first outlet channel. In some cases, the downstream region has a triangular or approximately triangular shape. In some cases, the downstream region has a triangular or approximately triangular shape and the discrete entity merger region is located at or near a vertex of the triangle. As an example, in the system of FIG. 3 has downstream region 208 and discrete entity merger region 207.

In some cases, the longitudinal axis of the downstream region is parallel to the longitudinal axis of the discrete entity merger region, whereas in other cases such longitudinal axes are not parallel. In some cases, such axes are parallel but not colinear. In some cases, the axes are parallel and colinear. In some cases, the angle between such axes is greater than 0°, such as 5° or more, 10° or more, 15° or more, 30° or more, 45° or more, 60° or more, 75° or more, 90° or more, 135° or more, or 175° or more. In some cases, such an angle is between approximately 15° and approximately 135°. In some cases, such an angle is between approximately 60° and approximately 120°, e.g. as shown in FIG. 3.

In some embodiments, the trapping element includes one or more electrodes, e.g. an electrode configured to exert a dielectrophoretic force on the discrete entity. In some cases, the electrode is configured to exert an electrophoretic force. The dielectrophoretic force on the discrete entity can be directed towards the electrode, i.e. an attractive force, away from the electrode, i.e. a repulsive force, or in any other direction. In some cases, the trapping electrode is a liquid electrode, i.e. a microfluidic channel containing a conductive material, e.g. salt water, liquid metal, molten solder, or a conductive ink to be annealed later. In some case, the electrodes are patterned on the substrate of the microfluidic device, e.g. a patterned indium tin oxide (ITO) glass slide. In some cases, the trapping element includes a selectively actuatable bipolar trapping electrode. In some cases, the trapping element includes two electrodes. In some cases, is the trapping element includes a selectively actuatable bipolar droplet trapping electrode. In some cases, the electrode is a solid electrode prepared from any suitable conductive material may be utilized.

In some cases, the trapping element includes three or more trapping electrodes, such as four or more, five or more, ten or more, or twenty or more. In such cases, the trapping electrodes can be configured to form two or more bipolar electrode pairs, e.g. three or more pairs, four or more pairs, five or more pairs, or ten or more pairs.

In some cases, the discrete entity merger region is configured to reduce the shear force experienced by one or more discrete entities trapped in the discrete entity merger region, wherein the shear force is caused by carrier fluid flowing past the discrete entities, wherein if the shear force is strong enough one or more discrete entities will be unintentionally forced from the discrete entity merger region. Stated in another manner, the discrete entity merger region comprises one or more features configured to reduce the shear force experienced by one or more discrete entities trapped in the discrete entity merger region, wherein such features can be a geometric change in a dimension of the first outlet channel, a recess, a change in cross-sectional area, a change in a dimension, a flow obstacle, a flow divider, a laminating fluid inlet, a valve, or a combination thereof.

The discrete entity merger region and trapping element, e.g. one or two trapping electrodes that can exert a dielectrophoretic force, are configured such that a force applied by the trapping element in the discrete entity merger region is sufficient to trap a plurality of discrete entities in the discrete entity merger region for a time sufficient for the plurality of discrete entities to combine to form a combined discrete entity.

The time that a first discrete entity is trapped in the discrete entity merger region before being contacted with a second discrete entity depends upon factors including, but not limited to, the rate at which discrete entities are sorted and the fraction of discrete entities passing through the sorting channel that contain the contents desired for the second discrete entity.

As an example, the trapped first discrete entity might contain a lysing reagent and a desired second discrete entity would contain a single cell. In such an example, a desired second discrete entity might contain a single cell, e.g. so that the cell could be lysed by the lysing reagent in the first discrete entity upon formation of the combined discrete entity. In such an example, the sorting element might sort prospective second discrete entities at a rate of about 1,000 Hz, and approximately 3% of prospective second discrete entities contain the desired single cell. As such, on average, $\frac{1}{30}$ seconds≈0.033 seconds≈33 ms would elapse before a desired cell-containing second discrete entity would be sorted by the sorting element. Thus, in such a case, the first discrete entity would be trapped in the discrete entity merger region for approximately 0.033 seconds before being combined with a second discrete entity.

In some cases, the sorting element sorts discrete entities at a rate of at least 10 Hz, such as at least 100 Hz, at least 500 Hz, at least 1,000 Hz, at least 2,000 Hz, or at least 10,000 Hz. In some cases, only 50% or less of the discrete entities contain the contents desired for the second discrete entity, such as 25% or less, 10% or less, 5% or less, 1% or less, or 0.1% or less. In some cases, the discrete entity merger region and trapping element are configured to trap a first discrete entity for 0.1 ms or more, such as 1 ms or more, 5 ms or more, 10 ms or more, 25 ms or more, 50 ms or more, 100 ms or more, 500 ms or more, 1,000 ms or more, or 5,000 ms or more. In some cases, a first discrete entity is trapped in the discrete entity merger region for 0.1 ms or more before a second discrete entity enters the region, such as 1 ms or more, 10 ms or more, 100 ms or more, or 1,000 ms or more.

In some cases, the prospective second discrete entities contain two or more types of contents. As an example, the prospective second discrete entities might contain lysing reagents, e.g. like a first discrete entity, a single cell, e.g. a desired second discrete entity, and a sequencing reagent, e.g. a desired third discrete entity. As such, the time a first discrete entity is trapped in the discrete entity merger region depends also upon whether different types of discrete entities are being sorted.

In some cases, a trapping electrode is configured to provide an electric field that affects the surface of the discrete entities such that the discrete entities can more easily merge, e.g. the discrete entities will spontaneously merge. In some cases, application of the electric field is sufficient to provide a destabilizing effect to the discrete entities to facilitate merger.

To facilitate the above manipulations, the present disclosure provides, in some embodiments, a substrate which includes individually controllable electrodes. Such substrates may be configured such that individual electrodes can be selectively activated and deactivated, e.g., by applying or removing a voltage or current to the selected electrode. In this manner, a specific discrete entity trapped via a force applied by the electrode may be selectively released. The electrodes of such an array may be embedded in a substrate material (e.g., a suitable polymer material), e.g., beneath a surface of the substrate to which the discrete entities are affixed via application of the force. A variety of suitable conductive materials are known in the art which may be utilized in connection with the disclosed electrode arrays, including various metals. Liquid electrodes as described previously herein may also be used for such an application.

The methods and devices can include various numbers and configurations of electrodes. In some cases, the sorting element includes zero electrodes, e.g. the sorting element includes an acoustic sorter or a valve, and the trapping element includes a single electrode. In some cases, the sorting element includes zero electrodes and the trapping element includes two electrodes as a bipolar electrode pair, e.g. wherein one of the trapping electrodes is also a shielding electrode that can at least partially shield undesired electromagnetic fields. In some cases, the sorting element includes one electrode and the trapping element includes a bipolar electrode pair. In some cases, the sorting element and the trapping element each include a bipolar electrode pair, e.g. wherein one electrode of each pair is also a shielding electrode. In some cases, the device includes any one of the numbers and types of sorting and trapping electrodes, and the device further includes one or more additional shielding electrodes, e.g. one shielding electrode or two shielding electrodes. In some cases, the additional shielding electrodes are positioned in proximity to the inlet channel, the discrete entity maker, or both. In some cases, one or more of the shielding electrodes are connected to one another. In some cases, one or more of the shielding electrodes are different parts of a single metal piece.

In some cases, the electrode is connecting to an alternating current electrical source with a frequency of approximately 1 kHz or more. In some cases, the electrode is connected to an electric source with a voltage of approximately 10 V to approximately 10,000 V.

In some cases, the trapping element includes two electrodes, e.g. two electrodes that exert a dielectrophoretic force. In some cases, the distance between the first and second trapping electrodes is approximately 20 μm to approximately 500 μm, e.g. approximately 50 μm to approximately 200 μm, or approximately 10 μm to approximately 50 μm.

In particular embodiments, the liquid electrodes are energized using a power supply or high voltage amplifier. In some embodiments, the liquid electrode channel includes an inlet port so that a conducting liquid can be added to the liquid electrode channel Such conducting liquid may be added to the liquid electrode channel, for example, by connecting a tube filled with the liquid to the inlet port and applying pressure. In particular embodiments, the liquid electrode channel also includes an outlet port for releasing conducting liquid from the channel.

In some cases, the tapping element includes a single electrode, i.e. a monopolar trapping configuration. In some cases, the single electrode can have a high voltage, e.g. 1 kV at 10 kHz. As such, energizing the electrode will create electric field lines that create an electric field gradient inside the discrete entity merger region. In turn, this provides for non-uniform polarization of the discrete entities in the microfluidic channel, facilitating trapping and combination.

In some cases, the trapping element includes two electrodes, i.e. a bipolar electrode pair. One electrode can have a positive voltage while the other electrode serves as a ground, thereby creating electric field lines between the two electrodes. As such, the second electrode, i.e. the ground electrode, can be considered to be configured to shape the electric field within the discrete entity merger region, relative to a monopolar configuration, to facilitate the trapping and combination of discrete entities. In some cases the second electrode is positioned on the same side of the channel as the first electrode, whereas in other cases the electrodes are positioned on opposite sides of the channel.

Furthermore, the number of electrode or bipolar electrode pairs is not limited to only one or two electrodes. In contrast, many electrodes or pairs of electrodes can be present in order to facilitate trapping and combining. In some cases, there are both bipolar electrode pairs and unpaired electrodes. In some cases, there are three or more trapping electrodes, including four or more, five or more, ten or more, or twenty or more. In some cases, there are two or more pairs of bipolar electrode pairs, including three or more, four or more, or five or more.

In some cases, the shortest distance between the two trapping electrodes is between about 20 μm and about 500 μm, such as between about 50 μm and about 200 μm, between about 75 μm and about 150 μm, between about 100 μm and about 150 μm, or between about 120 μm and about 140 μm. In some cases, the shortest distance between a trapping electrode and the interior of the first outlet channel is between about 5 μm and about 100 μm, such as between about 10 μm and about 50 μm, between about 20 μm and about 40 μm, between about 25 μm and about 35 μm, or between about 28 μm and about 32 μm.

Analyzing Combined Discrete Entities

Before a combined discrete entity is released from the discrete entity trapping region, it can be imaged. In some cases, the imaging includes capturing a image showing fluorescence. In some cases, the imaging involves capturing an image that does not include fluorescence. In some cases, the imaging allows for, e.g. confirming the number of cells in the combined discrete entity or otherwise assaying the combined discrete entity.

A combined discrete entity can be released from the discrete entity trapping region, e.g. by reducing or eliminating a force exerted by a trapping element on the combined discrete entity. In some cases, releasing the discrete entity involves reducing or eliminating a dielectrophoretic force from one or more trapping electrodes by reducing the electrical power to such electrodes. In some cases, the combined discrete entity leaves the discrete entity merger regions within 0.1 ms to 100 ms of a change in the trapping force, such as within 0.2 ms to 10 ms, 0.5 ms to 5 ms, or 0.75 ms to 2.5 ms. In some cases, the discrete entity leaves the discrete entity merger region in 10 ms or less, such as 5 ms or less, 2 ms or less, or 1 ms or less.

After a combined discrete entity is released from the discrete entity merger region, the method can include analyzing the combined discrete entity or a component therein.

In some cases, the analysis includes one or more of: a single cell functional assay, a measurement of cell-cell communication, a selective RNA-seq, 3D cell culture, a small-scale 3D cell culture, a potency assay, a drug screen, a screen of engineered cell libraries, a screen of neoantigens, a CRISPR screen, a multistep operation, and a sorting off functional assay. In some cases, the analysis includes imaging a combined discrete entity, e.g. to detect a fluorescent tag therein.

In some cases, the multistep operation involves making and releasing a combined discrete entity that includes multiple cells, incubating said cells, e.g. for between 4 hours and 24 hours, and then inserting the incubated cells back into the device. The incubated cells can be combined with a lysis buffer and other reagents in order to RNA-sequence the cells.

Selectively Performing Reactions by Selectively Combining Discrete Entities

The present disclosure also provides a method of selectively performing reactions by selectively combining two or more discrete entities, as described above, wherein the reaction occurs between one or more components from each discrete entity. Such components can be one or more cells, one or more products derived from a cell, one or more reagents, or a combination thereof.

In some cases, a suitable method includes combination of one cell and one or more reagents. As an example, FIG. 4 shows the combination of four discrete entities, wherein three of the discrete entities each contain a different reagent and the fourth discrete entity contains a single cell. As such, FIG. 4 shows that a microfluidic device as described herein can be used to selectively combine different discrete entities, resulting in the formation of a combined discrete entity, e.g., that contains the three reagents and the cell. In some cases, the reagents can include cell lysing reagents, PCR reagents, reagents for analyzing the DNA or RNA within a cell, antibodies, or a combination thereof. In such cases, the method can further include collecting genomic data from contents of the discrete entities or combined discrete entities.

In some cases, the one or more products derived from a cell include cell lysate, DNA, RNA, or a combination thereof. As such, the method can involve analyzing products from a cell, e.g. cell lysate, even though the cell per se is included in any of the discrete entities.

As such, the method of selectively performing reactions can include the combination of two or more discrete entities, e.g. three or more and four or more. In some cases, the number of discrete entities that contain at least one cell is zero discrete entities, one discrete entity, two discrete entities, or three or more discrete entities. In some cases, the number of cells in a discrete entity is one. In some cases, none of the combined discrete entities include a cell.

Selectively Combining Discrete Entities Each Containing at Least One Cell

The present disclosure provides methods of selectively combining two or more discrete entities wherein each discrete entity contains one or more cell. In some cases, the one or more cells in a first discrete entity can have one or more differences, e.g., can be of a different type, than the one or more cells in a second discrete entity. Different types of cells can be distinguished from one another based on one or more properties, e.g. cancerous versus non-cancerous cells, engineered cells versus non-engineered cells, cells with different genomes, cells of different functions, e.g. blood cells versus fat cells, cells labeled with fluorescent labels versus unlabeled cells, living versus dead cells, etc.

As an example, a first discrete entity can contain one type of cell and a second discrete entity can contain a second type of cell. Hence, the methods and microfluidic devices of the present disclosure can be used to combine the first and second types of cells into a single, combined discrete entity. In addition, the method can further include analyzing the interaction between the two cells. In some cases, combined cells can include three or more, e.g. four or more, different cells.

In addition, the method allows for the selective combination of cells of certain types, whereas cells of other types are not included in the combined discrete entity. As an example, a first, second, and third type of cell could be included in a first, second, and third discrete entity. Based on detection of each discrete entity, e.g., by a detector, two of the three cells could be selectively combined, e.g. the second and third type of cell, whereas the remaining cell could be selectively excluded from the combined discrete entity, e.g. the first type of cell. Hence, the method allows for selective combination of certain cells. In some cases, the method includes the selective combination of two or more cells and one or more reagents, along with the selective exclusion of one or more reagents or cells.

Such methods have applications in a variety of fields, including oncology, immunology, neurology, and any other field where it may be desirable to selectively combining certain cells, e.g. while selectively excluding other cells. Thus, the method allows for, and can optionally include, the study of cell-to-cell interactions between the selected cells. The present disclosure provides a method of selectively studying cell-to-cell interactions. In some cases, the two or more cells combined are cells present in the nervous system, e.g. neurons.

Such methods can be used to study the interaction between cancer cells and immune cells. For example, such methods can be used to screen libraries of engineered T cells, e.g. chimeric antigen receptor T cells (CAR-T cells), for their efficacy at fighting or killing cancer cells. In some cases, the method also involves assessing the side effects or toxicity of the engineered cells to normal, e.g., non-cancerous, cells. In some cases, determining the efficacy, side effect, toxicity, or a combination thereof involves imaging the cells, obtaining genomic data on the cells, or a combination thereof. In some cases, the method includes studying the interaction of engineered T cells and cancer cells in the presence of a chemotherapy composition, e.g., as a combination therapy. In some cases, the chemotherapy composition includes a checkpoint inhibitor.

In some cases, the method involves forming multiple, combined discrete entities wherein each combined, discrete entity includes two or more cells, e.g. one engineered T cell and one cancer cell. In some cases, the number of each type of cell is equal, e.g. one immune cell and one cancer cell or two immune cells and two cancer cells. In some cases, multiple types of cells are combined in unequal numbers or ratios. As an example, one immune cell can be combined with ten cancer cells, e.g. to test the ability of the immune cell to persistently kill multiple cancer cells. In some cases, the ratio of a first type of cell to a second type of cell is 1.1:1.0 or more, e.g. 2:1 or more, 5:1 or more, 10:1 or more, 25:1 or more. The number of cells can be 2:1, 2:1 or more, 5:1 or more, 10:1 or more, 25:1 or more. In other cases, three or more types of cells are combined in unequal ratios or numbers. The ratio or number of each pair of cells can be those numbers and ratios recited above.

In some cases, the method includes determining not only the type of cell in a discrete entity, but also the number of cells of that type in the discrete entity. Thus, even if some discrete entities contained one cell whereas others contained two cells, the method allows for creating a combined discrete entity with a particular number or ratio of cells, e.g. five cancer cells and one immune cell.

The present disclosure also provides a method of making three-dimensional cell cultures (3D cell culture) with selectively chosen cells. In some cases, the three-dimensional cell culture is an organoid. In some cases, the three-dimensional cell culture is a spheroid. Creating a three-dimensional cell culture allows for the study of cells in conditions that are more similar to physiological conditions/in vivo conditions than with two-dimensional cell cultures. In some cases, the method involves sorting and combining cells such that each cell in the culture is the same type of cell, or wherein a substantially large percentage of the cells are of the same type, e.g. 90% or more, 95% or more, 98% or more, or 99% or more. Alternatively, the method can involve sorting and combining cells such that the cell culture includes a substantial fraction of two or more cell types, e.g. the cell culture contains at least 10% or more of a first cell type and at least 10% or more of a second cell type. In cases where the cell culture includes a substantial fraction of two or more cell types, the method can involve combined discrete entities that each include each of the desired cell types. In some cases, the method of making a three-dimensional cell culture includes printing the combined discrete entity onto a substrate, e.g. as described in US 2018/0056288, which is incorporated herein by reference for its disclosure of printing one or more discrete entities onto a substrate.

As such, the present disclosure provides a method of selectively sorting and combining discrete entities, wherein each combined discrete entity includes at least one cell, analyzing one or more properties of the one or more cells, e.g. cell-to-cell interactions, and determining a part or whole of the genomics of the one or more cells. Such methods can further include correlating the analyzed properties with the genomic data.

In some cases, the number of combined discrete entities is 10 or more, including 50 or more, 250 or more, 1,000 or more, 5,000 or more, or 10,000 or more. The number of combined cells can be the same or different than the number of combined discrete entities. In some cases, the number of combined cells is 10 or more, including 50 or more, 250 or more, 1,000 or more, 5,000 or more, or 10,000 or more.

In some cases, the methods involve selectively combining discrete entities such that the resulting combined discrete entity includes 2 or more cells, including 3 or more cells, 4 or more cells, 5 or more cells, 6 or more cells, 7 or more cells, 8 or more cells, 9 or more cells, 10 or more cells, or 15 or more cells.

Microfluidic Devices and Systems

As indicated above, embodiments of the disclosed subject matter employ systems and/or devices including microfluidic devices and systems. Devices of the subject disclosure include all those described above in association with the subject methods. Microfluidic devices and systems of this disclosure may be characterized in various ways.

As noted above, microfluidic devices may include one or more flow channels, e.g., flow channels which discrete entities may pass into, out of, and/or through.

In some cases, each channel in the described device is a micro channel, i.e. the channel may have a have at least one cross-sectional dimension on the order of a millimeter or smaller (e.g., less than or equal to about 1 millimeter). In some cases, each channel in the described device, e.g. inlet channel, sorter channel, first outlet channel, first spacer oil inlet, has at least one cross-sectional dimension of about 500 μm or less, such as about 100 μm or less, about 50 μm or less, or about 10 μm or less. As described above, the present disclosure provides for systems that include a microfluidic device and other elements that are separate from the microfluidic device, e.g. a temperature control module, an incubator, and a sequencer. As such separate elements are part of the described system but not part of the microfluidic device, the channels in such separate elements do not necessarily have a have at least one cross-sectional dimension on the order of a millimeter.

In some aspects, for example, systems and/or devices are provided which include one or more discrete entity makers, e.g., droplet makers, configured to generate discrete entities, e.g., droplets, as described herein, and/or one or more flow channels. In some aspects, the one or more flow channels are operably connected, e.g., fluidically connected, to the one or more droplet makers and/or are configured to receive one or more droplets therefrom. In some cases, the discrete entity maker comprises a T-junction.

As described above, in certain embodiments, flow channels are one or more "micro" channels. In view of the above, it should be understood that some of the principles and design features described herein can be scaled to larger devices and systems including devices and systems employing channels reaching the millimeter or even centimeter scale channel cross-sections. Thus, when describing some devices and systems as "microfluidic," it is intended that the description apply equally, in certain embodiments, to some larger scale devices.

When referring to a microfluidic "device" it is generally intended to represent a single entity in which one or more channels, reservoirs, stations, etc. share a continuous substrate, which may or may not be monolithic. Aspects of microfluidic devices include the presence of one or more fluid flow paths, e.g., channels, having dimensions as discussed herein. A microfluidics "system" may include one or more microfluidic devices and associated fluidic connections, electrical connections, control/logic features, etc.

The present disclosure also provides systems that include a microfluidic device, e.g. as described above, and one or more additional components, e.g. (a) a temperature control module operably connected to the microfluidic device; (b) a detector configured to detect a discrete entity in the input channel, wherein the microfluidic device is configured to sort a discrete entity in the sorting channel based on the detection by the detector; (c) an incubator operably connected to the microfluidic device or a discrete entity maker; (d) a sequencer operably connected to the microfluidic device; (e) a device configured to make a plurality of discrete entities, i.e. a discrete entity maker, wherein the device is located within the microfluidic device or separately from the microfluidic device; and (f) one or more conveyors configured to convey a particle, e.g. a cell, or a discrete entity, wherein the discrete entity can contain a particle in some cases, between any combination of: the incubator, device configured to make a plurality of discrete entities, the microfluidic device, the sequencer.

In various embodiments, microfluidic devices of this disclosure provide a continuous flow of a fluid medium. Fluid flowing through a channel in a microfluidic device exhibits many unique properties. Typically, the dimensionless Reynolds number is extremely low, resulting in flow that always remains laminar. Further, in this regime, two fluids joining will not easily mix, and diffusion alone may drive the mixing of two compounds.

In addition, the subject devices, in some embodiments, include one or more temperature and/or pressure control module. Such a module may be capable of modulating temperature and/or pressure of a carrier fluid in one or more flow channels of a device. More specifically, a temperature control module may be one or more thermal cycler. In some cases, the microfluidic device includes a moat salt solution to generate the field gradient used for dielectrophoretic deflection and to limit stray fields that can cause unintended droplet merger.

In some cases, the device is configured to create 5 or more combined discrete entities per minute, including 10 or more, 25 or more, 50 or more, 75 or more, 100 or more, 150 or more, 200 or more, or 300 or more. In some cases, the device is configured to make 300 or more combined discrete entities per hour, including 1,500 or more, 3,000 or more, 4,500 or more, 6,000 or more, 9,000 or more, 12,000 or more, or 21,000 or more.

In some cases, the device is configured to selectively combine discrete entities such that the resulting combined discrete entity includes 2 or more cells, including 3 or more cells, 4 or more cells, 5 or more cells, 6 or more cells, 7 or more cells, 8 or more cells, 9 or more cells, 10 or more cells, or 15 or more cells.

The present disclosure also provides electrode systems, for example, an electrode system including: individually controllable electrodes, wherein each electrode can be positioned in proximity to a sorter channel or a discrete entity merger region of a microfluidic device; a power source; and a controller, wherein the controller is configured to selectively enable or disable an electrical connection between the power source and each individually controllable electrode in the array thereby providing an active an inactive electrode respectively, and wherein, each active electrode in proximity of the sorter channel is capable of sorting a discrete entity to a first outlet channel or a second outlet channel and each active electrode in proximity to the discrete entity merger region is capable of trapping a plurality of discrete entities in the discrete entity merger region for a time sufficient for the plurality of discrete entities to combine to form a combined discrete entity.

Incubation and Sequencing

In some cases, the methods include selectively combining two or more discrete entities into a combined discrete entity and releasing the combined discrete entity, wherein the combined discrete entity contains at least one cell. The method further includes incubating at least one combined discrete entity containing at least one cell. The method further includes sequencing one or more cells from the incubated cell or cells, e.g. after incubation, the composition is used to create one or more discrete entities that are then passed through the microfluidic device and sequenced. This is performed by injecting incubated discrete entities into the microfluidic device and selectively combing with discrete entities containing sequencing sample preparation reagents, such as lysis buffer and RNA capture beads.

Various features and examples of microfluidic device components suitable for use with this disclosure will now be described.

Fabrication

Microfluidic devices, in some embodiments of this disclosure, are fabricated using microfabrication technology. Such technology may be employed to fabricate integrated circuits (ICs), microelectromechanical devices (MEMS), display devices, and the like. Among the types of microfabrication processes that can be employed to produce small dimension patterns in microfluidic device fabrication are photolithography (including X-ray lithography, e-beam lithography, etc.), self-aligned deposition and etching technologies, anisotropic deposition and etching processes, self-assembling mask formation (e.g., forming layers of hydrophobic-hydrophilic copolymers), etc.

According to the disclosed embodiments, microfabrication processes differ depending on the type of materials used in the substrate and/or the desired production volume. For small volume production or prototypes, fabrication techniques include LIGA, powder blasting, laser ablation, mechanical machining, electrical discharge machining, photoforming, etc. Technologies for mass production of microfluidic devices may use either lithographic or master-based replication processes. Lithographic processes for fabricating substrates from silicon/glass include both wet and dry etching techniques commonly used in fabrication of semiconductor devices. Injection molding and hot embossing typically are used for mass production of plastic substrates.

Surface Treatments and Coatings

Surface modification may be useful for controlling the functional mechanics (e.g., flow control) of a microfluidic device and may be applied according to the subject disclosure. For example, it may be useful to keep fluidic species from adsorbing to channel walls or for attaching antibodies to the surface for detection of biological components.

Polymer devices in particular tend to be hydrophobic, and thus loading of the channels may be difficult. The hydrophobic nature of polymer surfaces may also make it difficult to control electroosmotic flow (EOF). One technique for coating polymer surface according to the subject disclosure is the application of polyelectrolyte multilayers (PEM) to channel surfaces. PEM involves filling the channel successively with alternating solutions of positive and negative polyelectrolytes allowing for multilayers to form electrostatic bonds. Although the layers typically do not bond to the channel surfaces, they may completely cover the channels even after long-term storage. Another technique for applying a hydrophilic layer on polymer surfaces according to the subject disclosure involves the UV grafting of polymers to the surface of the channels. First grafting sites, radicals, are created at the surface by exposing the surface to UV irradiation while simultaneously exposing the device to a monomer solution. The monomers react to form a polymer covalently bonded at the reaction site. In some cases, the channels of the device or system are coated with a fluorosilane, e.g. when a fluorinated fluid is passed therethrough.

In some embodiments, glass channels according to the subject disclosure, generally have high levels of surface charge, thereby causing proteins to adsorb and possibly hindering separation processes. In some situations, the disclosure includes applying a polydimethylsiloxane (PDMS) and/or surfactant coating to the glass channels. Other polymers that may be employed to retard surface adsorption include polyacrylamide, glycol groups, polysiloxanes, glyceroglycidoxypropyl, poly(ethyleneglycol) and hydroxyethylated poly(ethyleneimine) Furthermore, subject electroosmotic devices may include a coating bearing a charge that is adjustable in magnitude by manipulating conditions inside of the device (e.g. pH). The direction of the flow can also be selected based on the coating since the coating can either be positively or negatively charged.

Specialized coatings can also be applied according to this disclosure to immobilize certain species on the channel surface—this process is called "functionalizing the surface." For example, a polymethylmethacrylate (PMMA) surface may be coated with amines to facilitate attachment of a variety of functional groups or targets. Alternatively, PMMA surfaces can be rendered hydrophilic through an oxygen plasma treatment process.

Microfluidic Elements

Microfluidic systems and devices according to the subject disclosure can contain one or more flow channels, such as microchannels, valves, pumps, reactors, mixers and other/or components. Some of these components and their general structures and dimensions are discussed below.

Various types of valves can be applied for flow control in microfluidic devices of this disclosure. These include, but are not limited to, passive valves and check valves (membrane, flap, bivalvular, leakage, etc.). Flow rate through these valves are dependent on various physical features of the valve such as surface area, size of flow channel, valve material, etc. Valves also have associated operational and manufacturing advantages/disadvantages that may be taken into consideration during design of a microfluidic device.

Embodiments of the subject devices include one or more micropumps. Micropumps, as with other microfluidic components, are subjected to manufacturing constraints. Typical considerations in pump design include treatment of bubbles, clogs, and durability. Micropumps which may be included in the subject devices include, but are not limited to electric equivalent pumps, fixed-stroke microdisplacement, peristaltic micromembrane and/or pumps with integrated check valves.

Macrodevices rely on turbulent forces such as shaking and stirring to mix reagents. In comparison, such turbulent forces are not practically attainable in microdevices, such as those of the present disclosure, and instead mixing in microfluidic devices is generally accomplished through diffusion. Since mixing through diffusion can be slow and inefficient, microstructures, such as those employed with the disclosed subject matter, are often designed to enhance the mixing process. These structures manipulate fluids in a way that increases interfacial surface area between the fluid regions, thereby speeding up diffusion. In certain embodiments, microfluidic mixers are employed. Such mixers may be provided upstream from, and in some cases integrated with, a microfluidic separation device and/or a sorter, of this disclosure.

In some embodiments, the devices and systems of the present disclosure include micromixers. Micromixers may be classified into two general categories: active mixers and passive mixers. Active mixers work by exerting active control over flow regions (e.g. varying pressure gradients, electric charges, etc.). Passive mixers do not require inputted energy and use only "fluid dynamics" (e.g. pressure) to drive fluid flow at a constant rate. One example of a passive mixer involves stacking two flow streams on top of one another separated by a plate. The flow streams are contacted with each other once the separation plate is removed. The stacking of the two liquids increases contact area and decreases diffusion length, thereby enhancing the diffusion process. Mixing and reaction devices can be connected to heat transfer systems if heat management is needed. As with macro-heat exchangers, micro-heat exchanges can either have co-current, counter-current, or cross-flow flow schemes. Microfluidic devices may have channel widths and depths between about 10 μm and about 10 cm. One channel structure includes a long main separation channel, and three shorter "offshoot" side channels terminating in either a buffer, sample, or waste reservoir. The separation channel can be several centimeters long, and the three side channels usually are only a few millimeters in length. Of course, the actual length, cross-sectional area, shape, and branch design of a microfluidic device depends on the application as well other design considerations such as throughput (which depends on flow resistance), velocity profile, residence time, etc.

Microfluidic devices described herein may include one or more electric field generators to perform certain steps of the methods described herein, including, but not limited to, picoinjection, droplet coalescence, selective droplet fusion, and droplet sorting. In certain embodiments, the electric fields are generated using metal electrodes. In particular embodiments, electric fields are generated using liquid electrodes. In certain embodiments, liquid electrodes include liquid electrode channels filled with a conducting liquid (e.g. salt water or buffer) and situated at positions in the microfluidic device where an electric field is desired. In particular embodiments, the liquid electrodes are energized using a power supply or high voltage amplifier. In some embodiments, the liquid electrode channel includes an inlet port so that a conducting liquid can be added to the liquid electrode channel Such conducting liquid may be added to the liquid electrode channel, for example, by connecting a tube filled with the liquid to the inlet port and applying pressure. In particular embodiments, the liquid electrode channel also includes an outlet port for releasing conducting liquid from the channel. In particular embodiments, the liquid electrodes are used in picoinjection, droplet coalescence, selective droplet fusion, and/or droplet sorting aspects of a microfluidic device described herein. Liquid electrodes may find use, for example, where a material to be injected via application of an electric field is not charged.

In certain embodiments, the width of one or more of the microchannels of the microfluidic device (e.g., input microchannel, pairing microchannel, pioinjection microchannel, and/or a flow channel upstream or downstream of one or more of these channels) is 100 microns or less, e.g., 90 microns or less, 80 microns or less, 70 microns or less, 60 microns or less, 50 microns or less, e.g., 45 microns or less, 40 microns or less, 39 microns or less, 38 microns or less, 37 microns or less, 36 microns or less, 35 microns or less, 34 microns or less, 33 microns or less, 32 microns or less, 31 microns or less, 30 microns or less, 29 microns or less, 28 microns or less, 27 microns or less, 26 microns or less, 25 microns or less, 20 microns or less, 15 microns or less, or 10 microns or less. In some embodiments, the width of one or more of the above microchannels is from about 10 microns to about 15 microns, from about 15 microns to about 20 microns, from about 20 microns to about 25 microns, from about 25 microns to about 30 microns, from about 30 microns to about 35 microns, from about 35 microns to about 40 microns, from about 40 microns to about 45 microns, or from about 45 microns to about 50 microns, from about 50 microns to about 60 microns, from about 60 microns to about 70 microns, from about 70 microns to about 80 microns, from about 80 microns to about 90 microns, or from about 90 microns to about 100 microns.

Additional descriptions of various microchannel structures and features which may be utilized in connection with the disclosed methods and devices are provided in PCT Publication No. WO 2014/028378, the disclosure of which is incorporated by reference herein in its entirety and for all purposes.

Glass, Silicon and Other “Hard” Materials (Lithography, Etching, Deposition)

According to embodiments of the disclosed subject matter, a combination of lithography, etching and/or deposition techniques may be used to make microcanals and microcavities out of glass, silicon and other “hard” materials. Technologies based on the above techniques may be applied in fabrication of devices in the scale of 0.1-500 micrometers.

Microfabrication techniques based on semiconductor fabrication processes are generally carried out in a clean room. The quality of the clean room is classified by the number of particles <4 μm in size in a cubic inch. Typical clean room classes for MEMS microfabrication may be 1000 to 10000.

In certain embodiments, photolithography may be used in microfabrication. In photolithography, a photoresist that has been deposited on a substrate is exposed to a light source through an optical mask. Conventional photoresist methods allow structural heights of up to 10-40 μm. If higher structures are needed, thicker photoresists such as SU-8, or polyimide, which results in heights of up to 1 mm, can be used.

After transferring the pattern on the mask to the photoresist-covered substrate, the substrate is then etched using either a wet or dry process. In wet etching, the substrate—area not protected by the mask—is subjected to chemical attack in the liquid phase. The liquid reagent used in the etching process depends on whether the etching is isotropic or anisotropic. Isotropic etching generally uses an acid to form three-dimensional structures such as spherical cavities in glass or silicon. Anisotropic etching forms flat surfaces such as wells and canals using a highly basic solvent. Wet anisotropic etching on silicon creates an oblique channel profile.

Dry etching involves attacking the substrate by ions in either a gaseous or plasma phase. Dry etching techniques can be used to create rectangular channel cross-sections and arbitrary channel pathways. Various types of dry etching that may be employed including physical, chemical, physico-chemical (e.g., RIE), and physico-chemical with inhibitor. Physical etching uses ions accelerated through an electric field to bombard the substrate's surface to “etch” the structures. Chemical etching may employ an electric field to migrate chemical species to the substrate's surface. The chemical species then reacts with the substrate's surface to produce voids and a volatile species.

In certain embodiments, deposition is used in microfabrication. Deposition techniques can be used to create layers of metals, insulators, semiconductors, polymers, proteins and other organic substances. Most deposition techniques fall into one of two main categories: physical vapor deposition (PVD) and chemical vapor deposition (CVD). In one approach to PVD, a substrate target is contacted with a holding gas (which may be produced by evaporation for example). Certain species in the gas adsorb to the target's surface, forming a layer constituting the deposit. In another approach commonly used in the microelectronics fabrication industry, a target containing the material to be deposited is sputtered with using an argon ion beam or other appropriately energetic source. The sputtered material then deposits on the surface of the microfluidic device. In CVD, species in contact with the target react with the surface, forming components that are chemically bonded to the object. Other deposition techniques include: spin coating, plasma spraying, plasma polymerization, dip coating, casting and Langmuir-Blodgett film deposition. In plasma spraying, a fine powder containing particles of up to 100 μm in diameter is suspended in a carrier gas. The mixture containing the particles is accelerated through a plasma jet and heated. Molten particles splatter onto a substrate and freeze to form a dense coating. Plasma polymerization produces polymer films (e.g. PMMA) from plasma containing organic vapors.

Once the microchannels, microcavities and other features have been etched into the glass or silicon substrate, the etched features are usually sealed to ensure that the microfluidic device is "watertight." When sealing, adhesion can be applied on all surfaces brought into contact with one another. The sealing process may involve fusion techniques such as those developed for bonding between glass-silicon, glass-glass, or silicon-silicon.

Anodic bonding can be used for bonding glass to silicon. A voltage is applied between the glass and silicon and the temperature of the system is elevated to induce the sealing of the surfaces. The electric field and elevated temperature induces the migration of sodium ions in the glass to the glass-silicon interface. The sodium ions in the glass-silicon interface are highly reactive with the silicon surface forming a solid chemical bond between the surfaces. The type of glass used may have a thermal expansion coefficient near that of silicon (e.g. Pyrex Corning 7740).

Fusion bonding can be used for glass-glass or silicon-silicon sealing. The substrates are first forced and aligned together by applying a high contact force. Once in contact, atomic attraction forces (primarily van der Waals forces) hold the substrates together so they can be placed into a furnace and annealed at high temperatures. Depending on the material, temperatures used ranges between about 600 and 1100° C.

Polymers/Plastics

A variety of techniques may be employed for micromachining plastic substrates in accordance with the subject embodiments. Among these are laser ablation, stereolithography, oxygen plasma etching, particle jet ablation, and microelectro-erosion. Some of these techniques can be used to shape other materials (glass, silicon, ceramics, etc.) as well.

To produce multiple copies of a microfluidic device, replication techniques are employed. Such techniques involve first fabricating a master or mold insert containing the pattern to be replicated. The master is then used to mass-produce polymer substrates through polymer replication processes.

In the replication process, the master pattern contained in a mold is replicated onto the polymer structure. In certain embodiments, a polymer and curing agent mix is poured onto a mold under high temperatures. After cooling the mix, the polymer contains the pattern of the mold, and is then removed from the mold. Alternatively, the plastic can be injected into a structure containing a mold insert. In micro-injection, plastic heated to a liquid state is injected into a mold. After separation and cooling, the plastic retains the mold's shape.

PDMS (polydimethylsiloxane), a silicon-based organic polymer, may be employed in the molding process to form microfluidic structures. Because of its elastic character, PDMS is suited for microchannels between about 5 μm and 500 μm. Specific properties of PDMS make it suitable for microfluidic purposes. Such properties include:

1) It is optically clear which allows for visualization of the flows.
2) PDMS, when mixed with a proper amount of reticulating agent, has elastomeric qualities that facilitates keeping microfluidic connections "watertight."
3) Valves and pumps using membranes can be made with PDMS because of its elasticity.
4) Untreated PDMS is hydrophobic, and becomes temporarily hydrophilic after oxidation of surface by oxygen plasma or after immersion in strong base; oxidized PDMS adheres by itself to glass, silicon, or polyethylene, as long as those surfaces were themselves exposed to an oxygen plasma.
5) PDMS is permeable to gas. Filling of the channel with liquids is facilitated even when there are air bubbles in the canal because the air bubbles are forced out of the material. Additionally, PDMS is also permeable to non polar-organic solvents.

Microinjection can be used to form plastic substrates employed in a wide range of microfluidic designs. In this process, a liquid plastic material is first injected into a mold under vacuum and pressure, at a temperature greater than the glass transition temperature of the plastic. The plastic is then cooled below the glass transition temperature. After removing the mold, the resulting plastic structure is the negative of the mold's pattern.

Yet another replicating technique is hot embossing, in which a polymer substrate and a master are heated above the polymer's glass transition temperature, Tg (which for PMMA or PC is around 100-180° C.). The embossing master is then pressed against the substrate with a preset compression force. The system is then cooled below Tg and the mold and substrate are then separated.

Typically, the polymer is subjected to the highest physical forces upon separation from the mold tool, particularly when the microstructure contains high aspect ratios and vertical walls. To avoid damage to the polymer microstructure, material properties of the substrate and the mold tool may be taken into consideration. These properties include: sidewall roughness, sidewall angles, chemical interface between embossing master and substrate and temperature coefficients. High sidewall roughness of the embossing tool can damage the polymer microstructure since roughness contributes to frictional forces between the tool and the structure during the separation process. The microstructure may be destroyed if frictional forces are larger than the local tensile strength of the polymer. Friction between the tool and the substrate may be important in microstructures with vertical walls. The chemical interface between the master and substrate could also be of concern. Because the embossing process subjects the system to elevated temperatures, chemical bonds could form in the master-substrate interface. These interfacial bonds could interfere with the separation process. Differences in the thermal expansion coefficients of the tool and the substrate could create addition frictional forces.

Various techniques can be employed to form molds, embossing masters, and other masters containing patterns used to replicate plastic structures through the replication processes mentioned above. Examples of such techniques include LIGA (described below), ablation techniques, and various other mechanical machining techniques. Similar techniques can also be used for creating masks, prototypes and microfluidic structures in small volumes. Materials used for the mold tool include metals, metal alloys, silicon and other hard materials.

Laser ablation may be employed to form microstructures either directly on the substrate or through the use of a mask. This technique uses a precision-guided laser, typically with wavelength between infrared and ultraviolet. Laser ablation may be performed on glass and metal substrates, as well as on polymer substrates. Laser ablation can be performed either through moving the substrate surface relative to a fixed laser beam, or moving the beam relative to a fixed substrate. Various micro-wells, canals, and high aspect structures can be made with laser ablation.

Certain materials, such as stainless steel, make durable mold inserts and can be micromachined to form structures down to the 10-μm range. Various other micromachining techniques for microfabrication exist including μ-Electro Discharge Machining (μ-EDM), μ-milling, focused ion beam milling. μ-EDM allows the fabrication of 3-dimensional structures in conducting materials. In μ-EDM, material is removed by high-frequency electric discharge generated between an electrode (cathode tool) and a workpiece (anode). Both the workpiece and the tool are submerged in a dielectric fluid. This technique produces a comparatively rougher surface but offers flexibility in terms of materials and geometries.

Electroplating may be employed for making a replication mold tool/master out of, e.g., a nickel alloy. The process starts with a photolithography step where a photoresist is used to defined structures for electroplating. Areas to be electroplated are free of resist. For structures with high aspect ratios and low roughness requirements, LIGA can be used to produce electroplating forms. LIGA is a German acronym for Lithographic (Lithography), Galvanoformung (electroplating), Abformung (molding). In one approach to LIGA, thick PMMA layers are exposed to x-rays from a synchrotron source. Surfaces created by LIGA have low roughness (around 10 nm RMS) and the resulting nickel tool has good surface chemistry for most polymers.

As with glass and silicon devices, polymeric microfluidic devices must be closed up before they can become functional. Common problems in the bonding process for microfluidic devices include the blocking of channels and changes in the physical parameters of the channels. Lamination is one method used to seal plastic microfluidic devices. In one lamination process, a PET foil (about 30 μm) coated with a melting adhesive layer (typically 5 μm-10 μm) is rolled with a heated roller, onto the microstructure. Through this process, the lid foil is sealed onto the channel plate. Several research groups have reported a bonding by polymerization at interfaces, whereby the structures are heated and force is applied on opposite sides to close the channel But excessive force applied may damage the microstructures. Both reversible and irreversible bonding techniques exist for plastic-plastic and plastic-glass interfaces. One method of reversible sealing involves first thoroughly rinsing a PDMS substrate and a glass plate (or a second piece of PDMS) with methanol and bringing the surfaces into contact with one another prior to drying. The microstructure is then dried in an oven at 65° C. for 10 min. No clean room is required for this process. Irreversible sealing is accomplished by first thoroughly rinsing the pieces with methanol and then drying them separately with a nitrogen stream. The two pieces are then placed in an air plasma cleaner and oxidized at high power for about 45 seconds. The substrates are then brought into contact with each other and an irreversible seal forms spontaneously.

Other available techniques include laser and ultrasonic welding. In laser welding, polymers are joined together through laser-generated heat. This method has been used in the fabrication of micropumps. Ultrasonic welding is another bonding technique that may be employed in some applications.

One nucleic acid amplification technique described herein is a polymerase chain reaction (PCR). However, in certain embodiments, non-PCR amplification techniques may be employed such as various isothermal nucleic acid amplification techniques; e.g., real-time strand displacement amplification (SDA), rolling-circle amplification (RCA) and multiple-displacement amplification (MDA).

Regarding PCR amplification modules, it will be necessary to provide to such modules at least the building blocks for amplifying nucleic acids (e.g., ample concentrations of four nucleotides), primers, polymerase (e.g., Taq), and appropriate temperature control programs). The polymerase and nucleotide building blocks may be provided in a buffer solution provided via an external port to the amplification module or from an upstream source. In certain embodiments, the buffer stream provided to the sorting module contains some of all the raw materials for nucleic acid amplification. For PCR in particular, precise temperature control of the reacting mixture is extremely important in order to achieve high reaction efficiency. One method of on-chip thermal control is Joule heating in which electrodes are used to heat the fluid inside the module at defined locations. The fluid conductivity may be used as a temperature feedback for power control.

In certain aspects, the discrete entities, e.g., microdroplets, containing the PCR mix may be flowed through a channel that incubates the discrete entities under conditions effective for PCR. Flowing the discrete entities through a channel may involve a channel that snakes over various temperature zones maintained at temperatures effective for PCR. Such channels may, for example, cycle over two or more temperature zones, wherein at least one zone is maintained at about 65° C. and at least one zone is maintained at about 95° C. As the discrete entities move through such zones, their temperature cycles, as needed for PCR. The precise number of zones, and the respective temperature of each zone, may be readily determined by those of skill in the art to achieve the desired PCR amplification.

Exemplary Non-Limiting Aspects of the Disclosure

Aspects, including embodiments, of the present subject matter described above may be beneficial alone or in combination, with one or more other aspects or embodiments. Without limiting the foregoing description, certain numbered, non-limiting aspects of the disclosure are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below.

1. A microfluidic device comprising:
- a) an inlet channel;
- b) a sorting channel in fluid communication with the inlet channel;
- c) a first outlet channel and a second outlet channel in fluid communication with the sorting channel, wherein the first outlet channel comprises a discreet entity merger region;
- d) a sorting element positioned in proximity to the sorting channel, wherein the sorting element is configured to sort a discrete entity in the sorting channel to the first outlet channel; and
- e) a trapping element positioned in proximity to the discrete entity merger region, wherein the trapping element and discrete entity merger region are configured to trap a plurality of discrete entities in the discrete entity merger region for a time sufficient for the plurality of discrete entities to combine to form a combined discrete entity.

2. The microfluidic device of aspect 1, wherein the sorting element comprises a sorting electrode that exert an electromagnetic force sufficient to sort a discrete entity in the sorting channel to the first outlet channel.

3. The microfluidic device of any one of aspects 1-2, wherein the electromagnetic force is a dielectrophoretic force.

4. The microfluidic device of any one of aspects 1-2, wherein the electromagnetic force is an electrophoretic force.

5. The microfluidic device of any one of aspects 1-4, further comprising a second sorting electrode.

6. The microfluidic device of aspect 5, further comprising a third sorting electrode.

7. The microfluidic device of any one of aspects 5-6, wherein the first and second sorting electrodes are configured such that the first and second sorting electrodes form a bipolar electrode pair and the first trapping electrode is positively charged.

8. The microfluidic device of any one of aspects 5-7, wherein the first and second sorting electrodes are positioned on opposite sides of the sorting channel.

9. The microfluidic device of any one of aspects 5-8, wherein the first sorting electrode is positioned closer to the sorting channel than the second sorting electrode, or the second sorting electrode is positioned closer to the sorting channel than the first sorting electrode.

10. The microfluidic device of any one of aspects 5-9, wherein a distance between an end of the first sorting electrode, the second sorting electrode, or both and an interior wall the sorter channel is between approximately 1 μm and approximately 100 μm.

11. The microfluidic device of any one of aspects 5-10, wherein a distance between the first sorting electrode and the second sorting electrode is approximately 25 μm to approximately 500 μm.

12. The microfluidic device of any one of aspects 5-11, wherein the first sorting electrode and the second sorting electrode are connected to an alternating current electrical source with a frequency of approximately 0.1 kHz to approximately 100 kHz and a voltage of approximately 10 V to approximately 10,000 V.

13. The microfluidic device of any one of aspects 2-12, wherein each sorting electrode comprises a liquid electrode.

14. The microfluidic device of aspect 13, wherein each sorting liquid electrode comprise one or more liquid channels imbedded in the microfluidic device and filled with conductive media.

15. The microfluidic device of aspect 1, wherein the sorting element comprises a valve, an surface wave sorting element, an acoustic streaming element, or a combination thereof.

16. The microfluidic device of any one of aspects 1-14, wherein the trapping element exerts an electromagnetic force, exerts a mechanical force, or a combination thereof sufficient to trap a plurality of discrete entities in the discrete entity merger region for a time sufficient for the plurality of discrete entities to combine to form a combined discrete entity.

17. The microfluidic device of any one of aspects 1-16, wherein the trapping element comprises a first trapping electrode that exert an electromagnetic force sufficient to trap a plurality of discrete entities in the discrete entity merger region for a time sufficient for the plurality of discrete entities to combine to form a combined discrete entity.

18. The microfluidic device of aspect 17, wherein the electromagnetic force is a dielectrophoretic force.

19. The microfluidic device of aspect 17, wherein the electromagnetic force is an electrophoretic force.

20. The microfluidic device of any one of aspects 17-19, further comprising a second trapping electrode.

21. The microfluidic device of aspect 20, further comprising a third trapping electrode.

22. The microfluidic device of any one of aspects 20-21, wherein the first and second sorting electrodes are configured such that the first and second sorting electrodes form a bipolar electrode pair and the first trapping electrode is positively charged.

23. The microfluidic device of any one of aspects 20-22, wherein the first and second sorting electrodes are positioned on the same side of the sorting channel.

24. The microfluidic device of any one of aspects 20-23, wherein the first trapping electrode is positioned closer to the first outlet channel than the second trapping electrode, or the second trapping electrode is positioned closer to the first outlet channel than the first trapping electrode.

25. The microfluidic device of any one of aspects 20-24, wherein a distance between an end of the first trapping electrode, the second trapping electrode, or both and an interior wall the first outlet channel is between approximately 10 μm and approximately 50 μm.

26. The microfluidic device of any one of aspects 20-25, wherein a distance between the first trapping electrode and the second trapping electrode is approximately 25 μm to approximately 500 μm.

27. The microfluidic device of aspect 26, wherein the distance is approximately 50 μm to approximately 200 μm.

28. The microfluidic device of any one of aspects 20-27, wherein the first trapping electrode and the second trapping electrode are connected to an alternating current electrical source with a frequency of approximately 0.1 kHz to approximately 100 kHz and a voltage of approximately 10 V to approximately 10,000 V.

29. The microfluidic device of aspect 28, wherein the frequency is approximately 1 kHz to approximately 50 kHz.

30. The microfluidic device of any one of aspects 17-29, wherein each trapping electrode comprises a liquid electrode.

31. The microfluidic device of aspect 30, wherein each trapping liquid electrode comprise one or more liquid channels imbedded in the microfluidic device and filled with conductive media.

32. The microfluidic device of any one of aspects 20-31, wherein the first trapping electrode electrodes extends along the first outlet channel downstream of the discrete entity merger region or the second trapping electrode extends along the first outlet channel downstream of the discrete entity merger region.

33. The microfluidic device of any one of aspects 1-32, wherein the sorting channel defines a concentric or approximately concentric flow path, and wherein a portion of the first sorting electrode is located at the center of the concentric or approximately concentric flow path.

34. The microfluidic device of aspect 33, wherein the first sorting electrode is positioned closer to the first outlet channel than to the second outlet channel.

35. The microfluidic device of any one of aspects 1-33, wherein the microfluidic device further comprises a partial height flow divider positioned in the sorting channel, wherein the partial height flow divider is configured to direct a discrete entity towards the first outlet channel or the second outlet channel.

36. The microfluidic device of aspect 35, wherein the height of the partial height flow divider is approximately 50% to 75% of the height of the sorting channel.

37. The microfluidic device of any one of aspects 1-36, wherein the discrete entity merger region comprises a feature selected from the group consisting of: a geometric change in a dimension of the first outlet channel, a flow obstacle, a flow divider, a laminating fluid inlet, a valve, or a combination thereof.

38. The microfluidic device of any one of aspects 1-37, wherein the discrete entity merger region comprises a geometric change in a dimension of the first outlet channel, and wherein the geometric change comprises an increase in the cross-sectional area of the first outlet channel.

39. The microfluidic device of any one of aspects 1-38, where the discrete entity merger region comprises a geometric change, and wherein the geometric change comprises a recess in a wall of the first outlet channel.

40. The microfluidic device of any one of aspects 1-39, wherein the discrete entity merger region comprises a laminating fluid inlet channel configured such that flowing laminating fluid through the laminating fluid inlet channel will direct a discrete entity in the discrete entity merger region towards a trapping electrode.

41. The microfluidic device of aspect 40, wherein the discrete entity merger region further comprises a flow divider, wherein the laminating fluid inlet channel and flow divider are configured such that flowing laminating fluid through the laminating fluid inlet channel will direct a discrete entity in the discrete entity merger region towards a trapping electrode.

42. The microfluidic device of any one of aspects 38-41, wherein the first inlet channel comprises an upstream region located between the sorting channel and the discrete entity merger region, and wherein the change in cross-sectional area is such that the discrete entity merger region has a larger cross-sectional area than the upstream region.

43. The microfluidic device of any one of aspects 1-42, wherein the discrete entity merger region has a triangular shape, an approximately triangular shape, a trapezoidal shape, or an approximately trapezoidal shape defined by channel walls of the microfluidic device.

44. The microfluidic device of any one of aspects 1-43, wherein the discrete entity merger region comprises a valve, wherein the valve is a membrane valve configured to impede the flow of a discrete entity past the discrete entity merger region while allowing flow of the carrier fluid past the discrete entity merger region in a first state, and wherein the membrane valve is configured to release the discrete entity or a combined discrete entity in a second state.

45. The microfluidic device of any one of aspects 1-44, wherein the first outlet channel comprises an angled turn in the channel wall downstream of the discreet entity merger region.

46. The microfluidic device of any one of aspects 1-45, wherein the microfluidic device further comprises a partial height flow divider positioned in the first outlet channel, wherein the partial height flow divider is configured to direct a discrete entity towards a trapping electrode in the discreet entity merger region.

47. The microfluidic device of aspect 46, wherein the height of the partial height flow divider is approximately 50% to 75% of the height of the first outlet channel.

48. The microfluidic device of any one of aspects 1-47, wherein the microfluidic device comprises a spacer fluid channel in fluid communication with the inlet channel, wherein the spacer fluid channel is configured such that flowing spacer fluid through the spacer fluid channel causes spacer fluid to be located between two discrete entities flowing through the inlet channel, thereby maintaining or increasing the distance between the two discrete entities, and thereby allowing each of the two discrete entities to be independently sorted or not sorted.

49. The microfluidic device of aspect 48, wherein the spacer fluid is oil.

50. The microfluidic device of any one of aspects 1-49, wherein the microfluidic device comprises a bias fluid channel in fluid communication with the sorting channel, wherein the bias fluid channel is configured such that flowing bias fluid through the bias fluid channel will cause a discrete entity to move closer to a second side wall of the sorter channel and farther away from a first side wall of the sorter channel.

51. The microfluidic device of aspect 50, wherein the bias fluid is oil.

52. The microfluidic device of any one of aspects 1-51, wherein the first outlet channel is configured to receive a discrete entity positioned closer to the first side wall of the sorting channel than the second side wall of the sorting channel, and wherein the second outlet channel is configured to receive a discrete entity positioned closer to the second side wall of the sorting channel than the first side wall of the sorting channel.

53. The microfluidic device of any one of aspects 1-52, wherein the microfluidic device is configured such that if the sorting element does not exert a force on a discrete entity flowing through the sorter channel, the discrete entity will flow into the second outlet channel.

54. The microfluidic device of any one of aspects 1-53, wherein the first outlet channel is configured such that a discrete entity flowing through the first outlet channel is directed towards a first side wall of the first outlet channel.

55. The microfluidic device of any one of aspects 1-54, wherein the discrete entities are droplets.

56. The microfluidic device of any one of aspect 1-55, wherein the discrete entities comprise: one or more cells, one or more beads, one or more particles, one or more reagents, one or more media, one or more drugs, one or more extracellular matrices, one or more hydrogels, or a combination thereof.

57. The microfluidic device of any one of aspects 1-56, wherein the discrete entities comprise an RNA capture bead.

58. The microfluidic device of any one of aspects 1-57, wherein the discrete entities comprise an immunoassay bead.

59. The microfluidic device of any one of aspects 1-58, wherein the discrete entities comprise a reagent, a drug, an extracellular matrix, or a combination thereof.

60. The microfluidic device of any one of aspects 1-59, wherein the discrete entities comprise one or more cells.

61. The microfluidic device of any one of aspects 1-60, wherein the discrete entities comprise a single cell.

62. The microfluidic device of any one of aspects 1-60, wherein the discrete entities comprise two or more cells.

63. The microfluidic device of aspect 60, wherein the one or more cells is labeled with a fluorescent tag.

64. The microfluidic device of any one of aspects 60, 62, or 63, wherein the one or more cells are pre-treated with a surface functionalization configured to encourage cellular aggregates inside the droplets.

65. The microfluidic device of any one of aspects 1-64, wherein one or more of the discrete entities lack a cell or lack more than one cell.

66. The microfluidic device of any one of aspects 1-64, wherein one or more of the discrete entities comprise a reagent but lack a cell, and wherein one or more of the discrete entities comprise a cell but lack a reagent.

67. The microfluidic device of any one of aspects 1-64, wherein one or more of the discrete entities comprise a cell, and wherein one or more of the discrete entities comprise a hydrogel, an extracellular matrix, or a combination thereof.

68. The microfluidic device of any one of aspects 1-67, wherein one or more of discrete entities comprise an RNA capture bead, and wherein one or more of the discrete entities comprise a reagent, wherein the reagent is an oligonucleotide configured to hybridize to the RNA capture bead.

69. The microfluidic device of any one of aspects 1-68, wherein a discrete entity comprises a drug and an oligonucleotide.

70. The microfluidic device of any one of aspects 1-69, wherein the discrete entities have a dimension of from about 1 μm to about 1000 μm.

71. The microfluidic device of aspect 70, wherein the discrete entities have a diameter of from about 1 μm to 1000 μm.

72. The microfluidic device of aspect 1, wherein the sorting element comprises an first sorting electrode and a second sorting electrode, wherein the trapping element comprises a first trapping electrode and a second trapping electrode, wherein the sorting channel defines a concentric or approximately concentric flow path, and wherein a portion of the first sorting electrode is located at the center of the concentric or approximately concentric flow path, wherein the microfluidic device comprises a bias fluid sorting channel in fluid communication with the sorting channel, wherein the bias fluid sorting channel is configured such that flowing fluid through the bias fluid sorter channel will cause a discrete entity to move closer to a second side wall of the inlet channel and farther away from a first side wall of the inlet channel, wherein the discrete entity merger region comprises a recess in a wall of the first outlet channel, wherein the discrete entity merger region has a triangular shape or an approximately triangular shape, and wherein the first outlet channel comprises an angled turn in the channel wall downstream of the discreet entity merger region.

73. The microfluidic device of aspect 1, wherein the sorting element comprises an first sorting electrode and a second sorting electrode positioned on opposite sides of the inlet channel, wherein the trapping element comprises a first trapping electrode and a second trapping electrode positioned on the same side of the first outlet channel, wherein the sorting channel defines a concentric or approximately concentric flow path, and wherein a portion of the first sorting electrode is located at the center of the concentric or approximately concentric flow path, wherein the first trapping electrode and second trapping electrode have different shapes from one another, wherein the first trapping electrode electrodes extends along the first outlet channel downstream of the discrete entity merger region or the second trapping electrode extends along the first outlet channel downstream of the discrete entity merger region, wherein the microfluidic device comprises a bias fluid sorting channel in fluid communication with the sorting channel, wherein the bias fluid sorting channel is configured such that flowing fluid through the bias fluid sorter channel will cause a discrete entity to move closer to a second side wall of the inlet channel and farther away from a first side wall of the inlet channel, wherein the discrete entity merger region comprises:

(a) a recess in a wall of the first outlet channel (b) a laminating fluid inlet channel configured such that flowing fluid through the laminating fluid inlet channel will direct a discrete entity in the discrete entity merger region towards a trapping electrode, and (c) a flow divider.

74. The microfluidic device of any one of aspects 1-73, further comprising a second inlet channel in fluid communication with the sorter channel.

75. The microfluidic device of any one of aspects 1-74, wherein the second outlet channel is a waste outlet channel.

76. The microfluidic device of any one of aspects 1-75, comprising a combined discrete entity exit channel in fluid communication with the first outlet, wherein the combined discrete entity exit channel is configured to receive the combined discrete entity.

77. A system, comprising a) the microfluidic device of any one of aspects 1-76; and b) one or more or all of:

i) a discrete entity maker configured to make a plurality of discrete entities, wherein the discrete entity maker is located within the microfluidic device or separately from the microfluidic device;

ii) a discrete entity library comprising two or more types of discrete entities;

iii) a detector configured to detect a discrete entity in the input channel, wherein the microfluidic device is configured to sort a discrete entity in the sorting channel based on the detection by the detector;

iv) a temperature control module operably connected to the microfluidic device;

v) an incubator operably connected to the microfluidic device;

vi) an imager configured to image a combined discrete entity; and vii) a sequencer operably connected to the microfluidic device or the incubator.

78. The system of aspect 77, wherein the system comprises a discrete entity maker.

79. The system of any one of aspects 77-78, wherein the discrete entity maker is a droplet maker.

80. The system of any one of aspects 77-79, wherein the discrete entity maker is configured to make discrete entities by cycling a valve while moving discrete entity fluid therethrough.

81. The system of aspect 80, wherein the valve is a piezoelectric actuator.

82. The system of any one of aspects 77-81, wherein the discrete entity maker is configured to make discrete entities by exposing discrete entity fluid to light, a magnetic force, or an electrical force.

83. The system of any one of aspects 77-82, wherein the system comprises a discrete entity library comprising two or more types of discrete entities.

84. The system of any one of aspects 77-83, wherein the discrete entity library comprises a first type of discrete entity that comprises a cell, and a second type of discrete entity that comprises a reagent.

85. The system of any one of aspects 77-84, wherein the discrete entity library comprises a first type of discrete entity that comprises a first type of cell, and a second type of discrete entity that comprises a second type of cell.

86. The system of any one of aspects 77-85, wherein the discrete entity library comprises a first type of discrete entity that comprises a cell, and a second type of discrete entity that comprises hydrogel, and extracellular matrix, or a combination thereof.

87. The system of any one of aspects 77-86, wherein the system comprises a detector configured to detect a discrete entity in the input channel, wherein the microfluidic device is configured to sort a discrete entity in the sorting channel based on the detection by the detector;

88. The system of any one of aspects 77-87, wherein system comprises an incubator operably connected to the microfluidic device.

89. The system of aspect 88, further comprising an imager configured to image a combined discrete entity in the incubator.

90. The system of aspect 77-89, wherein system comprises a sequencer operably connected to the microfluidic device or the incubator.

91. A method of selectively combining at least two discrete entities, the method comprising:

a) flowing two discrete entities in a carrier fluid through the inlet channel to the sorting channel of the microfluidic device or system of any one of aspects 1-90, wherein the two discrete entities are insoluble, immiscible, or a combination thereof in the carrier fluid;

b) selectively sorting the two discrete entities in the sorting channel to the first outlet channel; and c) trapping the two discrete entities in the discrete entity merger region for a time sufficient for the two discrete entities to combine to form a combined discrete entity.

92. The method of aspect 91, further comprising:

d) flowing a third discrete entity in the carrier fluid through the inlet channel to the sorting channel of the microfluidic device, wherein the third discrete entity is insoluble, immiscible, or a combination thereof in the carrier fluid;

e) selectively sorting the third discrete entity in the sorting channel to the first outlet channel; and f) trapping the third discrete entity in the discrete entity merger region such that it combines with the combined discrete entity created from the first and second discrete entities, wherein step d) happens before, concurrently with, or after each of steps b) and c), wherein step e) happens before, concurrently with, or after step c).

93. The method of any one of aspects 91-92, further comprising releasing the combined discrete entity from the discrete entity merger region by deactivating, decreasing, or reversing the trapping element such that the combined discrete entity flows out of the first outlet channel.

94. The method of any one of aspects 91-93, comprising imaging a discrete entity or the combined discrete entity in the discrete entity merger region.

95. The method of any one of aspects 91-94, wherein the releasing comprises deactivating the trapping electrode.

96. The method of any one of aspects 91-95, further comprising repeating the steps of the method at least once.

97. The method of any one of aspects 91-96, wherein at least one discrete entity is flowed through a first inlet channel and at least one discrete entity is flowed through a second inlet channel.

98. The method of any one of aspects 91-97, further comprising:

making a plurality of discrete entities, and storing the plurality of discrete entities for a period of time before the flowing step.

99. The method of any one of aspects 91-98, further comprising:

making a plurality of discrete entities, wherein the plurality of discrete entities are directed to the inlet channel without being stored for a period of time.

100. The method of any one of aspects 98-99, wherein the period of time is one minute.

101. The method of any one of aspects 91-99, wherein the making step comprises sorting and combining two or more types of discrete entities from a library of discrete entities.

102. The method of any one of aspects 91-101, wherein at least two of the discrete entities each comprise a different reagent, wherein the method is a method of selectively performing a reaction.

103. The method of any one of aspects 91-102, wherein at least one discrete entity comprises a cell and lacks a reagent, and at least one discrete entity comprises a reagent but lacks a cell, wherein the method is a method of selectively performing a reaction on the cell.

104. The method of any one of aspects 91-103, wherein the reagent is a cell lysis reagent.

105. The method of any one of aspects 91-103, wherein the reagent is a polymerase chain reaction (PCR) reagent.

106. The method of any one of aspects 91-103, wherein the reagent is a drug.

107. The method of any one of aspects 91-106, wherein at least one discrete entity comprises a cell, and at least one discrete entity comprises a hydrogel or an extracellular matrix.

108. The method of any one of aspects 91-107, wherein at least one discrete entity comprises a first type of cell and lacks a second type of cell, and at least one discrete entity comprises the second type of cell and lacks the first type of cell.

109. The method of any one of aspects 91-108, wherein a surface of at least one cell is functionalized with an oligonucleotide.

110. The method of any one of aspects 91-109, wherein the first discrete entity comprises an oligonucleotide and a second discrete entity comprises an RNA capture bead configured to hybridize with the oligonucleotide.

111. The method of any one of aspects 91-110, further comprising detecting a discrete entity in the inlet channel and sorting the discrete entity based on the detection.

112. The method of any one of aspects 91-111, wherein the discrete entities are not detected before reaching the inlet channel.

113. The method of any one of aspects 91-112, wherein the detection comprises optically interrogating the discrete entity.

114. The method of aspect 113, wherein the optically interrogating comprises fluorescence measurement.

115. The method of any one of aspects 91-114, wherein at least one discrete entity comprises a cell, the method further comprising culturing the cell, wherein the method is a method of selectively culturing a cell or cells.

116. The method of aspect 115, wherein the culturing is performed in an incubator operably connected to the microfluidic device.

117. The method of aspects 115-116, wherein the culturing is performed for at least 12 hours.

118. The method of any one of aspects 91-116, further comprising sequencing the genome, proteome, transcriptome, or a combination thereof of a cell from a discrete entity or combined discrete entity, wherein the method is a method of selectively sequencing a cell.

119. The method of aspect 118, further comprising selectively combining the incubated cells with one or more sequencing reagents using the device, wherein the selective combining occurs before the sequencing step.

120. The method of aspect 119, wherein the one or more sequencing reagents comprise a lysis buffer.

121. The method of any one of aspects 119-120, wherein the one or more sequencing reagents comprises an RNA-sequencing reagent.

122. The method of any one of aspects 118-120, wherein the one or more sequencing reagents comprises a barcoded RNA capture bead.

123. The method of any one of aspects 91-118, further comprising measuring the effect of a drug on the cell, wherein the method is a method of selectively measuring the effect of a drug on a cell.

124. The method of any one of aspects 91-123, further comprising collecting cell-to-cell interaction data on the interaction between a first cell and a second cell, wherein the method is a method of selectively collecting cell-to-cell interaction data.

125. The method of aspect 124, wherein the first cell is an immune cell and the second cell is a cancer cell.

126. The method of aspect 125, wherein the immune cell is an engineered T cell.

127. The method of aspect 126, wherein the engineered T cell is a chimeric antigen receptor T cell (CAR-T cell).

128. The method of any one of aspects 124-127, wherein the cell-to-cell interaction data comprises the efficacy of the engineered T cell at killing the cancer cell.

129. The method of any one of aspects 124-128, wherein the cell-to-cell interaction data comprises genomic data of one or more of the cells.

130. The method of any one of aspects 91-129, further comprising making a three-dimensional cell culture from at least one combined discrete entity.

131. The method of aspect 130, wherein the three-dimensional cell culture is an organoid.

132. The method of aspect 130, wherein the three-dimensional cell culture is a spheroid.

133. The method of any one of aspects 130-132, wherein at least one cell is a nervous system cell.

134. The method of aspect 133, wherein the nervous system cell is a neuron.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s); and the like.

Example 1: Microfluidic Device Fabrication

Microfluidic devices were fabricated using standard soft lithography procedures. Device geometries were drawn using Autocad and printed onto photographic negatives. 3D micromolds are created by spincoating on and photo-exposing layers of SU8 photoresist. After the micromold is developed to remove unpolymerized SU8, the microfludic geometry is created by through molding PDMS on the micromold. After curing in a 60° C. oven for 2 h, the PDMS device is bonded to a clean glass slide using oxygen plasma. After bonding, the microfludic channels are rendered hydrophobic through treatment with a fluorosilane. Alternative approached to fabricate the microfluidic devices include hot embossing, micromachining, and injecting molding. Electrodes are formed by filling microfluidic channels with a conductive material, such as saltwater, liquid metal, molten solder, or a conductive ink to be annealed later.

One fabricated microfluidic device, e.g. as shown in FIG. 2, included an inlet channel, a first spacer oil inlet, a second spacer oil inlet, a sorter channel, a fluorescent detector, first and second sorter electrodes, a first and second outlet channel, an upstream region, a discrete entity merger region, a downstream region, a recess, a flow divider, a laminating flow inlet, and first and second trapping electrodes. As reviewed above, some of such elements are part of other recited elements, e.g., the discrete entity merger region is part of the first outlet channel.

Example 2: Selective Combination of Discrete Entities

A mixed emulsion of discrete entities in a carrier fluid was introduced into an inlet channel of the microfluidic device. Directly upstream of the sorter channel, the discrete entities were detected by the optical detector. In addition, elements of the microfluidic device, e.g. the spacer oil inlets, caused the discrete entities to preferentially travel on one side of the inlet and sorter channels. Based on the detection, undesired components of the mixed emulsion flowed undisturbed through the concentric sorter channel to the second outlet channel Discrete entities in the concentric sorter channel containing desired contents, e.g. select cells, beads, and reagents, were actively sorted to the first outlet channel by dielectrophoretic forces from two sorting electrodes.

As each discrete entity flowed along the first outlet channel, it was directed along the wall of the first outlet channel closest to the trapping electrodes due to the geometry of the channels, e.g. recess, flow divider, and the laminating oil inlet. Upon reaching the discrete entity merger region, the selectively actuatable bipolar droplet trapping electrodes exerted an attractive dielectrophoretic force on each discrete entity, trapping it in the discrete entity merger region for a time and under conditions sufficient for the discrete entities to combine to form a combined discrete entity.

Example 3: Selective Reactions Via Selective Combination of Discrete Entities A microfluidic device with a discrete entity trapping region as shown in FIG. 4 was fabricated according to the methods described above. First, second, and third reagent aqueous streams contained 100 μM dextran-conjugated Cascade Blue dye along with 1 μM, 10 μM, and 100 μM dextran-conjugated Alexa Fluor 647 dye, respectively. A Jurkat cell suspension was stained using Calcein and resuspended in PBS containing 100 μM Cascade Blue at a concentration of 100,000 cells/mL. Four distinct groups of fluorescently-labeled 300 picoliter droplets were made ahead of time using a flow focusing drop-maker with aqueous phase flow rates of 500 μL/hr and oil flow rates of 1000 μL/hr and collected in a mixed common reservoir, wherein the discrete entities within each group contained exactly one of a first reagent, a second reagent, a third reagent, and an aliquot of the cell suspension. Due to the cell density, approximately 1 in 33 discrete entities formed from cell suspensions contain a single cell, with most remaining entities containing PBS only.

Next, discrete entities of each type were flowed into the microfluidic device and fluorescently detected immediately upstream of the sorter channel Discrete entities were injected at a flow rate of 100 μL/hr and fluorinated oil (HFE 7500) containing 0.2% fluorosurfactant were introduced into the spacer fluid and bias fluid inlets at 2000 μL/hr. Due to the unique combinations and concentrations of fluorescent dyes used, entity types are easily recognized in the fluorescent detection data. Combined discrete entities are formed as follows: the trapping electrode is actuated, a series of single discrete entities, containing a cell, reagent 1, reagent 2, and reagent 3 are sorted and flowed to the discrete entity merger region. As shown in FIG. 4, the four discrete entities combined to form a combined discrete entity, which was then released from the discrete entity merger region by turning off the electrical power to the trapping electrodes.

Example 4: Selective Combination of Three Cells

Figure 6:
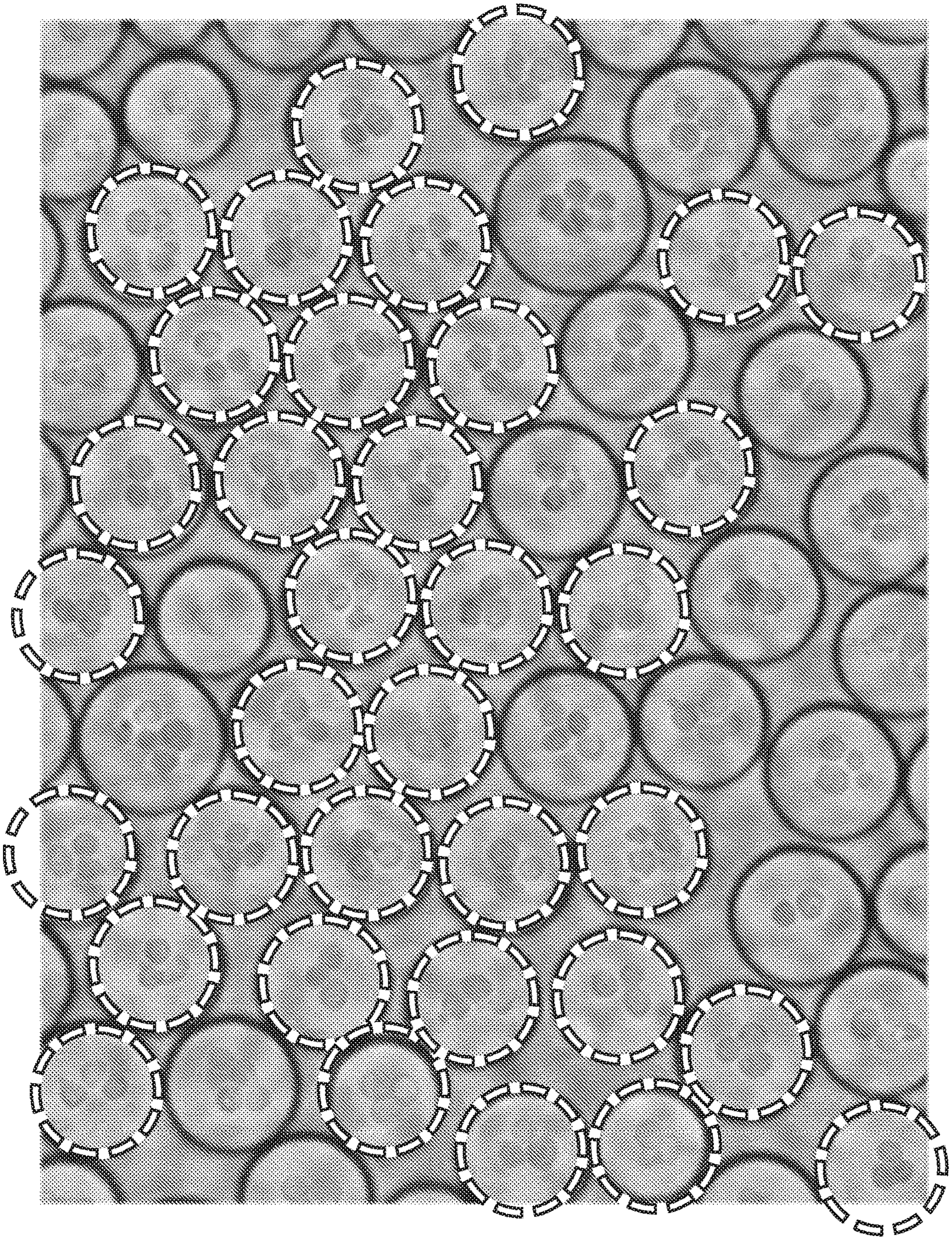
FIG. 6 provides an annotated image of combined discrete entities that were formed using a microfluidic device according to embodiments of the present disclosure, wherein the encircled combined discrete entities each contain three different cells.
Figure 7:
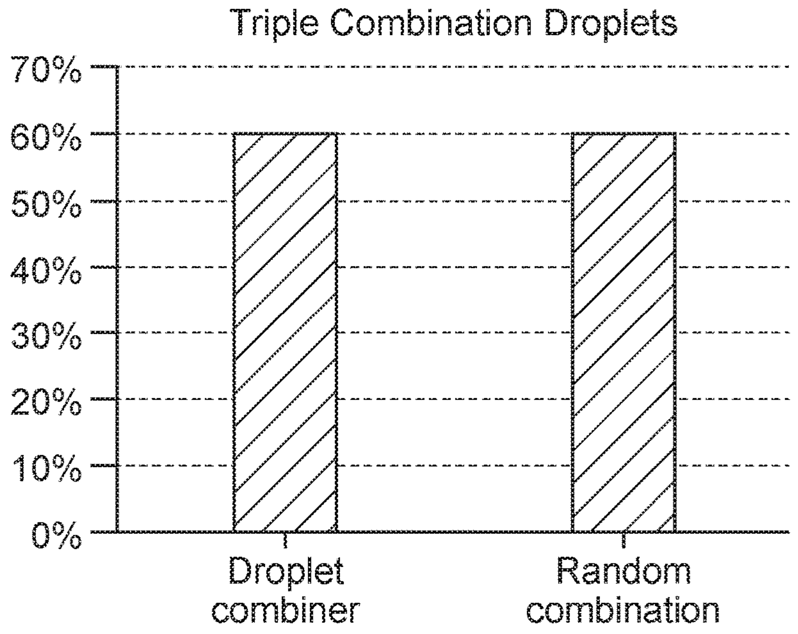
FIG. 7 shows the percentage of combined discrete entities that contained exactly three cells using a microfluidic device according to embodiments of the present disclosure compared to the expected percentage based on random combinations of discrete entities.

A microfluidic device was fabricated as described above. A plurality of discrete entities, each containing a cells were made by uniquely labeling three populations of Jurkat cells with Calcein Blue, Calcein, and CellTracker Red dyes, after which they are resuspended in PBS at 100,000 cells/mL, the formed into 300 pL droplets and flowed into the microfluidic device. The discrete entities were sorted and trapped in an attempt to obtain combined discrete entities that contained three different colored single cells per combined discrete entity. FIG. 6 shows an image of the resulting combined discrete entities, and FIG. 7 provides a graph showing that the number of combined discrete entities produced by a microfluidic device according to the present disclosure was able to produce triple combination droplets at 60% efficiency. Failures were largely attributed to incomplete dissociation of cells into a single cell suspension, so that clumps of >1 cell were sometimes contained within a sorted discrete entity. By randomly loading cells form a denser suspension that contained an average of one cell of each color for each droplet volume, Poisson statistics predicts that only 5% of droplets would contain the desired combination (FIG. 8), with the remaining 95% of the droplet population containing a wide array of combinatorial conditions. If droplets were combined at more standard dilute cell suspension conditions with 10% single cell occupancy, the likelihood of randomly assembling a droplet containing three dissimilar single cells is about 0.1%, whereas the expected percentage of triple combination droplets based on a random combination of discrete entities was only about 5%.

Example 5: Speed and Duration of Combining Discrete Entities

The speed and duration at which a device according to the present disclosure could selectively combine discrete entities that contained one or more cells was assessed. A microfluidic device was fabricated as described above. It was found that the device was able to create combined discrete entities that contained anywhere between 1-50 cells. It was also found that the device was able to continuously operate for 90 minutes while creating approximately 10,000 combined discrete entities.

The maximum speed at which combined discrete assemblies may be constructed depends on factors such as the maximum sorting rate, the frequency of discrete entities of interest, the travel time of a sorted entity to the trapping location, and the release speed for the combined discrete entity. Sorting has been demonstrated by Sciambi et al. at up to 30 kHz using dielectrophoretic methods similar to those that are described in this application. Cells and beads are typically encapsulated in discrete entities at less than 10% occupancy, which reduces the effective single cell sorting frequency by 1 order of magnitude. Less frequently represented cell subpopulations, such as natural killer cells (5%) from a peripheral blood mononuclear cells (PBMC) suspension, increase the time that must be waited until an appropriate discrete entity is detected and sorted, requiring any previously sorted discrete entities to be maintained in the merger region for an extended period of time. Under some circumstances, the travel time of a sorted droplet from the sorter to the trapping region may be on the order of 10 mS, assuming a 1 mm long, 40 μm square channel with a 1 mL/hr carrier oil flow rate. Although the trapping electrode may be actuated at frequencies greater than 10 kHz, the time required for a combined discrete entity to release from an unactuated trap is about 1 mS.

Example 6: Construction of Cell-Cell Functional Assays

A microfluidic device was fabricated as described above. A plurality of discrete entities was made containing single CAR-T cells, single Raji cells, or single interferon gamma cytokine detection beads co-encapsulated with secondary antibody and a Sytox viability stain. All discrete entities are fluorescently labeled for unique identification. The mixed discrete entities are flowed into the microfluidic device and combined so that every combed discrete entity contains a single CAR-T cell, a single Raji cell, and a single cytokine detection bead. The assembled entities were captured in a microcentrifuge tube and incubated at 37 C for 24 hrs. After incubation, the assembled discrete entities were pipetted into a microwell array, where they were imaged fluorescently.

Example 7: Multistep Workflows

After assembled discrete entities as described in Example 6 are incubated to allow for a functional response, they may be reinjected into the microfluidic device for further processing. In addition to the incubated discrete entities, a second population of discrete entities containing lysis buffer and barcoded RNA capture beads is made and reinjected into the device. An incubated cell entity and a lysis buffer/RNA capture bead entity is sorted to each combined entity, after which cells are lysed, hybridized onto RNA capture beads for downstream processing.

Example 8: On Chip Imaging and Real Time Barcoding

Assembled discrete entities as described above are incubated to allow for a functional response and a population of discrete entities containing lysis buffer and barcoded RNA capture beads is made. Additionally, populations of discrete entities are formed from solutions containing known oligonucleotide barcodes and are labeled with unique combinations of fluorescent dyes. All of the entities are injected into the device as described above. A cell-containing entity is first delivered to the trapping location, after which it is imaged on the device and the image stored. Next, a lysis buffer/RNA capture bead is sorted to the trap, followed by a known combination of entities containing a known and unique combination of oligonucleotide barcodes. These barcodes hybridize onto the RNA capture bead along with cell-derived RNA and provide a way to correlate imaging date to sequencing data. The combined discrete entities are collected and processed downstream.

Example 9: Selective Single Cell RNA Sequencing Based on Cell Type

Discrete entities are made from a PBMC population treated with fluorescently labeled antibodies. Additional lysis buffer/RNA capture bead discrete entities are also made. The mixed discrete entity population is injected into the device and equal numbers of B cells, natural killer cells, and dendritic cells are individually sorted to the trapping region and merged with a lysis buffer/RNA capture bead discrete entity. The combined discrete entities are collected and processed downstream. By selecting less abundant cell types for sequencing, the need to oversample the more abundant cell types in a mixed sample is eliminated, reducing sequencing costs.

Example 10: Two Bead Assembly Process

Figure 21A:
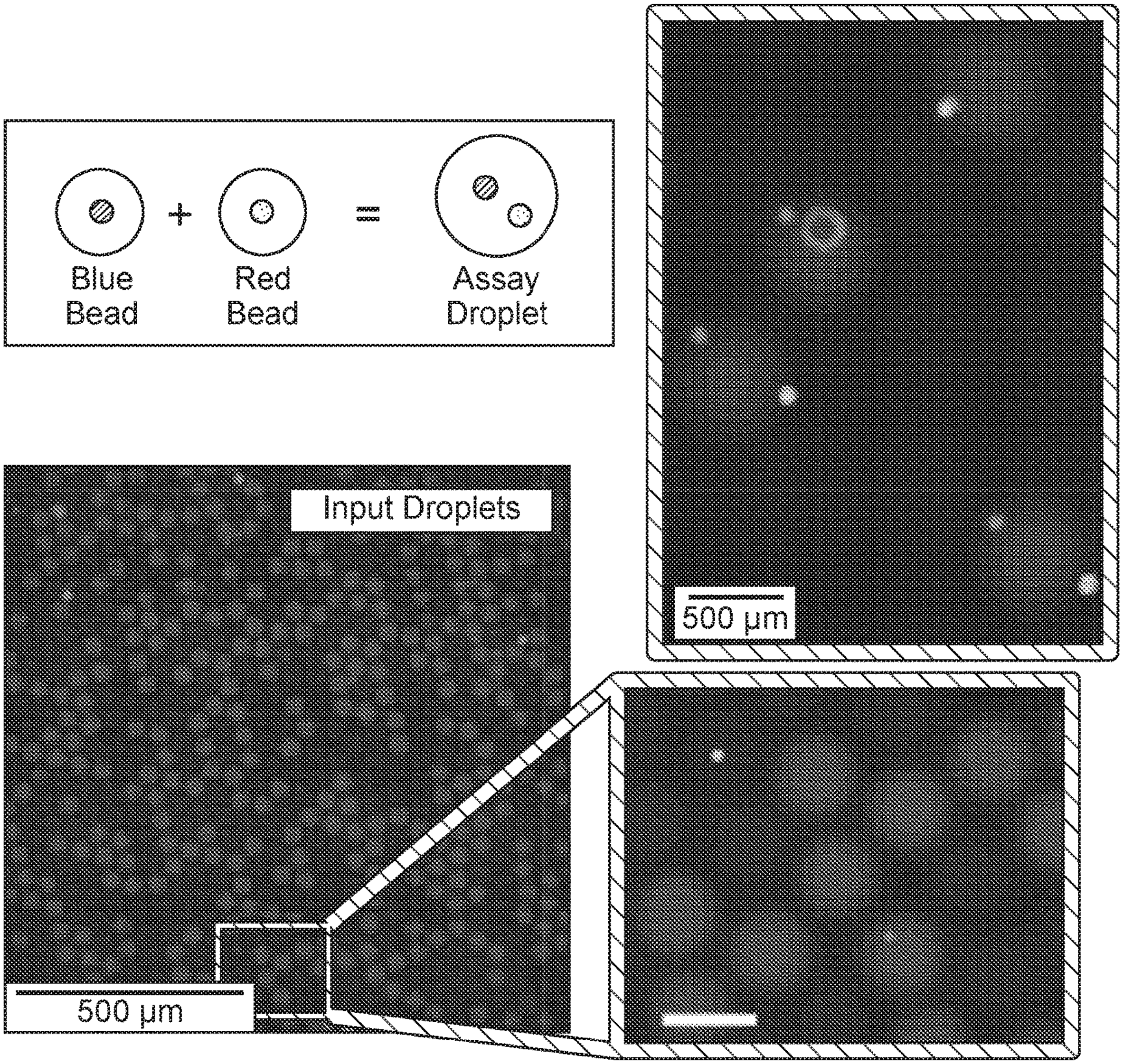
FIG. 21A provides precision in assembled droplets with two beads of two colors. A) Assay droplets are accurately constructed with high throughput as demonstrated by the assembly of 20,000 droplets with exactly 1 red and 1 blue bead. A.1) Representative composite fluorescent image of input droplets shows sparse loading of blue and red fluorescent beads.
Figure 21B:
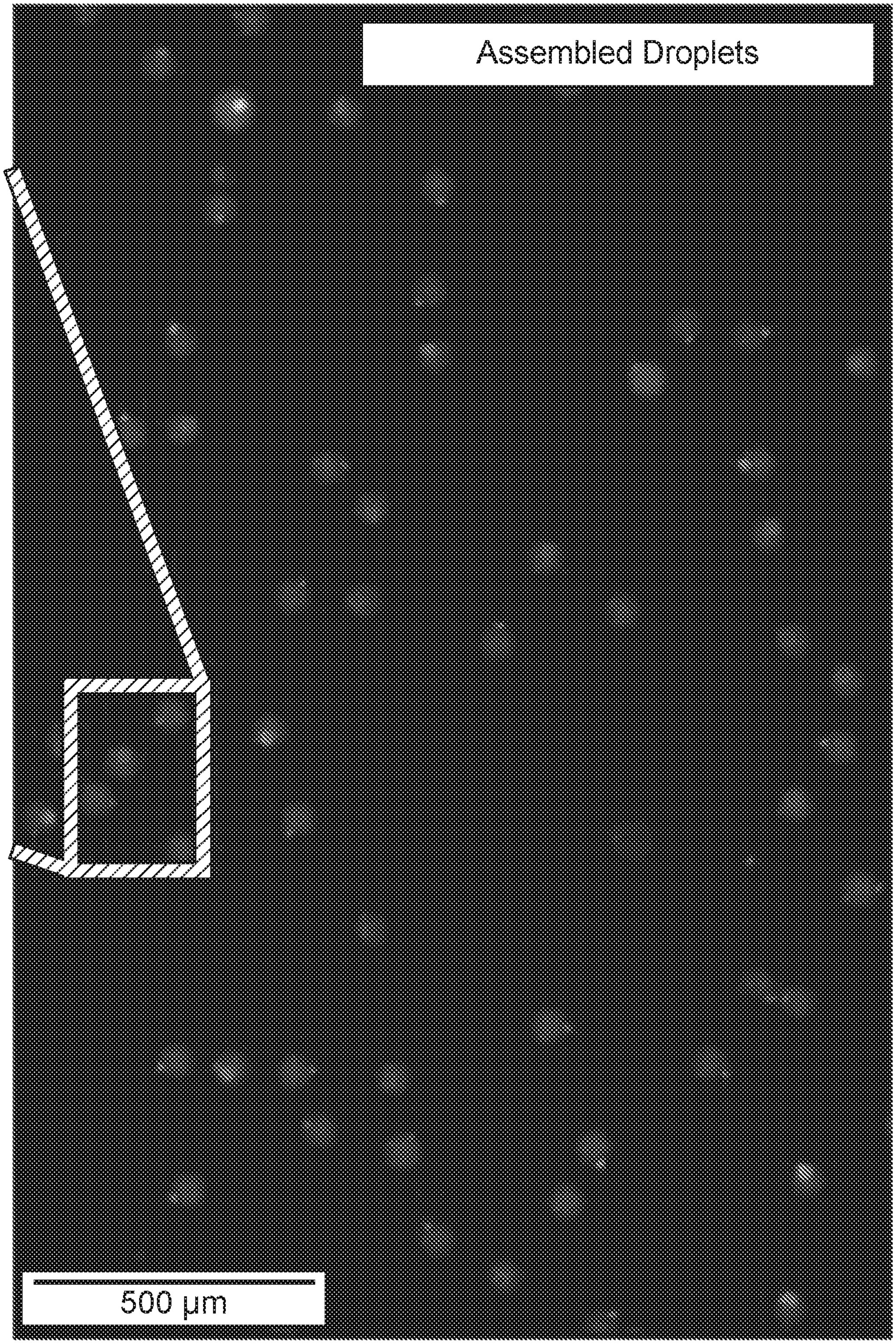
FIG. 21B provides representative composite fluorescent image of Assembled 'assay' droplets showing uniform contents of 1 red and 1 blue bead per drop.
Figure 21C:
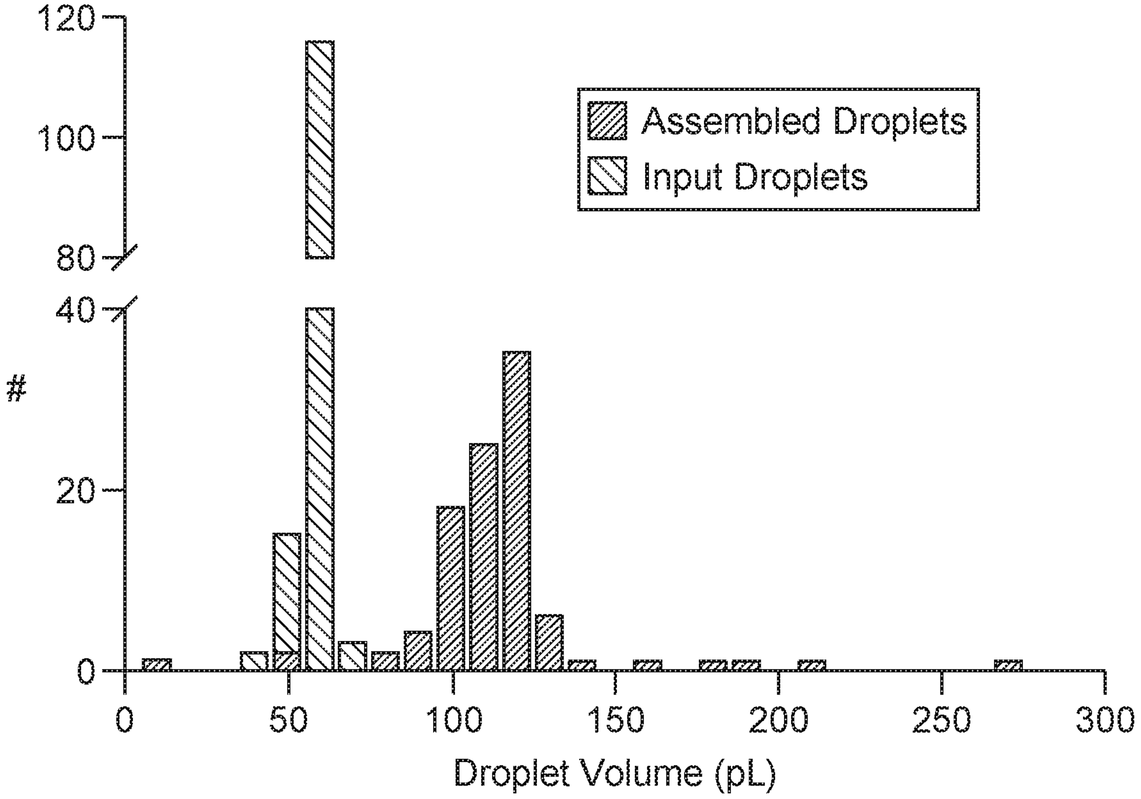
FIG. 21C provides assembled droplets are of twice the volume of the input droplets. A.4) 90% of assembled droplets contain exactly 1 blue and 1 red bead. B) Accurate assembly of precisely 1 red, blue and green cells in droplets.

Two batches of input droplets were prepared using standard flow-focusing droplet microfluidics and collected in a common 1 mL syringe. The first and second batches contained a dilute suspension of either blue or red fluorescent microparticles (Spherotech) and either 1 uM or 0.5 uM AlexaFluor488 10 kDa Dextran (AF488Dex)(Thermo Fisher) respectively. Droplets were predominantly empty with a few containing 1 red bead or 1 blue bead (FIG. 21A). Sorting gates for droplets with red fluorescent beads and blue fluorescent beads were drawn using the relative fluorescent signatures of the AF488Dex drop dye and bead fluorescent intensities and exactly 1 blue bead droplet an 1 red bead droplet were sorted and merged per assembled droplet formation. 17500 droplets were assembled in this fashion in 1 hour and 25 minutes, and these assembled droplets were collected in a 200 uL emulsion of dummy PBS droplets. The composition of the input emulsion and assembled droplet emulsion were assessed using fluorescent microscopy. 5 uL samples of each emulsion were sampled and imaged (Leica, Dmi8 Thunder) within a cell counting slide (Thermo Fisher) (FIG. 21B). The contents of each droplet imaged were then quantified using custom Image J scripts. Of 104 combined droplets, 93/104 contained exactly one blue and one red bead (FIG. 21C).

Example 11: CAR-T Functional Assay Workflow

Figure 22A:
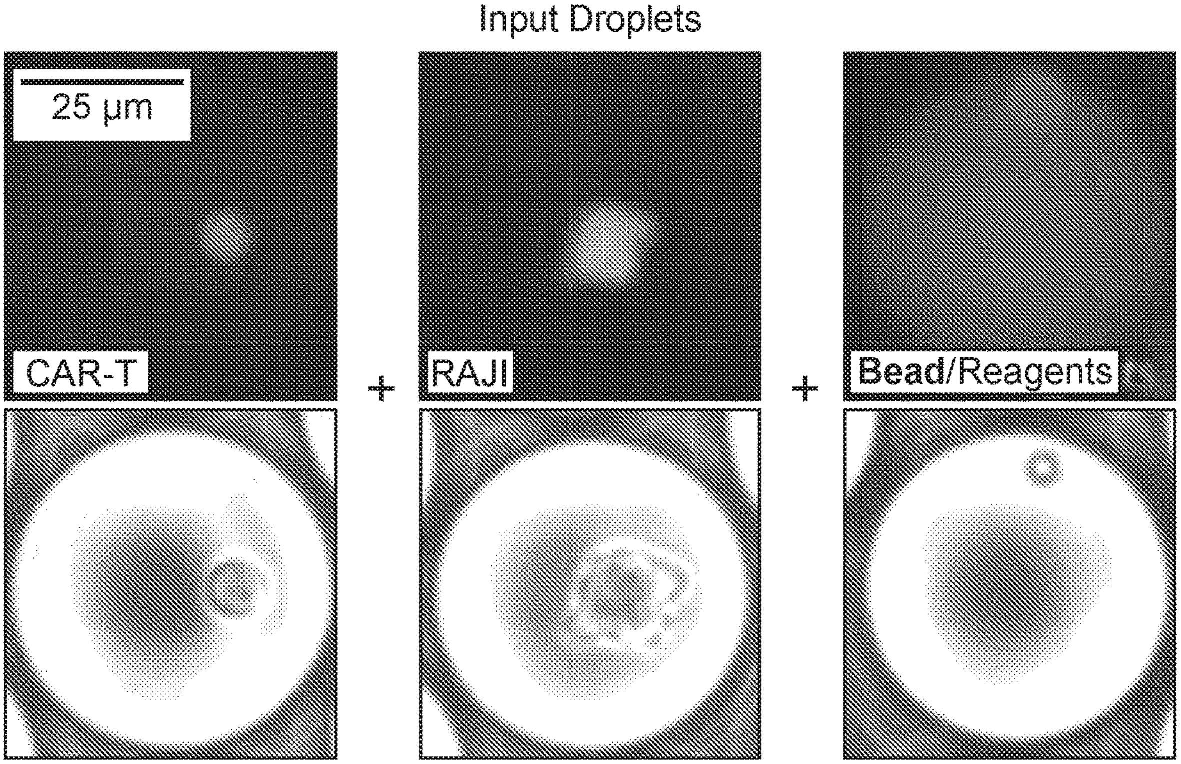
FIG. 22A provides CAR-T cytokine detection following stimulation with RAJI cell in assembled droplets. A) Input droplets contain single CAR-T cells, single RAJI cells or detection reagents.
Figure 22B:
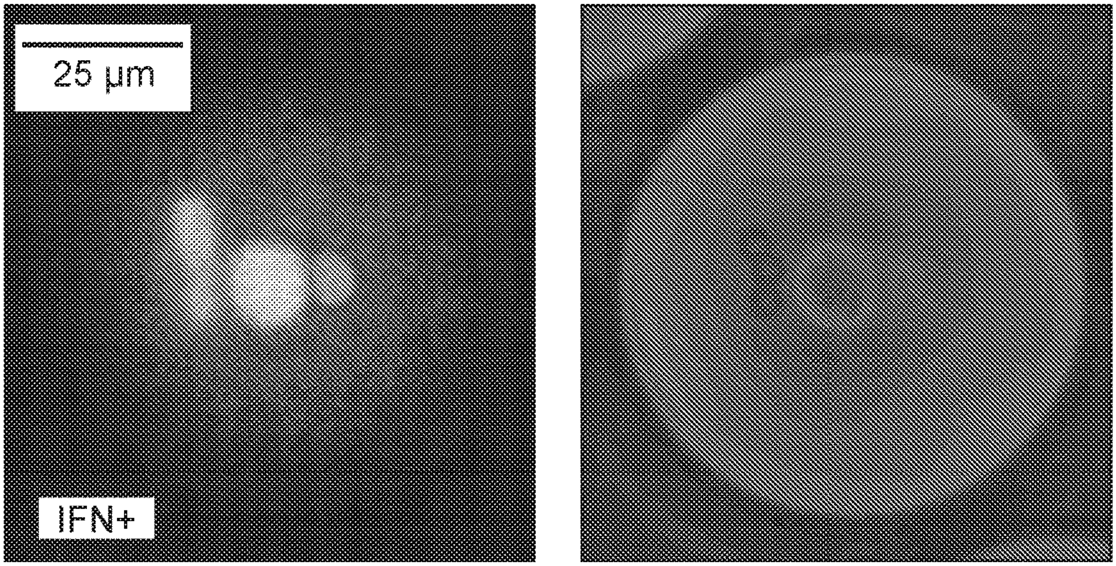
FIG. 22B provides CAR-T, RAJI and reagents are sorted and merged into assay droplets and incubated for 12 hours.
Figure 22C:
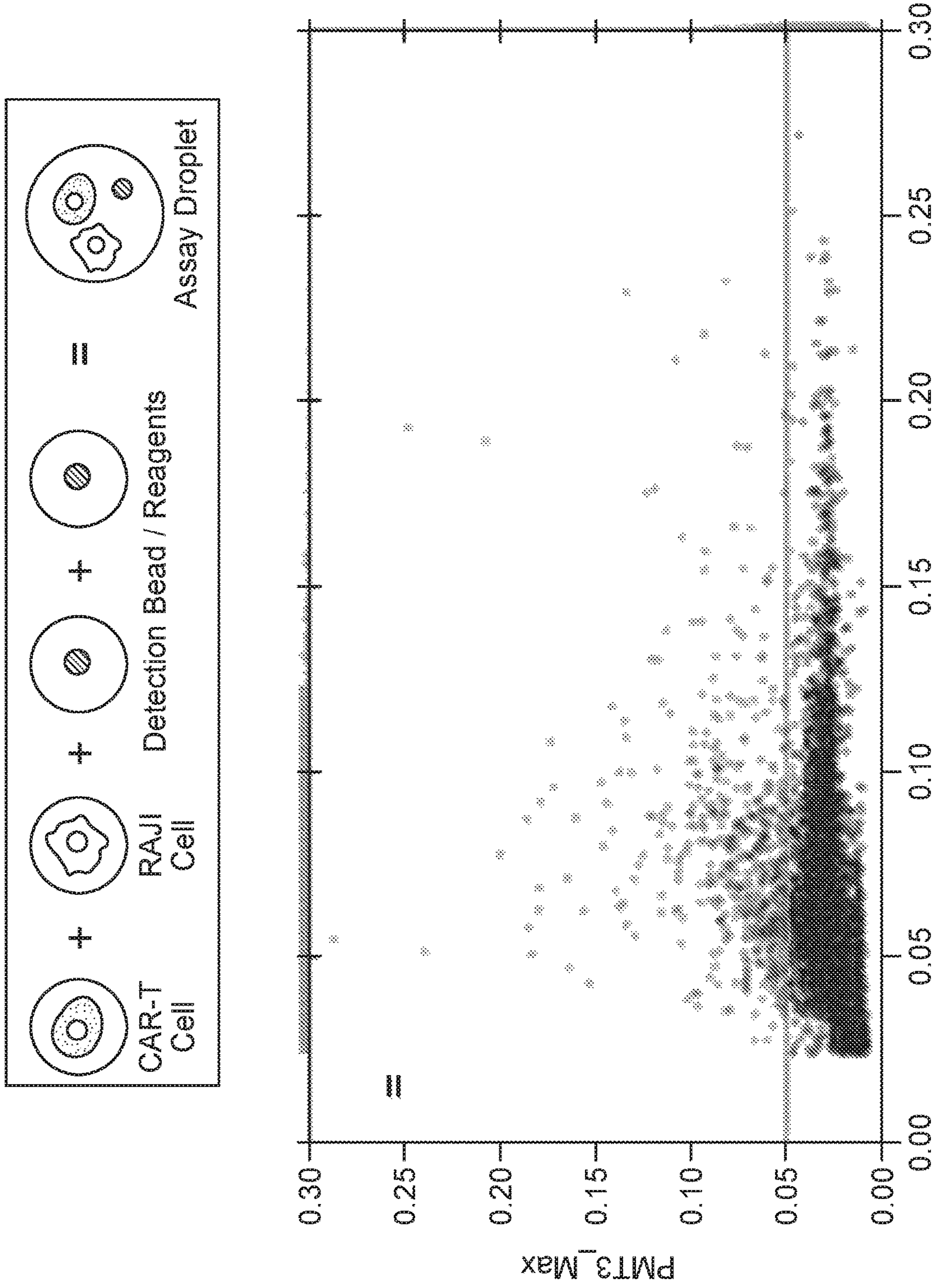
FIG. 22C provides assay droplets are sorted according to the peak intensity of cytokine detection antibody.

Cells were fluorescently stained the night prior to emulsification. CAR-T and RAJI cells were stained using CellTracker Green CMFDA and CellTracker Orange CMRA respectively for 10 minutes at 37° C. Cells were then washed in full culture media, incubated overnight, and washed again. Input droplets of 40 um diameter were generated using standard flow-focusing droplet microfluidics. Three batches of input droplets were prepared using standard flow-focusing droplet microfluidics and collected in a common 1 mL syringe (BD Biosciences). The first two batches consisted of either stained CAR-T cells or stained RAJI cells loaded at 5e6 cells/mL and containing 3 μM or 1 μM Cascade Blue 10 kDa Dextran(CB-Dex) (Thermo Fisher) respectively. The third batch of droplets contained assay reagent components which consisted of IFNλ detection microparticles, biotinylated IFNλ detection antibody, streptavidin AlexaFluor 647, and 6 μM CB-Dex. Cytokine detection microparticles were prepared in advance of cell-cell interaction studies. In brief, 4 mg of carboxylated and fluorescent polystyrene particles were functionalized with IFNλ capture antibody using carbodiimide chemistry. Functionalized particles were washed three times and stored in PBS until use. Droplet assembly was carried out on a 40-μm microfluidic assembler device. Sorting gates were defined to isolate droplets containing CAR-T, RAJI, or detection microparticles based on the relative CB-Dex and fluorescent signatures of the cells and microparticles (FIG. 22A). Droplets were then sorted and merged to assemble droplets that contained 1 CAR-T, 1 RAJI, and 2 detection microparticles and associated reagents (FIG. 22B). In this manner, 15,000 droplets of approximately 65 μm diameter were assembled in 1 hour and 30 minutes and were collected in a 200 μL emulsion of dummy PBS droplets in a 3 mL syringe. Included in this collected emulsion was 500 μL of HFE7500 with 5% surfactant to stabilize droplets during incubation. The assembled droplet emulsion was incubated for 12 hours at 37° to allow for cell-cell interaction and cytokine secretion. Assembled droplet sorting was carried out on an 80-μm droplet assembler microfluidic device. Sorting gates were defined using CB-Dex to detect the presence of an assembled droplet, and AF647 to threshold and sort droplets wherein IFNλ pulldown onto the detection microparticles yields a bead-localized spike in fluorescence (FIG. 22C). The assay-positive and assay-negative droplet populations were then collected in 200 uL emulsions of dummy PBS droplets for downstream processing.

What is claimed is:

1. A microfluidic device comprising:

a) an inlet channel;

b) a sorting channel in fluid communication with the inlet channel;

c) a first outlet channel and a second outlet channel in fluid communication with the sorting channel, wherein the first outlet channel comprises:

an upstream region adjacent to and in fluid communication with the sorting channel, a discrete entity merger region adjacent to and in fluid communication with the upstream region, and a downstream region adjacent to and in fluid communication with the discrete entity merger region;

d) a sorting element positioned in proximity to the sorting channel, wherein the sorting element is configured to sort a discrete entity in the sorting channel to the first outlet channel; and e) a trapping element positioned in proximity to the discrete entity merger region, wherein the trapping element and discrete entity merger region are configured to trap a plurality of discrete entities in the discrete entity merger region of the first channel for a time sufficient for the plurality of discrete entities to combine to form a combined discrete entity, wherein the discrete entity merger region comprises a feature selected from the group consisting of: a geometric change in a dimension of the first outlet channel, a flow obstacle, a flow divider, a laminating fluid inlet, a valve, and a combination thereof.

2. The microfluidic device of claim 1, wherein the sorting element comprises a sorting electrode that exert an electromagnetic force sufficient to sort a discrete entity in the sorting channel to the first outlet channel.

3. The microfluidic device of claim 2, wherein the electromagnetic force is a dielectrophoretic force.

4. The microfluidic device of claim 2, wherein the electromagnetic force is an electrophoretic force.

5. The microfluidic device of claim 1 further comprising a second sorting electrode.

6. The microfluidic device of claim 5, further comprising a third sorting electrode.

7. The microfluidic device of claim 5, wherein the first and second sorting electrodes are configured such that the first and second sorting electrodes form a bipolar electrode pair and the first trapping electrode is positively charged.

8. The microfluidic device of claim 5, wherein the first and second sorting electrodes are positioned on opposite sides of the sorting channel.

9. The microfluidic device of claim 5, wherein a distance between an end of the first sorting electrode, the second sorting electrode, or both and an interior wall the sorter channel is between approximately 1 μm and approximately 100 μm.

10. The microfluidic device of claim 2, wherein each sorting electrode comprises a liquid electrode.

11. The microfluidic device of claim 10, wherein each sorting liquid electrode comprise one or more liquid channels imbedded in the microfluidic device and filled with conductive media.

12. The microfluidic device of claim 1, wherein the trapping element exerts an electromagnetic force, exerts a mechanical force, or a combination thereof sufficient to trap a plurality of discrete entities in the discrete entity merger region for a time sufficient for the plurality of discrete entities to combine to form a combined discrete entity.

13. The microfluidic device of claim 1, wherein the trapping element comprises a first trapping electrode that exert an electromagnetic force sufficient to trap a plurality of discrete entities in the discrete entity merger region for a time sufficient for the plurality of discrete entities to combine to form a combined discrete entity.

14. The microfluidic device of claim 13, wherein the electromagnetic force is a dielectrophoretic force.

15. The microfluidic device of claim 13, wherein the electromagnetic force is an electrophoretic force.

16. The microfluidic device of claim 13, further comprising a second trapping electrode.

17. The microfluidic device of claim 16 wherein the first and second sorting electrodes are configured such that the first and second sorting electrodes form a bipolar electrode pair and the first trapping electrode is positively charged.

18. The microfluidic device of claim 13 wherein each trapping electrode comprises a liquid electrode.

19. The microfluidic device of claim 18, wherein each trapping liquid electrode comprise one or more liquid channels imbedded in the microfluidic device and filled with conductive media.

20. The microfluidic device of claim 16, wherein the first trapping electrode extends along the first outlet channel downstream of the discrete entity merger region or the second trapping electrode extends along the first outlet channel downstream of the discrete entity merger region.

21. The microfluidic device of claim 1, wherein the sorting channel defines a concentric or approximately concentric flow path, and wherein a portion of the first sorting electrode is located at the center of the concentric or approximately concentric flow path.

22. The microfluidic device of claim 21, wherein the first sorting electrode is positioned closer to the first outlet channel than to the second outlet channel.

23. The microfluidic device of claim 1, wherein the discrete entity merger region comprises a geometric change in a dimension of the first outlet channel, and wherein the geometric change comprises an increase in the cross-sectional area of the first outlet channel.

24. The microfluidic device of claim 1, where the discrete entity merger region comprises a geometric change, and wherein the geometric change comprises a recess in a wall of the first outlet channel.

25. The microfluidic device of claim 1, wherein the discrete entity merger region comprises a laminating fluid inlet channel configured such that flowing laminating fluid through the laminating fluid inlet channel will direct a discrete entity in the discrete entity merger region towards a trapping electrode.

26. The microfluidic device of claim 1, wherein the first outlet channel comprises an angled turn in the channel wall downstream of the discrete entity merger region.

27. The microfluidic device of claim 1, wherein the microfluidic device comprises a spacer fluid channel in fluid communication with the inlet channel, wherein the spacer fluid channel is configured such that flowing spacer fluid through the spacer fluid channel causes spacer fluid to be located between two discrete entities flowing through the inlet channel, thereby maintaining or increasing the distance between the two discrete entities, and thereby allowing each of the two discrete entities to be independently sorted or not sorted.

28. The microfluidic device of claim 1, wherein the microfluidic device comprises a bias fluid channel in fluid communication with the sorting channel, wherein the bias fluid channel is configured such that flowing bias fluid through the bias fluid channel will cause a discrete entity to move closer to a second side wall of the sorter channel and farther away from a first side wall of the sorter channel.

29. The microfluidic device of claim 1, wherein the microfluidic device is configured such that if the sorting element does not exert a force on a discrete entity flowing through the sorter channel, the discrete entity will flow into the second outlet channel.

30. The microfluidic device of claim 1, comprising a combined discrete entity exit channel in fluid communication with the first outlet, wherein the combined discrete entity exit channel is configured to receive the combined discrete entity.

31. A system, comprising a) the microfluidic device of claim 1; and b) one or more or all of:

i) a discrete entity maker configured to make a plurality of discrete entities, wherein the discrete entity maker is located within the microfluidic device or separately from the microfluidic device;

ii) a discrete entity library comprising two or more types of discrete entities;

iii) a detector configured to detect a discrete entity in the input channel, wherein the microfluidic device is configured to sort a discrete entity in the sorting channel based on the detection by the detector;

iv) a temperature control module operably connected to the microfluidic device;

v) an incubator operably connected to the microfluidic device;

vi) an imager configured to image a combined discrete entity; and vii) a sequencer operably connected to the microfluidic device or the incubator.

32. The microfluidic device of claim 1, wherein the discrete entity merger region comprises a geometric change in a dimension of the first outlet channel.

33. The microfluidic device of claim 1, wherein the discrete entity merger region has a larger cross-sectional area than a cross-sectional area of the upstream region.

34. The microfluidic device of claim 1, wherein the first outlet channel has a cross-sectional dimension of 1 mm or less.

* * * * *